United States Patent [19]
Breault et al.

[11] Patent Number: 5,458,748
[45] Date of Patent: * Oct. 17, 1995

[54] CORONAL-CATALYTIC APPARATUS AND METHOD FOR NO$_x$ REDUCTION

[75] Inventors: Ronald W. Breault, Kingston; Christopher R. McLarnon, Exeter, both of N.H.; Frederick E. Becker, Reading, Mass.

[73] Assignee: Thermo Power Corporation, Waltham, Mass.

[*] Notice: The portion of the term of this patent subsequent to Sep. 15, 2009 has been disclaimed.

[21] Appl. No.: 124,693

[22] Filed: Sep. 20, 1993

Related U.S. Application Data

[63] Continuation-in-part of Ser. No. 93,998, Jul. 19, 1993, abandoned, which is a continuation of Ser. No. 824,596, Jan. 23, 1992, Pat. No. 5,240,575, which is a continuation of Ser. No. 555,561, Jul. 19, 1990, Pat. No. 5,147,516.

[51] Int. Cl.$^6$ .................................................. C01B 21/00
[52] U.S. Cl. .......................... 204/177; 204/178; 204/179
[58] Field of Search ................................... 204/164, 174, 204/179, 178, 177

[56] References Cited

U.S. PATENT DOCUMENTS

| | | | |
|---|---|---|---|
| 3,205,162 | 9/1965 | MacLean | 204/312 |
| 3,562,127 | 2/1971 | Woonton et al. | 204/164 |
| 3,983,021 | 9/1976 | Henis | 204/164 |
| 4,253,925 | 3/1981 | Mason | 204/277 |
| 4,430,303 | 7/1984 | Linde | 422/170 |
| 4,657,738 | 4/1987 | Kanter et al. | 204/272 |
| 4,695,358 | 9/1987 | Mizuno et al. | 204/179 |
| 5,120,508 | 6/1992 | Jones | 422/170 |
| 5,147,516 | 9/1992 | Mathur et al. | 204/179 |

OTHER PUBLICATIONS

K. S. Visvanathan, *Journal of the Indian Chemical Society;* "The Decomposition of Nitric Oxide in the Silent Electric Discharge"; 29:307–316 (1952).

K. S. Visvanathan, *Journal of the Indian Chemical Society;* "The Decomposition of Nitric Oxide in the Silent Electric Discharge"; 30:836–40 (1953).

Joshi, Shridhar S.; *Transactions of the Faraday Society;* "The Decomposition of Nitrous Oxide in the Silent Electric Discharge"; 23:227–38 (1927).

Joshi, Shridhar S.; *Transactions of the Faraday Society;* "The Decomposition of Nitrous Oxide in the Silent Electric Discharge"; 25:108–17 (1929).

Joshi, Shridhar S.; *Transactions of the Faraday Society;* "The Decomposition of Nitrous Oxide in the Slient Electric Discharge The Variation of the Current and of the Power during the Reaction"; 25:118–28 (1929).

Joshi, Shridhar.; *Transactions of the Faraday Society;* "The Decomposition of Nitrous Oxide in the Silent Electric Discharge, Influence of the Addition of Foreign Gases" 25:137–47 (1929).

Brewer, A. Keith and Westhaver, J. W., Journal of Physical Chemistry; "The Synthesis of Ammonia in the Glow Discharge", 33:883–89 (1929).

PCT Publication No. WO92/19361 dated Nov. 12, 1992, ref. PCT Applic. No. US92/03490.

(List continued on next page.)

*Primary Examiner*—John Niebling
*Assistant Examiner*—Kishor Mayekar
*Attorney, Agent, or Firm*—Lorusso & Loud

[57] ABSTRACT

This invention presents an NO$_x$ environment effective reduction apparatus comprising a sulfur tolerant, high water vapor (about 3% to about 18%) tolerant, packing-free coronal-catalyst. In one embodiment the invention comprises an NO$_x$ reduction apparatus of high water vapor tolerant coronal-catalyst adapted and configured for hypercritical presentation of an electrical field to an NO$_x$ bearing gas stream, where the electrical field has a minimum field power density of at least about 75 watts/cubic meter, and optionally, accompanying downstream scrubbers. In a particular embodiment, downstream wet or dry absorption arrest particulate NO$_x$ reduction products NO$_2$ and HNO$_3$, optionally upon exposure to an arresting agent, including basic, caustic, or alkali materials such as CaO or NH$_3$.

31 Claims, 43 Drawing Sheets

OTHER PUBLICATIONS

Publication of Fifth Annual Coal Preparation, Utilization and Environmental Control Contractors Conference (Jul. 31–Aug. 3, 1989) "Electro–Catalytic Reduction of Nitrogen Oxides", V. K. Mathur and C. R. McLarnon.

"A Unified Projection of the Performance and Economics of Radiation–Initiated $NO_x/SO_x$ Emission Control Technologies", Person et al., DOE Contract #DE–AC22–84 PC70259 (1985).

G. Lacoste and R. Bes, *Rev. Chim Minerale*, 11:141–48 (1974).

R. Bes, *Rev. Phys. Appl.* 12:1029–34 (1977).

van den Bleek, et al., *I. Chem E. Symposium Series*, U. of Salford; "Problems Around the Reduction of Nitrogen Oxides in the Presence of Oxygen" (1979).

"An Advanced Corona Discharge $NO_X$ Control System", Ronald W. Breault, Christopher Mclarnon, V. K. Mathur, Mike Landau, AIChE Spring National Meeting, Session 65: Coal Combustion Flue Gas Cleanup I, Minneapolis, Minn. (1992).

"Development and Decomposition of an Electro–Oxidation Process for the Destruction of Chlorinated Volatile Organic Compounds (CVOC's)", Tecogen Inc., Dept. of Energy Contract No. DE–RA21–92MC28245.

"Low Quality Natural Gas Sulfur Removal/Recovery", Tecogen Inc., Dept. of Energy RFP No. DE–RP21–91MC28133.

"Reaction Gas Kinetics for Flue Gas, Gas Treatment of $NO_X$", Ronald W. Breault, Christopher McLarnon, V. K. Mathur, NATO Advanced Research Workshop on Non–Thermal Plasma Techniques for Pollution Control (Cambridge University, England, Sep. 21–25, 1992).

"The Tecolytic ™ Process. An Advanced $NO_X$ Control System", Ronald W. Breault, V. K. Mathur, Christopher McLarnon, Jeff Chini, International Gas Research Conference (Orlando Florida, Nov. 16–19, 1992).

"An Advanced Corona Discharge $NO_X$ Control System", Ronald W. Breault, Frederick E. Becker, V. K. Mathur, Christopher McLarnon, Jeff Chini, AIChE Spring National Meeting, Session 99: Contaminants Removal From Gas II, New Orleans, Louisiana (1992).

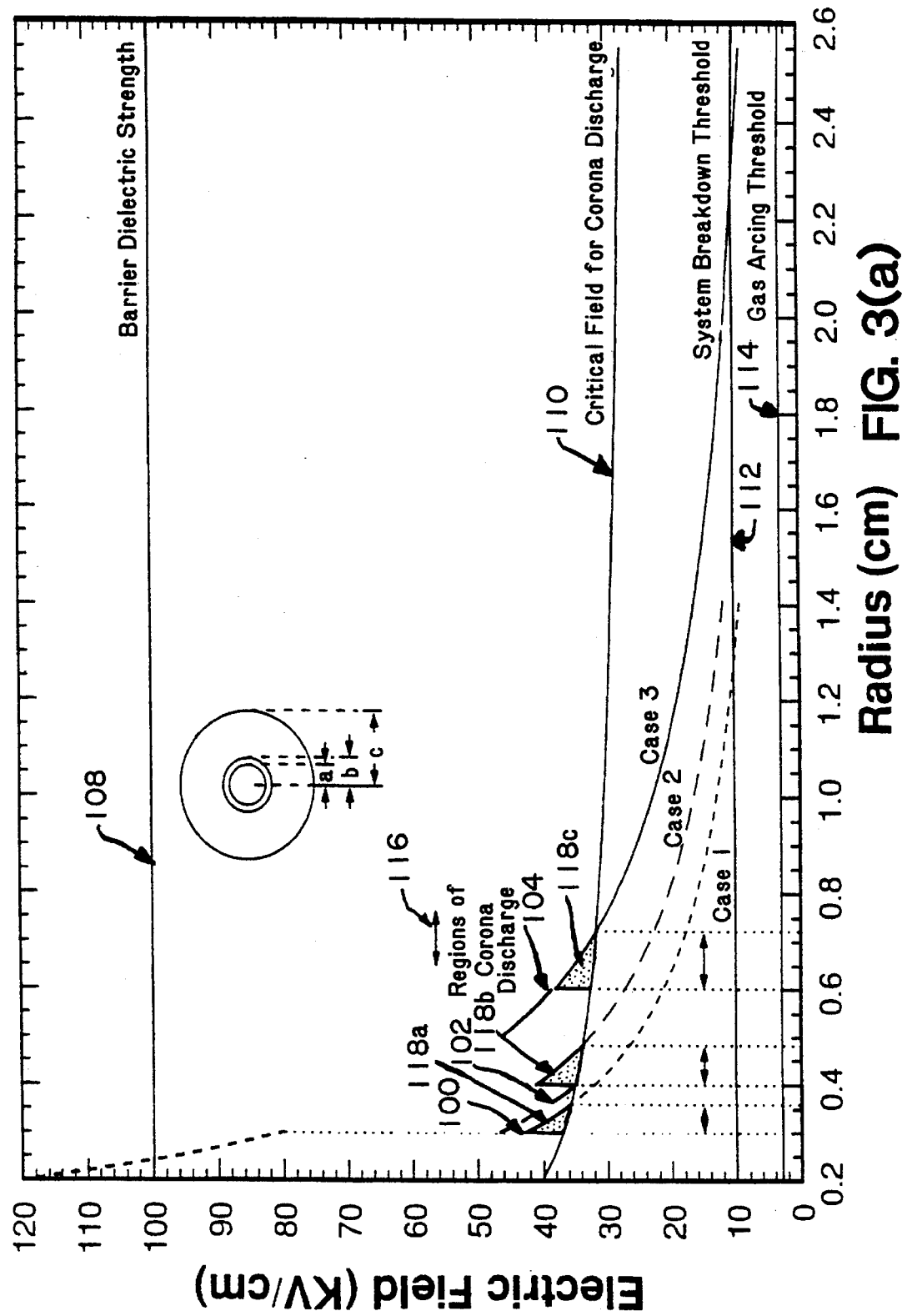

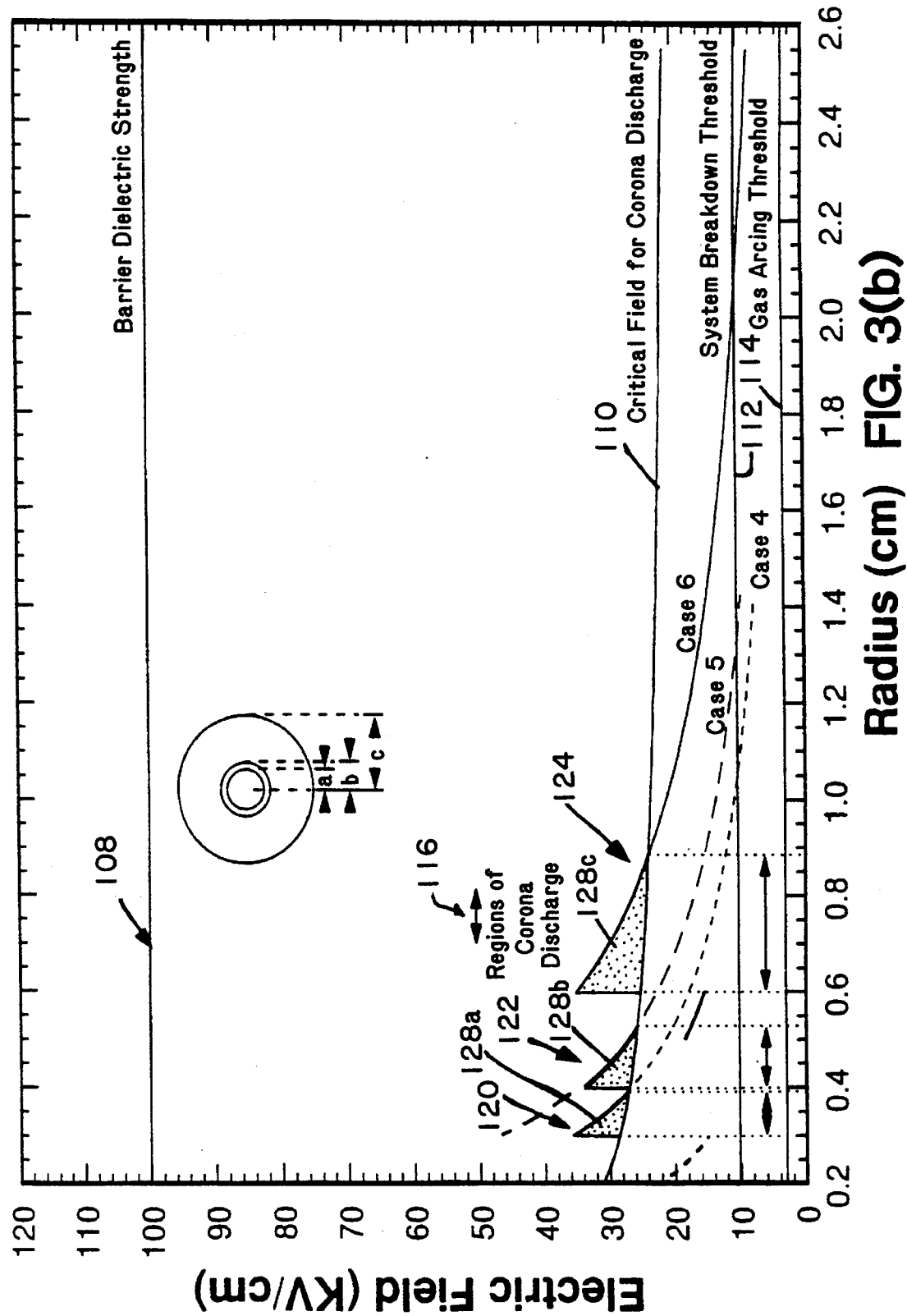

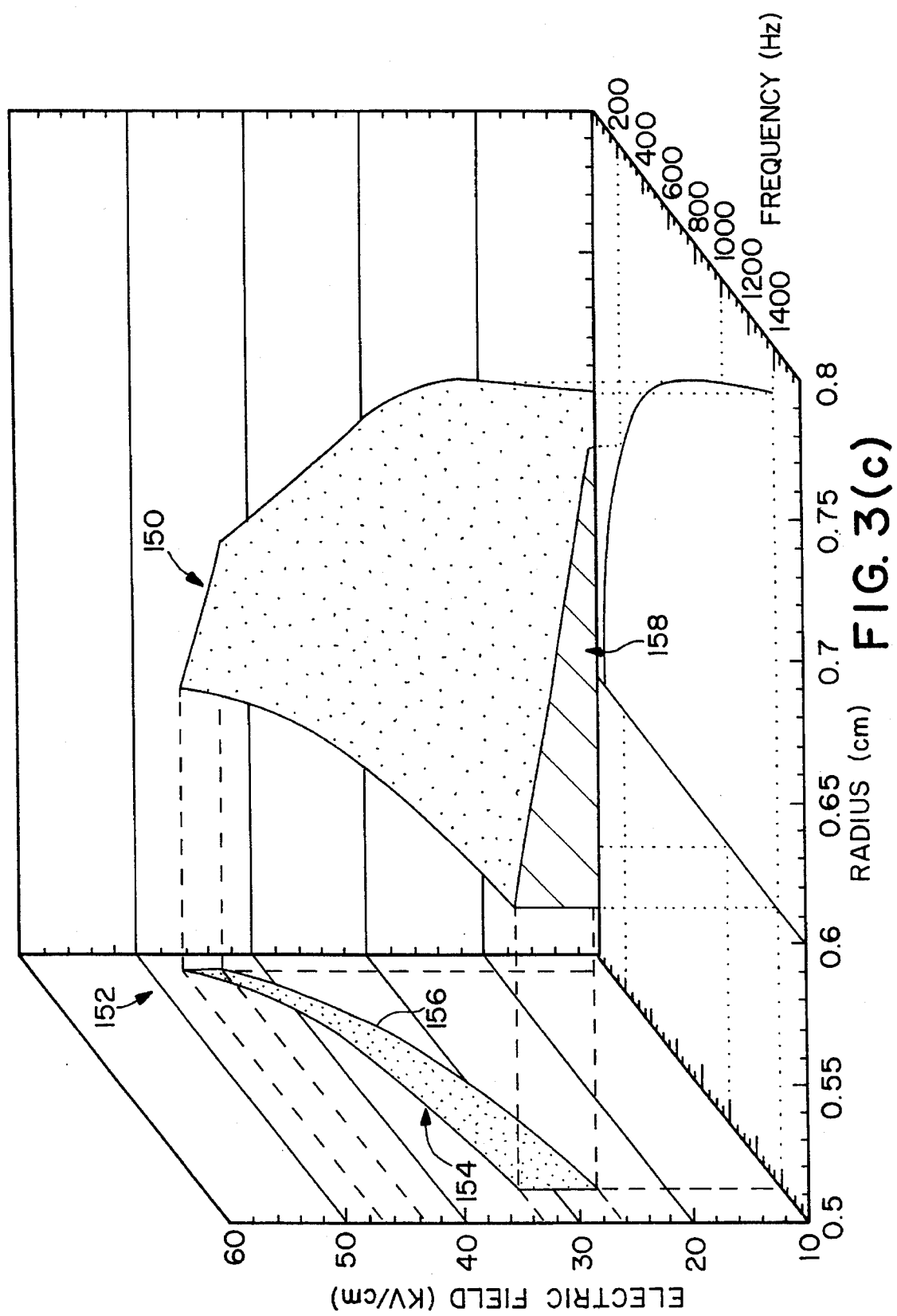

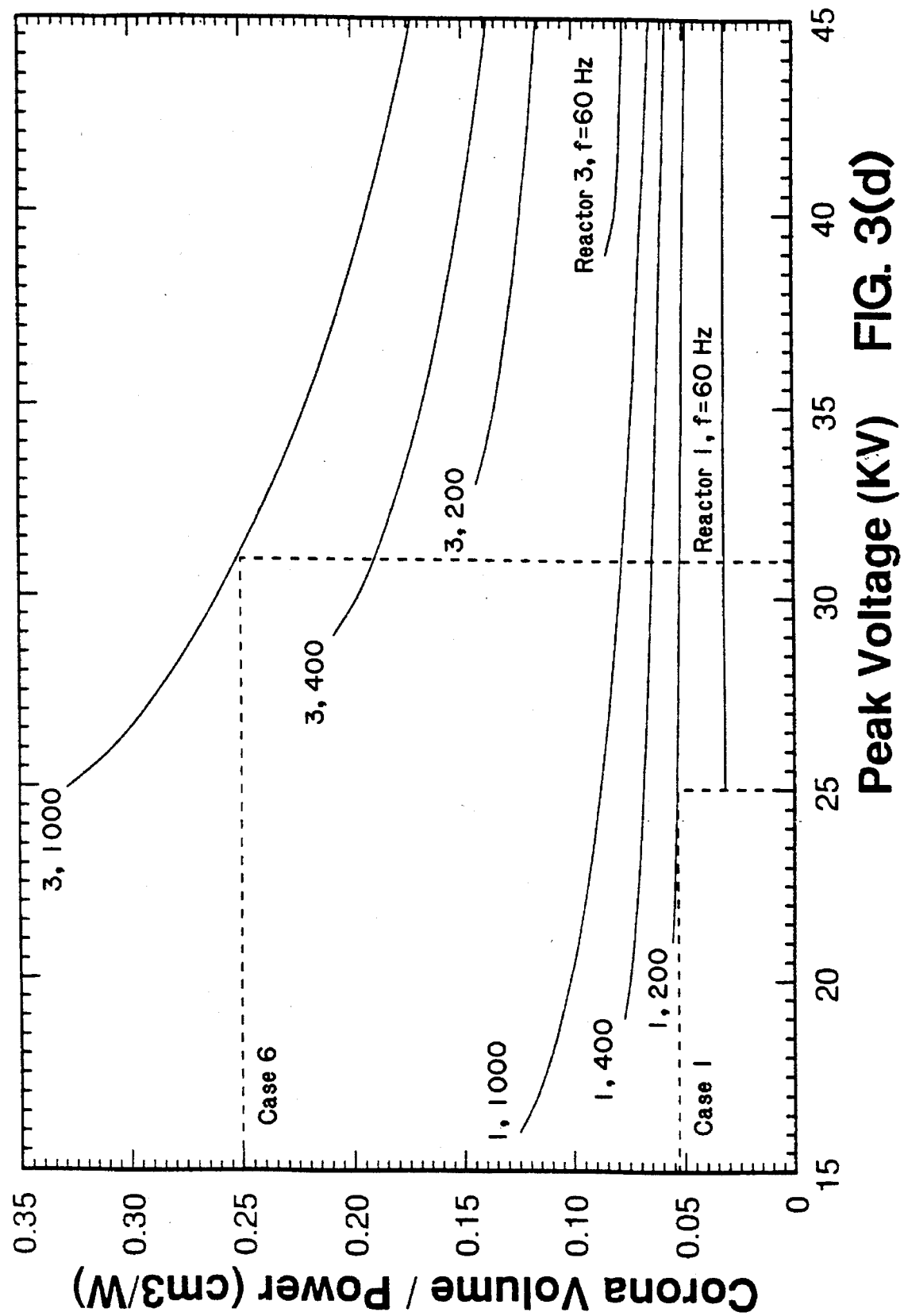

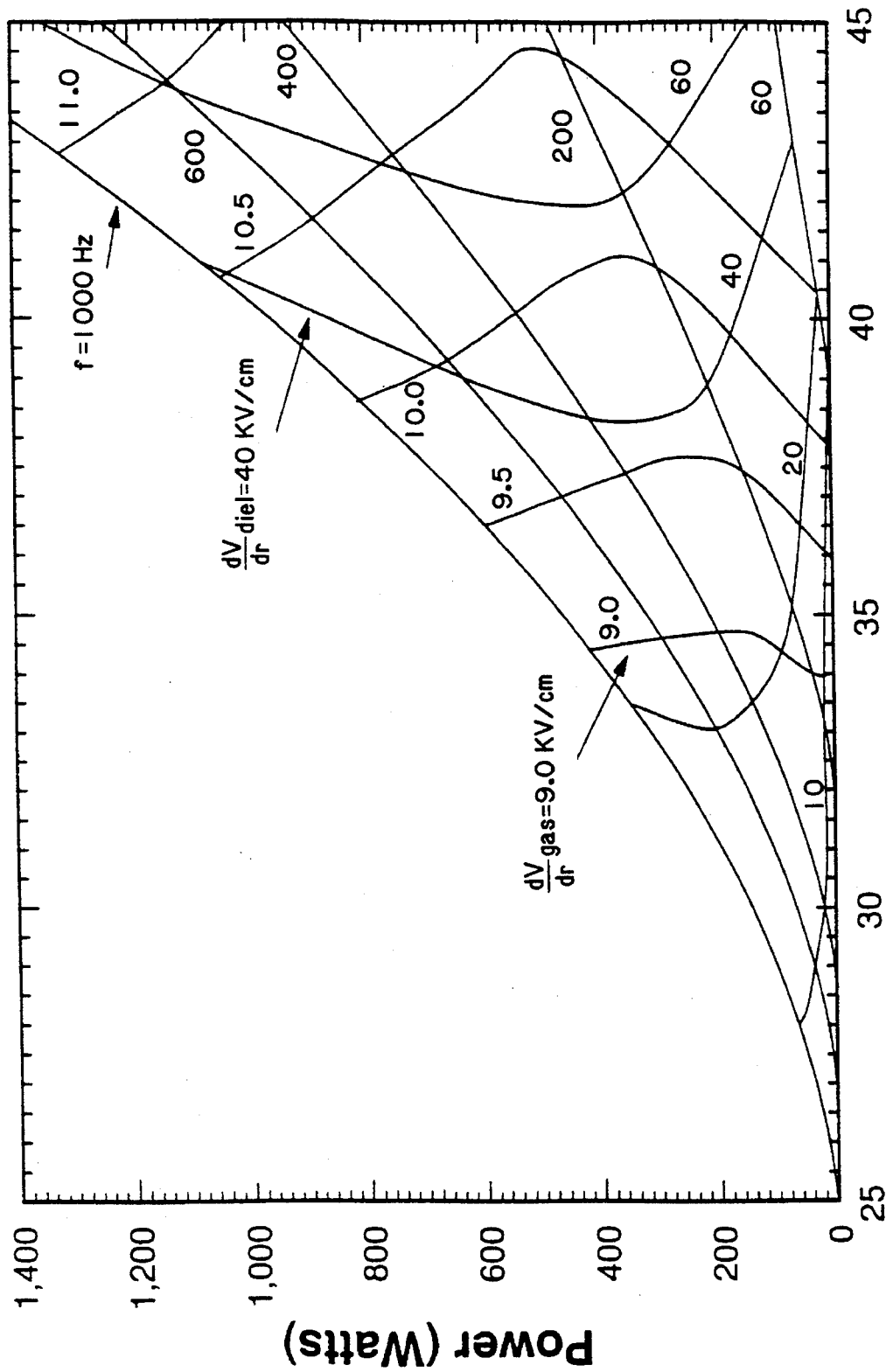

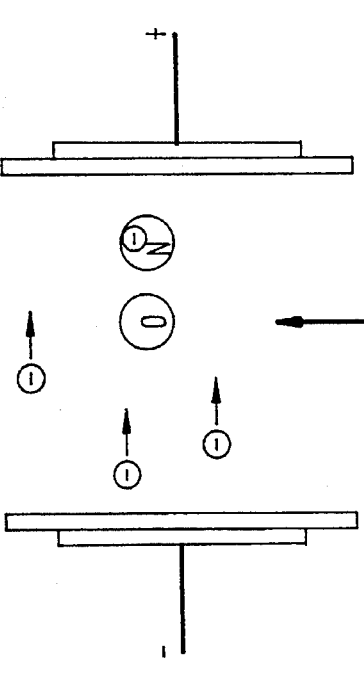
FIG. 5(b) ELECTRON INCORPORATION
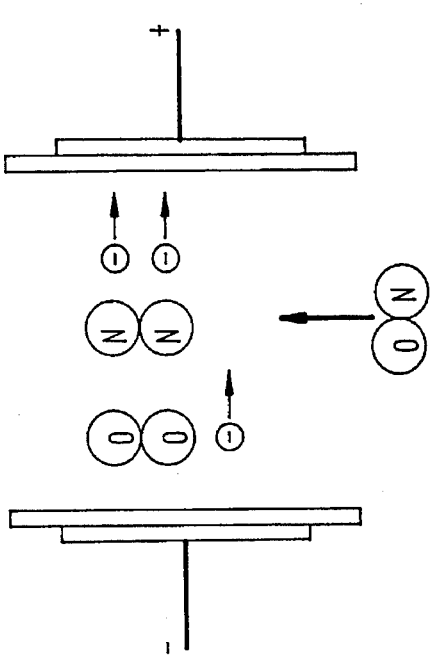
FIG. 5(d) REDUCTION COMPLETE
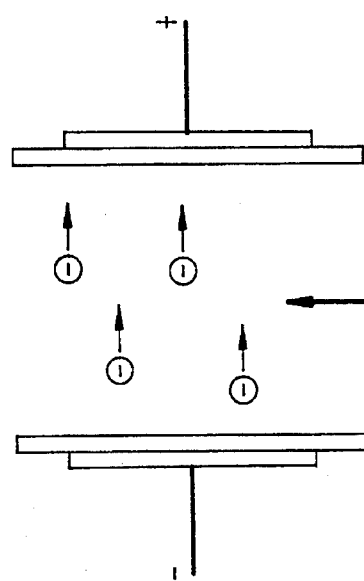
FIG. 5(a) NO ENTERING CORONA
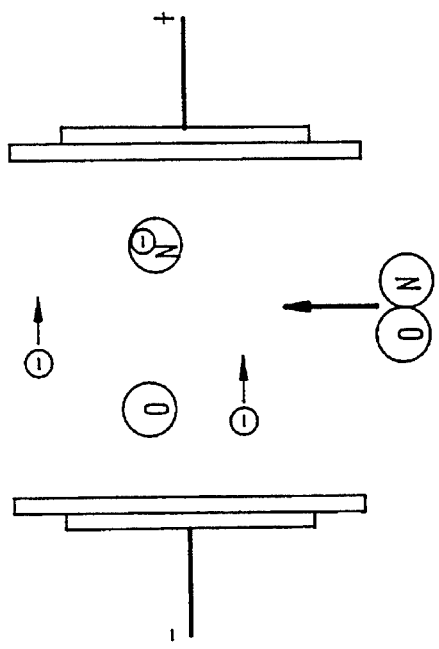
FIG. 5(c) DECOMPOSITION

CORONAL-CATALYTIC APPARATUS AND METHOD FOR NO$_x$ REDUCTION

This application is a continuation in part of application Ser. No. 08/093,998, filed Jul. 19, 1993, now abandoned, which is a continuation of Ser. No. 07/824,596, filed Jan. 23, 1992, now U.S. Pat. No. 5,240,575 issued Aug. 31, 1993, which is a continuation of application Ser. No. 07/555,561 filed Jul. 19, 1990, now U.S. Pat. No. 5,147,516, issued Sep. 15, 1992.

FIELD OF THE INVENTION

This invention presents an NO$_x$ environment effective reduction apparatus comprising a sulfur tolerant, high water vapor (about 3% to about 18%) tolerant, packing-free coronal-catalyst. In one embodiment the invention comprises an NO$_x$ reduction apparatus of high water vapor tolerant coronal-catalyst adapted and configured for hypercritical presentation to an NO$_x$ bearing gas stream at a minimum of at least about 75 watts/cubic meter, and optionally, accompanying downstream scrubbers. In a particular embodiment, downstream wet or dry absorption arrest particular NO$_x$ reduction products NO$_2$ and HNO$_3$, optionally upon exposure to arresting agents, including basic, caustic, or alkali materials such as CaO or NH$_i$. By the present apparatus and method, sulfur compounds (including SO$_2$, H$_2$S, CH$_3$SH, CH$_3$S$_2$CH$_3$, etc.) contained in flue or off gas will be removed, mainly in the form of H$_2$SO$_4$. As a particular advantage, the nitrogenous by-products and H$_2$SO$_4$ may be collected in industrial quantities.

BACKGROUND OF THE INVENTION

Millions of tons of nitrogen oxides, (denoted, generally herein as "NO$_x$"), are emitted into the atmosphere each year as a result of high temperature combustion of fossil fuels. Nitrogen oxides have been cited as major contributors to acid rain, by some estimates being about one-third of the acid contribution. Thus global interest has been focused on development of practical apparatus and methods to reduce the entry of nitrogen oxides into the atmosphere.

Since the first part of this century, developmental efforts have been directed to convert nitrogen oxides to the individual elemental diatoms, N$_2$ and O$_2$. Yet despite the lengthy search, no previous investigator has succeeded in devising a large scale procedure that does not require introduction of an exogenous reducing agent such as NH$_3$, CH$_4$, or CO. Alternatively, the use of electron beam (e-beam) irradiation, electrical discharge irradiation, and light (laser or flash) has been unsuccessfully attempted.

Previous investigation on chemical reactions in electrical discharge includes the work of Joshi in the 1920s (NO$_2$ and N$_2$O decomposition/electron movement between glass walls in AC discharge), Visvanathan in the 1950s (NO decomposition in electric charge). Others looking at the general conditions of electric/chemical reactions include Brewer and Westhaver (*J. of Phys. Chem.;* 33:883 (1929)), Lacoste, G. and Bess, R (*Rev. Chim. Minerale;* 11:14 (1974)), Bess, R. (*Rev. Phys. Appl.;* 12:1029 (1977)). A more comprehensive presentation of the previous work in nitrogen oxide control is presented in *A Unified Projection of the Performance and Economics of Radiation-Initiated NO$_x$/SO$_x$ Emission Control Technologies,* Person et al. Dept. of Energy Contract No. DE-AC22-84PC70259 (1985), the teachings of which are incorporated herein by reference. Particular note is made of the following, "An Advanced Corona Discharge NOx Control System," Ronald W. Breault, Frederick E. Becker, V. K. Mathur, Christopher McLarnon, Jeff Chini, AIChE Spring National Meeting, Session 99: Contaminants Removal From Gas II, New Orleans, La. (1992); "Reaction Gas Kinetics for Flue Gas, Gas Treatment of NOx", Ronald W. Breault, Christopher McLarnon, V. K. Mathur, NATO Advanced Research Workshop on Non-Thermal Plasma Techniques for Pollution Control (Cambridge University, England, Sep. 21–25, 1992); "The Tecolytic™ Process. An Advanced NOx Control System", Ronald W. Breault, V. K. Mathur, Christopher McLarnon, Jeff Chini, International Gas Research Conference (Orlando Fla., Nov. 16–19, 1992), the teachings of which are incorporated herein by reference.

Other works on electro-catalysts take a position directly opposite from the instant invention. Such are those of van den Bleek, et al., (*I. Chem. E. Symposium Series,* U. of Salford (1979)) stating that efficiency of nitrogen oxide reduction is improved when catalytic surfaces are able to donate an electron to the oxide, and Wooten and Mangold (U.S. Pat. No. 3,562,127 (1971)) (using gold plated, i.e. conductive, metal wool) and reporting augmented nitrogen reduction only when gold is used.

The instant inventive apparatus and method overcomes the problems previously encountered in the art. This invention employs a novel concept based on recognizing chemical reactions occurring in gaseous electrical discharge as distinct from reactions that result when equally energetic electrons are made to travel on metal surfaces.

SUMMARY OF THE INVENTION

This invention features an NO$_x$ environment effective reduction apparatus and method comprising a sulfur tolerant, high water vapor (about 3% to about 18%) tolerant, packing-free coronal-catalyst. In one embodiment the invention comprises an NO$_x$ reduction apparatus of high water vapor tolerant coronal-catalyst adapted and configured for hypercritical presentation of an electrical field to an NO$_x$ bearing gas stream, the electrical field having a minimum field power density of at least about 75 watts/cubic meter. Optionally the apparatus is activatable by voltage from about 4000 to about 30,000 volts, said voltage having a frequency of from 60 Hz to about 30,000 Hz; and the flowing NOx bearing gas has a residence time in said packing-free coronal catalyst of from about 0.2 to about 5 seconds or more.

The packing free coronal-catalyst of the apparatus reduces NO$_x$ concentration of an NO$_x$ bearing gas stream variously by at least 40%, 50%, 60%, 70%, 80%, 90%, and, preferably, by about 98% and more preferably by about 99.4% (i.e., volume %). In alternate embodiment, the apparatus further includes a gas addition means for adding a gas such as oxygen and CO to an NO$_x$ bearing gas stream so NO$_x$ reduction of the NO$_x$ bearing gas stream by said packing-free coronal catalyst is increased. Addition of oxygen to the NO$_x$ bearing gas stream can result in reductions in NO$_x$ concentration of at least 90% and preferably about 95%.

An alternate NO$_x$ environment effective reduction apparatus comprises a sulfur tolerant, high water vapor (about 3% to about 18%) tolerant packing-free coronal catalyst in connection with a N/S scrubber where the effluent or discharge from the coronal catalyst is introduced to the N/S scrubber. The coronal catalyst is adapted and configured for hypercritical presentation of an electrical field to an NO$_x$ bearing gas stream, where the electrical field has a field power density of at least about 75 watts/cubic meter. Optionally, the apparatus is activatable by voltage from about 4000 to about 30,000 volts, said voltage having a frequency of from 60 Hz to about 30,000 Hz; and the flowing NOx bearing gas has a residence time in said packing-free coronal catalyst of from about 0.2 to about 5 seconds or more.

The packing free coronal-catalyst of the alternate embodiment reduces $NO_x$ concentration of an $NO_x$ bearing gas stream variously by at least 40%, 50%, 60%, 70%, 80%, 90%, and, preferably, by about 98% and more preferably by about 99.4% (i.e., volume %). The apparatus of the alternate embodiment further includes a gas addition means for adding a gas such as oxygen and CO to an $NO_x$ bearing gas stream so $NO_x$ reduction of the $NO_x$ bearing gas stream by said packing-free coronal catalyst is increased. Addition of oxygen to the $NO_x$ bearing gas stream can result in reductions in $NO_x$ concentration of at least 90% and preferably about 95%.

In a particular embodiment an $NO_x$ environment effective reduction apparatus, includes first and second electrodes that are spaced from each other and arranged in a predefined pattern and a power supply for applying a prespecified voltage across said first and second electrodes. The prespecified voltage being applied is sufficient to establish a supra-arc voltage arc-free zone. The zone is defined by the applied voltage and the electrodes' spacing and arrangement. This supra-arc voltage arc-free zone is sulfur tolerant and high water vapor (about 3% to about 18%) tolerant.

The apparatus of this embodiment also includes a gas control means for controlling the flow of a $NO_x$ bearing gas stream so the gas stream flows through the supra-arc voltage arc-free zone to reduce the gas stream's $NO_x$ concentration. Optionally the supra-arc voltage arc-free zone is an electrical field having a field power density at from at least about 75 watts/meter$^3$. Preferably, the prespecified voltage is in the range of from about 4000 to about 30,000 volts; the voltage has a frequency of from 60 Hz to about 30,000 Hz; and the gas control means controls the flow of the $NO_x$ bearing gas so the gas stream has a residence time in the supra-arc voltage arc-free zone of from about 0.2 to about 5 seconds or more.

In this embodiment, passage of the $NO_x$ bearing gas stream through the supra-arc voltage arc-free zone reduces variously the gas stream's $NO_x$ concentration by at least 40%, 50%, 60%, 70%, 80%, 90%, and, preferably, by about 98% and more preferably by about 99.4% (i.e., volume %). As described hereinafter, controlling the applied voltage and the gas stream flow controls the reduction of the $NO_x$ within the supra-arc voltage arc-free zone. In an alternate embodiment, the apparatus further includes a gas addition means for adding a gas such as oxygen or CO to an $NO_x$ bearing gas stream to increase $NO_x$ reduction of the gas stream by the supra-arc voltage arc-free zone. The addition of oxygen to the $NO_x$ bearing gas stream will result in reductions in $NO_x$ concentration of at least 90% and preferably about 95%.

Preferably, the above described apparatus further includes a dielectric material disposed between said first and second electrodes so the supra-arc voltage arc-free zone is disposed between said dielectric material and one of said electrodes. The dielectric material is quartz, pyrex glass, alumina, mullite or other dielectric materials known in the art. In one embodiment, the dielectric material is applied to or disposed about the first electrode. In this embodiment, the $NO_x$ bearing gas stream is directed to flow between the dielectric and the second electrode (i.e., gas does not substantially flow between the first electrode and the dielectric).

Optionally the dielectric is disposed about the second electrode (e.g., the inner surface of the outer electrode for a tubular reactor) to form a barrier between the first and second electrodes. Alternatively, both electrodes are provided with a dielectric material barrier. In the alternate embodiment, the gas stream is directed so it flows between the opposing dielectric surfaces.

In yet another embodiment, either of the above apparatuses include downstream wet or dry absorption arrest particular $NO_x$ reduction products $NO_2$ and $HNO_3$, optionally upon exposure to an arresting agent, including basic, caustic, or alkali materials such as CaO or $NH_3$. This embodiment permits recovery of nitrogenous and $H_2SO_4$ materials found in the gas stream exiting an apparatus of the present invention.

A method of environment effective reducing of $NO_x$ emissions includes the step of exposing $NO_x$ bearing gas to a sulfur tolerant coronal-catalyst wherein said coronal-catalyst is adapted and configured for hypercritical presentation of an electrical field to an $NO_x$ bearing gas stream where the electrical field has a minimum field power density of at least about 75 watts/meter$^3$. Optionally the method further includes disposing said coronal-catalyst in from one to a plurality of tubular members configured and adapted to receive a flow of $NO_x$ bearing gas; maintaining the coronal-catalyst at a field power density of at least about 75 watts/meter3; and/or applying voltage to said apparatus activatable by voltage from about 4000 to about 30,000 volts, where the voltage has a frequency of from 60 Hz to about 30,000 Hz; and maintaining residency of said flow of $NO_x$ bearing gas in said tubular members of from about 0.2 to about 5 seconds or more.

The method reduces $NO_x$ concentration of an $NO_x$ bearing gas stream variously by at least 40%, 50%, 60%, 70%, 80%, 90%, and, preferably, by about 98% and more preferably by about 99.4%. In alternate embodiments, the method further includes adding a gas such as oxygen or CO to the $NO_x$ bearing gas stream to increase $NO_x$ reduction of the gas stream in the packing-free coronal catalyst. Addition of oxygen to the $NO_x$ bearing gas stream can result in reductions in $NO_x$ concentration of at least 90% and preferably about 95%.

The method further comprises the step of N/S scrubbing the $NO_x$ bearing gas stream that was exposed to the packing-free coronal catalyst. The step of N/S scrubbing includes the steps of treating the exposed $NO_x$ bearing gas stream to obtain the $H_2SO_4$ and nitrogenous reduction products and collecting the $H_2SO_4$ and nitrogenous reduction products.

Also disclosed is a methodology for determining optimal electrode configuration and operating parameters to increase and maximize $NO_x$ and sulfur reduction capability for a given application. For a given electrode configuration, reduction capability is generally optimized when the frequency and voltage being applied maximizes the volume of the coronal catalyst and the power input to the catalyst without establishing an arcing condition (i.e., supra-arc voltage arc-free). The volume of the coronal catalyst coverage is about at least 2% of the total gas space volume, and is preferably at least about 5% of the total gas space volume and further at least about 7%. Optionally, $NO_x$ reduction capability is optimized by adjusting resident time of the gas being treated, by adding a gas, such as oxygen and CO, to the gas stream being treated, by using higher dielectric barrier materials for an electrode configuration, and/or by using a different voltage source to establish the electrical field of the coronal catalyst. For example, if the power source is fixed (e.g., household AC line voltage) then higher dielectric barrier materials are used to maximize the volume of the coronal catalyst.

BRIEF DESCRIPTION OF THE DRAWINGS

FIG. 3(a) is a graph of the electrical field distribution of a tubular coronal catalytic reactor as a function of radius when the voltage being applied has a frequency of 200 Hz.

FIG. 3(b) is a graph of the electrical field distribution of a tubular coronal catalytic reactor as a function of radius when the voltage being applied has a frequency of 1000 Hz.

FIG. 3(c) is a three dimensional (3-D) plot of the electrical field distribution in the gas space of a tubular coronal catalytic reactor as a function of both the reactor radius and the frequency of the applied voltage;

FIG. 3(d) is a plot of the ratio of corona volume to power versus voltage for applied voltages at different frequencies.

FIG. 3(e) is a plot of reactor power versus applied peak voltage at different frequencies.

FIGS. 5(a)–5(d) depict the hypothetical steps of a coronal catalyzed reaction.

DETAILED DESCRIPTION OF THE INVENTION

Figure 1:
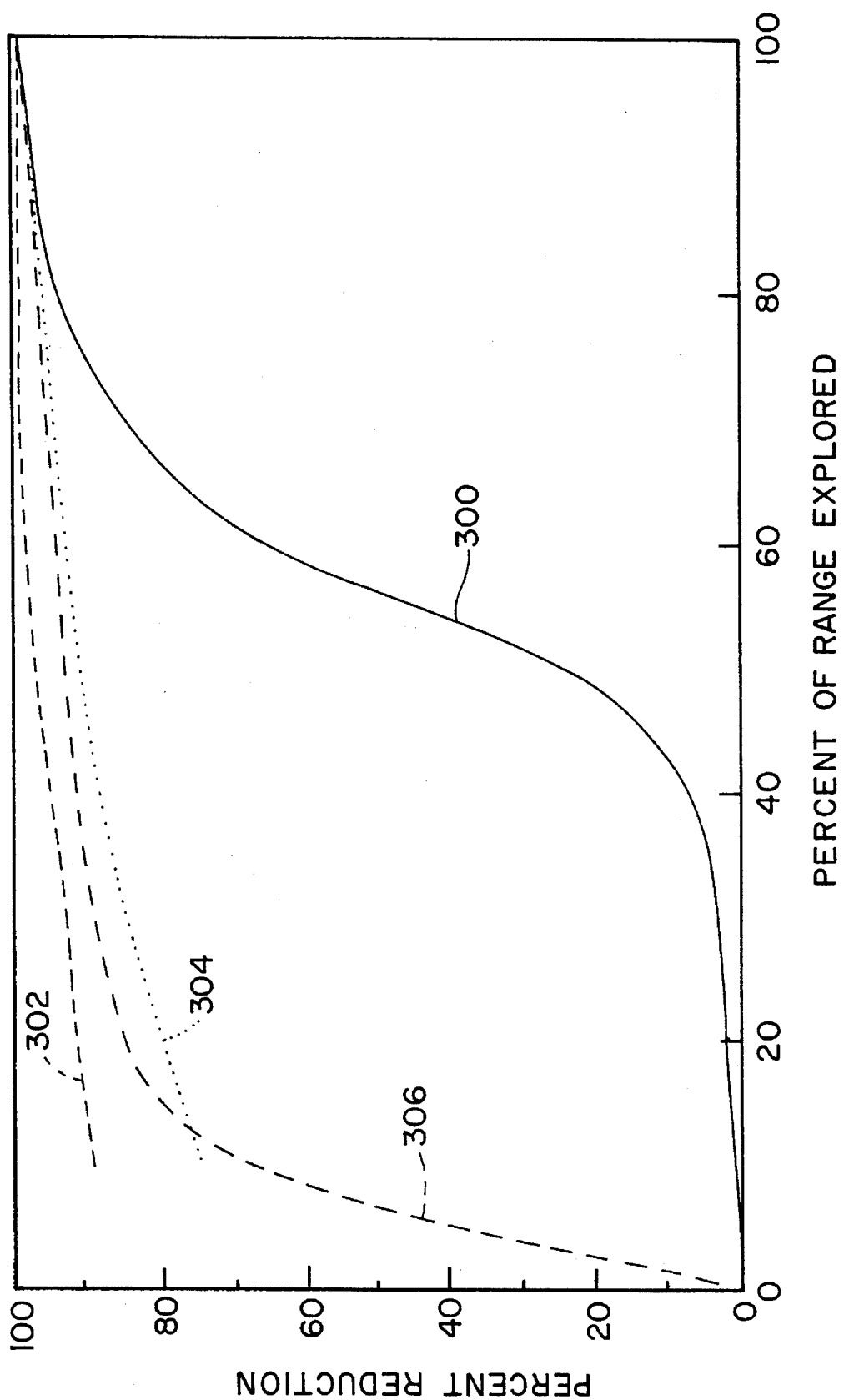
FIG. 1 is a plot of the percentage of NOx reduction against the variables oxygen content, frequency, power, and voltage by percentage of range explored.

The instant invention is most clearly understood with reference to the following definitions:

"Water tolerant" shall be understood to mean greater than about 3% water vapor tolerant. In particular embodiments water tolerance will include water vapor greater than about, variously, 7%, 10% and 15% water tolerant, and about 5 to about 18% water tolerant. "Tolerant" refers to a coronal catalyst having a loss of efficacy in NOx removal of no more than about 20% the efficacy experienced in reducing nitrogen and sulfur oxides in flue gas containing about 2% water vapor. In particular embodiments the loss will be, variously, less than about 10%, and less than about 5%. Due to the unique aspects of this invention, in some instances, water vapor will increase in efficacy in $NO_x$ removal of about 5%, 10% or even up to about 20%.

"Sulfur tolerant" shall mean not more that about 10% reduction in efficiency under conditions of either (i) 40 ppm sulfur/gm of catalyst, or (ii) a molar ratio of $SO_2$ to NO equal to or less than about 1.

"N/S Oxide" refers to oxides of nitrogen and sulfur including, NO, $HNO_3$, $SO_2$, $NO_2$, $N_2O_4$, $H_2SO_4$, $H_2S$, $CH_3SH$, $CH_3S_2CH_3$, etc.

"Coronal-catalyst" shall mean those catalysts which are not substantially surface area dependent as to catalytic activity. A coronal-catalyst is defined by an environment having dispersed electron charge or electrical field, with a flow of electrons through a gas thereby enhancing electron density of the flow path. Thus, such charge dispersion and electron concentration augments electron-molecule collision as compared to molecular-molecular collision. This is represented in FIGS. 5(a)–(d). Flow of electrons at high velocity and in high density in a coronal-catalyst is seen to increase likelihood of an NOx reduction producing collision.

Typically, a coronal catalyst is a result of the enhancement of an electron field established between two electrodes characterized in being arc-free at a supra-arc voltage ("supra-arc voltage arc-free"). FIGS. 3(a)–(c) provide graphic representations of zones which are supra-arc voltage arc-free.

"Supra-arc voltage arc-free" shall mean a voltage, when applied across a gas disposed between two electrodes of an apparatus of this invention, that:

(i) is at least sufficient to establish an electrical field in an area open to gas to be treated where such field strength equals or exceeds the critical field strength value for the gas being treated; but, (ii) is less than that voltage which establishes an electrical field throughout said gas (i.e., all of the gas between the two electrodes) whose field strength equals or exceed the critical field strength for the gas.

In any dielectric material there exists a critical field strength that represents the point where the dielectric material breaks down and becomes conductive. In a gas the result of reaching the critical field strength is an electrical discharge. When the field strength being developed drops below the critical value at some point in the gas (i.e., before reaching the other electrode), then the gaseous discharge is a low energy corona and is arc-free. However, if the field strength of the electrical field established throughout the gas between the two electrodes is above the critical field strength value, the electrical discharge is then in the form of an arc.

FIGS. 4(a)–(e) and FIGS. 6(a)–(g) represent some of the embodiments of electrode arrangement and solid dielectric material arrangement wherein the solid dielectric material is disposed between electrodes of the present apparatus. In the embodiments where a non-gaseous dielectric material is used, the voltage of primary concern is that being applied between the surface of the dielectric and the surface of an electrode that is not shielded by solid dielectric. In some embodiments, the dielectric material is solid dielectric material useful in the subject invention. These non-gaseous dielectric materials display a critical field strength breakdown point significantly greater than that for the gas being treated. As such, the gas becomes conductive well before the non-gaseous (including solid) material.

In some alternate embodiments, both electrodes are provided with a dielectric material that separates the electrode from the space open to the gas to be treated. For these embodiments, the voltage of concern is that being applied between the opposing surfaces of the dielectric materials.

Electrode arrangements are capable of being modeled mathematically to predict the power consumed in the corona discharge, and to characterize various parameters controlling the discharge, so that particular electrode arrangements may be optimized. For example, the electrode arrangement shown in FIG. 4(b) is modeled as an electrical circuit consisting of two capacitors ($C_1$, $C_2$) and a resistor ($R_1$). The second capacitor $C_2$ and the resistor $R_1$ are in parallel to each other and both are connected in series to the first capacitor $C_1$. The first capacitor $C_1$ is representative of the glass dielectric barrier formed about the inner electrode. The parallel second capacitor $C_2$ and resistor $R_1$ are representative of the gas space disposed between the dielectric barrier and the outer electrode.

The above model is based on the assumption that the representative electrical circuit is described in terms of pure capacitive and resistive elements; that the circuit characteristics do not effect the input voltage waveform; that the gas has an infinite resistance prior to the onset of a corona; and that the gas takes on a finite value of resistance after initiating a corona. The model also assumes that an AC high voltage from about 10 to about 35 kV RMS at frequencies ranging from about 60 to about 1000 Hz is applied to the center electrode while the outer electrode is held at ground, and that the AC voltage being applied has a sinusoidal waveform.

For this electrical circuit model the reactance of each circuit element is given by the following relationships:

$$X_{c1} = -\frac{\ln b/a}{2\pi\epsilon_0 \omega k_1 l}$$

$$X_{c2} = -\frac{\ln c/b}{2\pi\epsilon_0 \omega k_1 l}$$

$$R_3 = -\frac{\rho \ln c/b}{2\pi l}$$

where:
a is the radius of the center electrode,
b is the radius for the outer surface of the dielectric barrier,
c is the radius for the outer electrode,
l is the length of the electrode arrangement or reactor,
$X_{c1}$ is the capacitive reactance of the glass barrier,
$X_{c2}$ is the capacitive reactance of the gas space,
$R_3$ is the resistance of the gas space (Ohms),
f is the frequency of the applied voltage (Hz),
$k_{1,2}$ are the dielectric constants of the glass barrier and gas space respectively,
$\epsilon_0$ is the permittivity of free space ($8.854 \times 10^{-12}$ $C^2/N\ m^2$),
$\omega$ is the angular frequency (2 $\pi f$ radians/sec.),
$\rho$ is the resistivity of the gas (Ohms cm), and
$\phi$ is the phase angle (radians).

The current through the circuit is given by the relationship:

$$\bar{I} = \frac{V}{jX_{c1} + \frac{jX_{c2}R_3}{jX_{c2} + R_3}}$$

where:

$$V = V_{max}\sin(\omega t + \phi)$$

As indicated above before the onset of the corona the resistance of the gas is essentially infinite resulting in a purely reactive circuit with the phase shift ($\phi$) between the voltage and current equal to 90°. The current in the circuit before the onset of the corona is given by the following relationship.

$$I = \frac{2\pi l k_1 k_2 \epsilon_0 \omega v_{max}\sin(\omega t + \pi/2)}{k_2 \ln b/a + k_1 \ln c/b}$$

After the onset of the corona the resistivity of the gas is a function of the difference between the voltage at the outer surface of the glass barrier ($V_2$) and the voltage required for corona initiation ($V_{2,c-0}$). The resistance of the gas, the current through the circuit, and the phase angle are given by the relationships:

$$\rho = \frac{2\pi V_2 \delta\, c^2}{k^* (V_2 - v_{2,c-0})^2 \ln c/b}$$

$$I = \frac{\left(\frac{1}{\epsilon_0 \omega} + k_2^2 \rho^2 \epsilon_0 \omega\right) 2\pi l V_{max} \sin(\omega t + \phi)}{\left[\left(\frac{\rho \ln c/b}{\epsilon_0 \omega}\right)^2 + \left[\frac{\ln b/a}{k_1 \epsilon_0^2 \omega^2} + k_2^2 \rho^2 \left(\frac{\ln b/a}{k_1} + \frac{\ln c/b}{k_2}\right)\right]^2\right]^{1/2}}$$

$$\phi = \tan^{-1}\left[\frac{\ln b/a}{k_1 \ln c/b}\left(\frac{1}{\epsilon_0 \omega \rho} + k_2^2 \epsilon_0 \omega \rho\right) + k_2 \epsilon_0 \omega \rho\right]$$

where:
$k^* = 2.2 \times 10^{-12}$ amp-cm/volt$^2$, and
$\delta$ = temperature correction factor (530/T+460).

The voltage ($V_{c-0}$) and phase angle ($\omega t_{c-0}$) at which corona initiation takes place are given by the following relationships.

$$V_{c-0} = V_{max} \sin(\omega \bar{t}_{c-0} + \phi)$$

$$\omega t_{c-0} = \cos^{-1}\left[-\left(\frac{300}{F}\right)^{.16}\left(\frac{30,000\delta b + 9000\sqrt{\delta b}}{V_{max}}\right)\left(\frac{k_2 \ln b/a}{k_1} + \ln c/b\right)\right] - \frac{\pi}{2}$$

The model is used to provide several parameters involved in the design of the electrode arrangement for a coronal catalytic reactor. In addition to the power consumed, the model predicts maximum voltage gradients in the glass barrier and the gas space for differing configurations of the electrode arrangement and for differing conditions. These predicted values are then compared with the maximum allowed gradients before breakdown of the glass or arcing in the gas space occurs.

Figure 7:
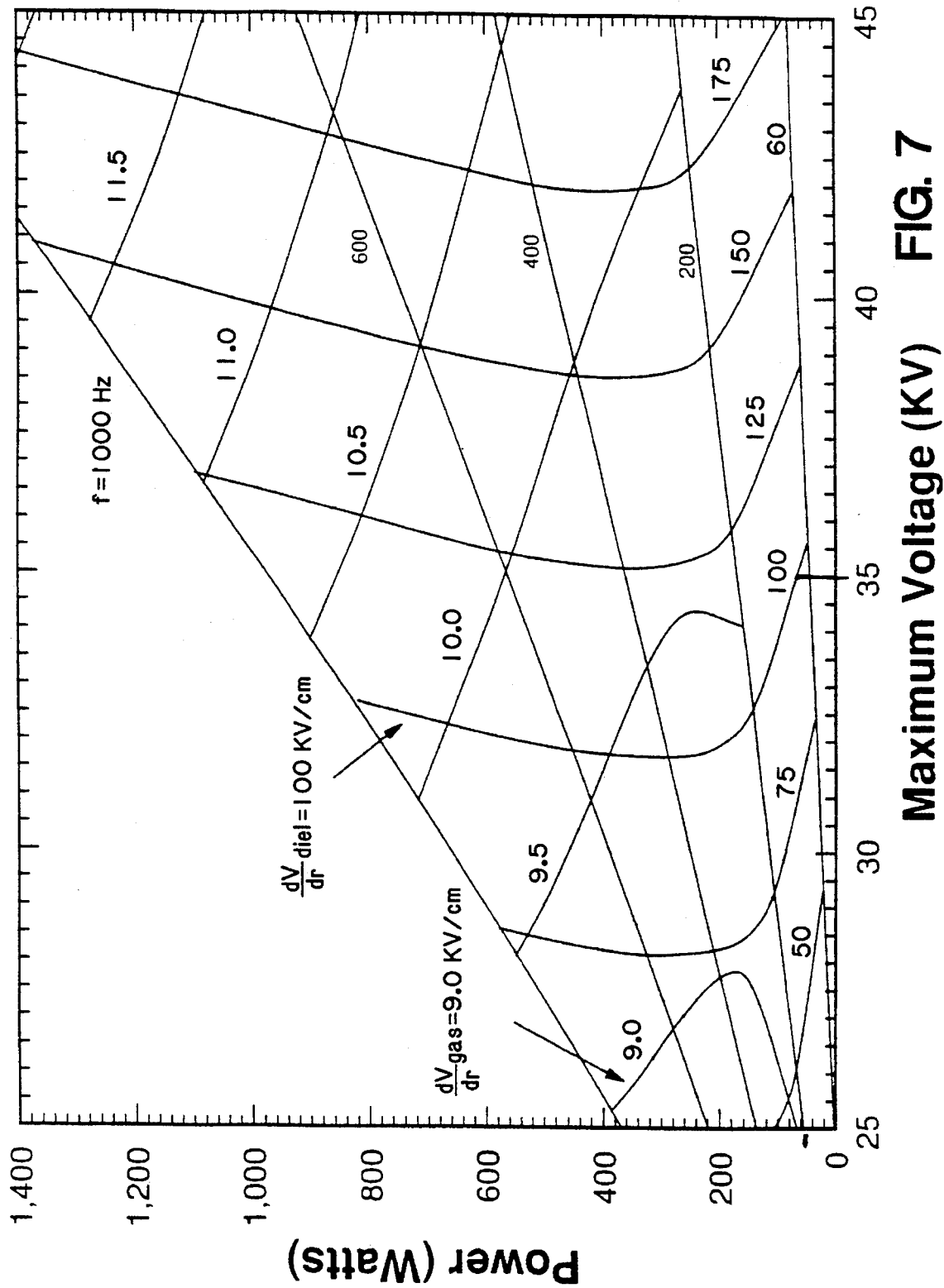
FIG. 7 is a graph of the power consumed and the voltage gradients in the glass dielectric barrier and the gas space for varying voltages and frequencies.

From the foregoing relationships it is seen that the power input to the corona and the reactor is primarily a function of the length of the electrode assembly of a reactor, the applied voltage and the frequency of the applied voltage. By increasing the frequency of the voltage applied, a greater power may be inputted to a reactor for a given applied voltage and reactor geometry. The spacing of the inner and outer electrodes also effects the voltage at which corona initiation takes place (e.g., decrease the spacing decreases the voltage). FIG. 7 presents the power consumed and the voltage gradients in the glass dielectric barrier and the gas space for varying voltages and frequencies applied to a typical reactor electrode configuration operating at 220° F.

Figure 8A:
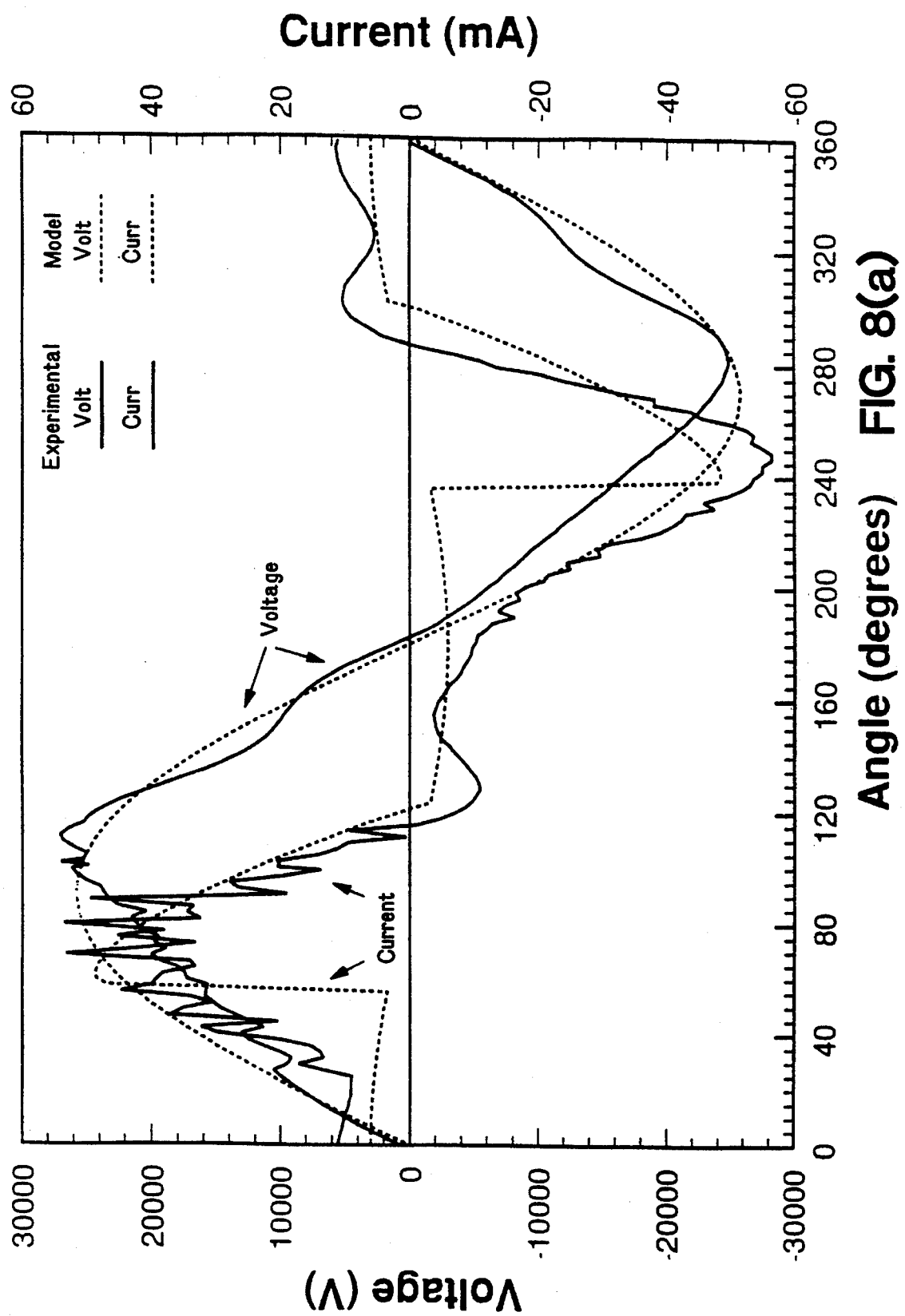
FIG. 8(a) is a graph comparing the predicted and experimental voltage and currents for one coronal-catalytic reactor configuration.
Figure 8B:
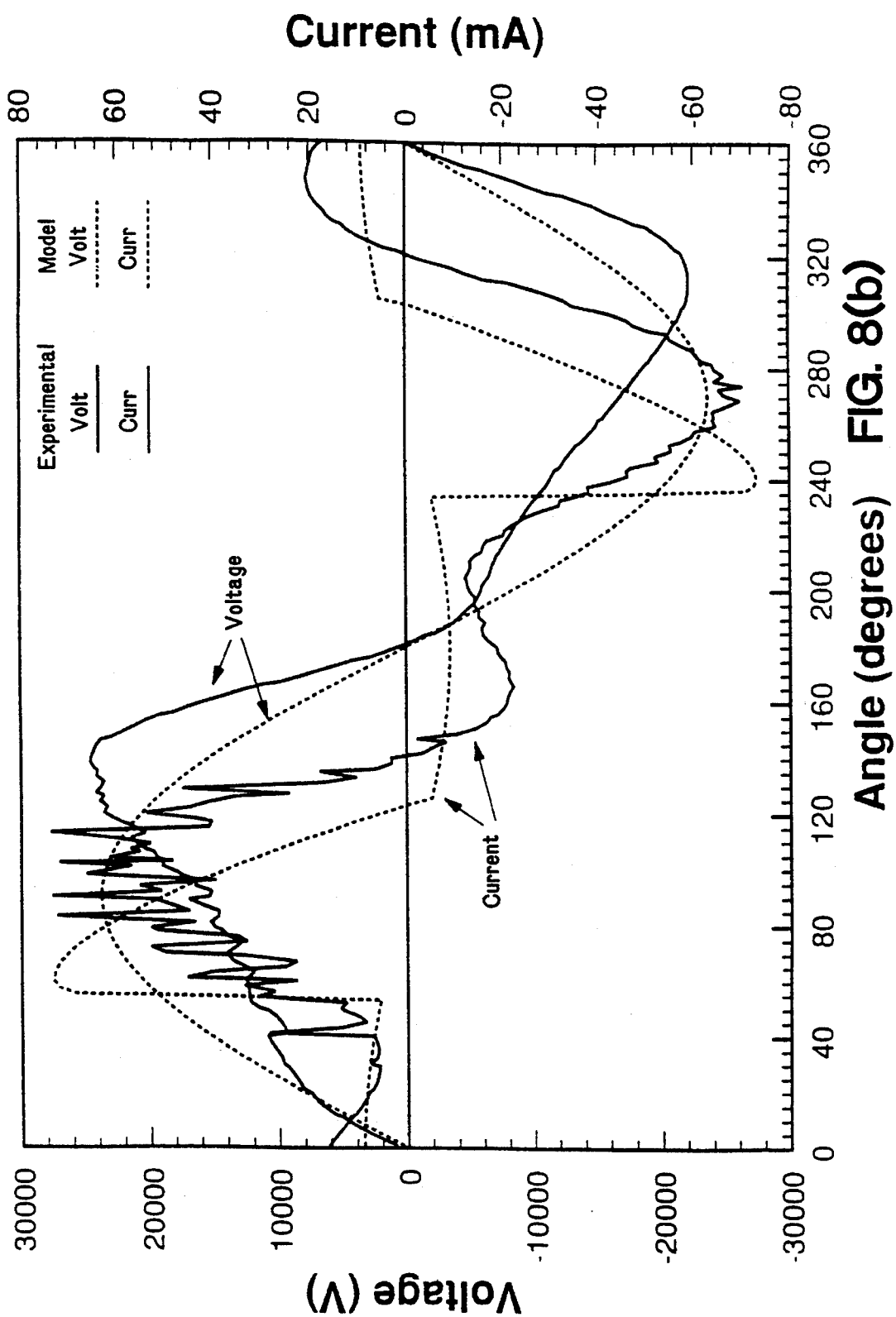
FIG. 8(b) is a graph comparing the predicted and experimental voltage and currents for another coronal-catalytic reactor configuration.
Figure 8C:
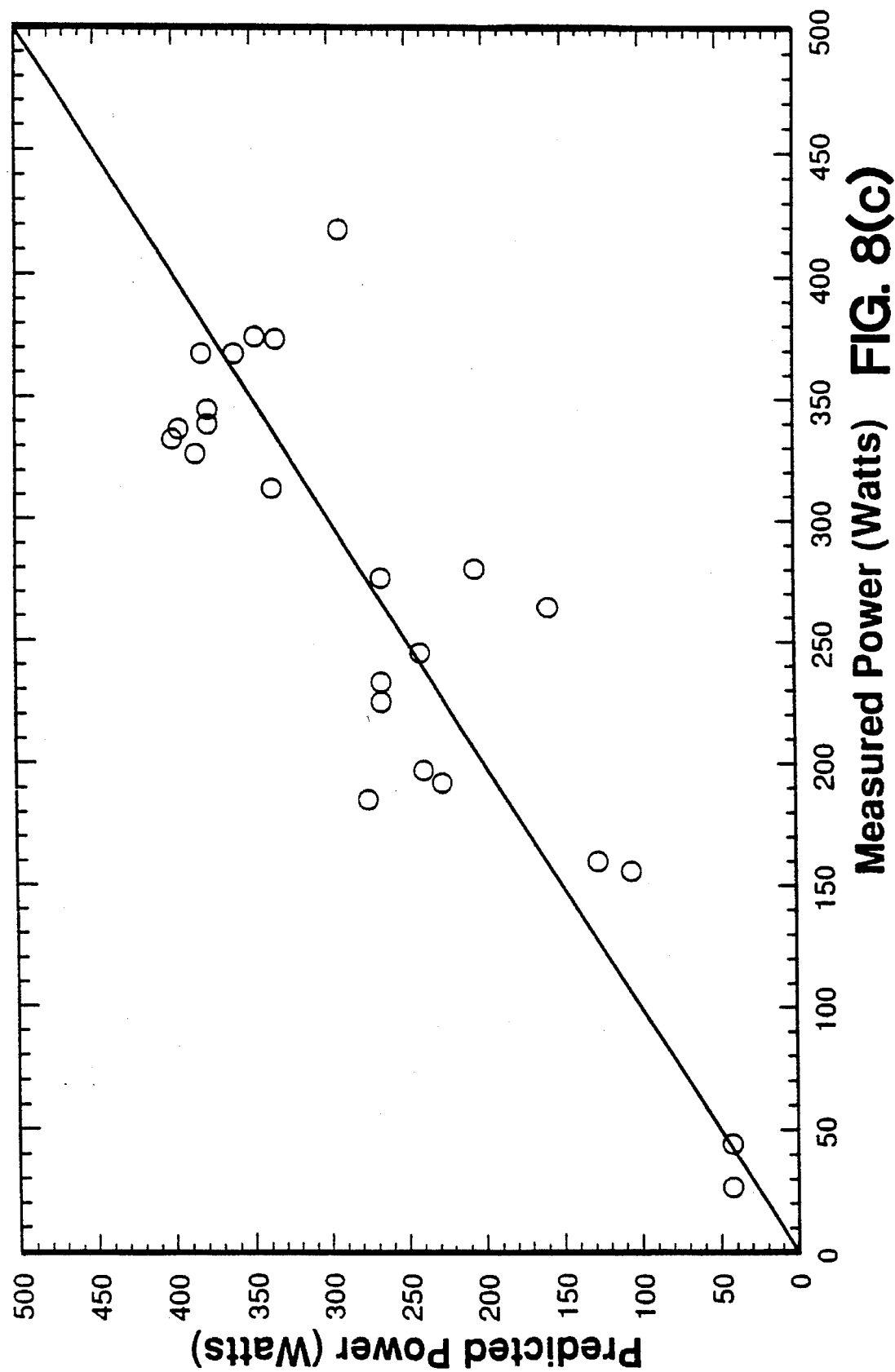
FIG. 8(c) is a plot of the predicted versus measured power for several coronal-catalytic reactor operating conditions.

A comparison of the predicted and experimental voltage and currents for two different coronal catalytic reactor configurations is shown in FIGS. 8(a),(b). The figures show good agreement between the calculated and experimentally measured values of current with the largest deviations due to the difference between sinusoidal voltage used in the model and the actual voltage applied to the reactor. FIG. 8(c) also provides a plot of the predicted versus measured power for several reactor operating conditions.

In this way, the model is used to determine if under normal operating conditions, the voltage being applied to a given electrode arrangement will cause the glass barrier to breakdown electrically and/or establish an electrical field throughout the gas space above the critical field strength so that arcing occurs. It should be recognized that the system is recoverable from transient gas space conditions where the gas space becomes conductive momentarily and an arc occurs. The gas space can become momentarily conductive if, for example, a large burst of water vapor or a large effluent particulate (e.g., ash or a cinder) is in the gas stream passing between the electrodes. In such a case, the system reestablishes the corona after arcing and the process continues. With solid electrodes, arcing could break a glass tube type dielectric. In a multiple stack array, a few individual tube failures would not substantially compromise total system performance, particularly if the array permitted cross-flow of gas, as shown in FIG. 4 and as discussed in connection with FIGS. 6(a)–(d). Alternatively, a dielectric arrangement of a "reformable" dielectric, such as glass powder contained in a barrier, would not suffer permanent breakdown from an arc.

In the practice of this invention as directed to flue or off gas (collectively, "flue gas"), the flue gas is directed to flow through an area of high electron density by flow channeling devices such as tubes. Frequently such tubes are fashioned to include material having a high dielectric. In previously disclosed instances, additional high dielectric material such as glass wool packing is placed in such tubes. However, under conditions where the flue gas flowing through the tubes has a high water content, the glass wool becomes hydrated, and hence of drastically reduced dielectric (at the surface), to the point of conducting electricity, and, thus, adversely affect the electron performance. In such instances, a packing-free coronal-catalyst is required. In a limiting case, a packing-free coronal catalyst comprises an electrode covered with a high dielectric material essentially a single filament, within a flow concentrating device (e.g., a tube), and electrode outside of the flow concentrating device.

"Zone" as used in relation to a "supra-arc voltage arc-free zone" shall mean that cross sectional area of the gas space where the voltage being applied across the electrodes is sufficient to establish an electrical field having a field strength above the critical field strength value, but not so high as to establish a condition conducive to sustained arcing between the electrodes. Clearly, depending on the varying make up of flue gas, infrequent or intermittent arcing is a possibility that does not exclude a zone or area from the "arc-free" designation. Reference should be made to FIGS. 3(a)–(c) and the discussion thereto for further details regarding supra-arc voltage arc-free zones.

It is specifically understood that virtually any configuration of electrodes is considered within the ambit of this invention. By way of example, and referring to FIGS. 6(a)–(g), a wire or rod type electrode within, though potentially eccentric, a high dielectric tube is contemplated, as well as a wire or rod type electrode without the high dielectric tube. Alternatively coaxial conductive tubes are contemplated, a "fence" of electrodes of alternate polarity with each electrode encased in a high dielectric material is also contemplated.

"Critical field strength" shall mean that voltage at which the material under the influence of the voltage breaks down and becomes electrically conductive.

"Short rise time" refers to a wave form rise time to peak voltage of less than about 100 nanoseconds, and particularly in the range of about 0.1 to about 100 nanoseconds, and particular about 1 to about 50 nanoseconds.

"High Dielectric" refers to a dielectric constant approximately of glass about 4—or about 100 or beyond (i.e., $TiO_2$).

"Environment effective" shall mean reduction of $NO_x$ by at least about 25% to 30% (i.e., volume %). In particular applications, such reductions shall be, variously, at least 40%, 50%, 60%, 70% 80%, 90%, and, preferably, by about 98% and more preferably about 99.4%.

$NO_x$ shall mean any oxide of nitrogen, including but not limited to NO, $N_2O$, $NO_2$, $N_2O_5$, $N_2O_3$, $NO_3$.

"Hypercritical presentation" to an $NO_x$ bearing gas stream shall mean establishing an electrical field having, as a minimum, an electrical field power density of at least about 75w/m³.

In particular embodiments parameters augmenting the efficiency of hypercritical presentation include:
1. Operation from about 60° F. to about 1000° F.
2. Water vapor present in the reaction area up to about 18%.
3. $SO_2$ concentration up to about 3000 ppm.
4. Oxygen up to about 15%.
5. Voltage from about 4000 to about 60,000 volts. In particular it is observed that rate of change in voltage going from about zero to a level up to maximum augments efficiency. In various applications known wave forms such as sine, square, triangle and pulse as well as others are useful.
6. Frequency of from about 50 Hz to about 60,000 Hz.

In particular embodiments, gas is recycled through the apparatus to permit further reaction.

Hypercritical reaction conditions are easily determined empirically. If $NO_x$ is not being effectively removed, removal is increased by increasing voltage, increasing power, increasing residence time, modulating temperature, increasing the frequency of the applied voltage, modulating $O_2$ content, modulating $SO_2$ content, modulating CO content, or modulating $H_2O$ content. Hypercritical presentation also recognizes that there is a threshold voltage below which no substantial NOx reduction will occur. Upon reaching the threshold voltage some variability in reduction is observed during an equilibration or ignition phase of the reduction reaction.

In particular embodiments, modulation of rise time to a short rise time will augment hypercritical presentation.

"% NO Conversion" shall mean:

$$\% CONV_{NO} = \left[ \frac{(NO_{into} - NO_{out})}{NO_{into}} \right] 100$$

"% NOx Reduction" shall mean:

$$\% RED_{NO_x} = \left[ \frac{(NO_{x_{into}} - NO_{x_{out}})}{NO_{x_{into}}} \right] 100$$

where:
$NO_{into}$ is the NO concentration of the gas stream entering into a coronal catalytic reactor,
$NO_{out}$ is the NO concentration of the gas stream exiting from the coronal catalytic reactor,
$NO_{x_{into}}$ is the $NO_x$ concentration of the gas stream entering into the coronal catalytic reactor, and
$NO_{x_{out}}$ is the $NO_x$ concentration of the gas stream exiting from the coronal catalytic reactor.

N/S Scrubber refers to a means for downstream wet or dry absorption arrest of particular $NO_x$ reduction products such as $NO_2$ and $HNO_3$, optionally upon exposure to arresting agents, including basic, caustic, or alkali materials such as CaO or $NH_i$. Downstream sulfur products would be similarly the subject of scrubbers.

$NH_i$ shall mean radical nitrogen species, including NH and $NH_2$, as well as $NH_3$ (i.e., a non-radical).

Without being bound by any particular theory, it is believed that the coronal-catalytic reduction phenomenon is based on the energy input of corona catalyzed reactions. A corona is an energetic electric field in which there is a cool discharge promoting the free flow of electrons through the inter-electrode spaces. It is important to distinguish the cool discharge herein employed from a hot discharge. A cool discharge is distinguished in that (1) only the electrons gain appreciable energy through the system and therefor increased temperature, leaving the bulk of material flowing through the system largely substantially unheated and thus exiting at the approximate entry temperature, and (2) it is generally an evenly distributed discharge over the entire reactor volume, whereas a hot discharge is typically a local point to point arc engaging very little volume.

FIGS. 5(a)–(d) depict the hypothetical steps of coronal catalyzed reaction. In these figures, the active corona is shown as free electrons flowing between the negative and positive electrodes. The oxide of nitrogen used in this example is nitric oxide (NO), but other oxides of nitrogen are similarly reacted. As the nitric oxide (NO) flows through the reactor it is bombarded by the free flowing electrons. Most of the electrons have insufficient energy to be incorporated into the nitric oxide electron orbitals. However, some electron collisions are sufficiently energetic for electron incorporation as shown in FIG. 5(b). The unstable anionic nitric oxide molecule decomposes into a negatively charged nitrogen radical and an oxygen atom as shown in FIG. 5(c). Finally the nitrogen and oxygen atoms react through other short lived intermediate reactions forming molecular nitrogen and oxygen as in FIG. 5(d).

A unique aspect of the process is found in the generation of low-energy gaseous plasm or corona within a chemical reactor. Gases within a corona exhibit physical and chemical properties different than their normal properties. Without being bound by any particular theory, this is believed to be because the gases exist in a variety of chemical forms such as singlet atoms, free radicals and ions.

One feature common to many of the gas species generated within a corona is extreme chemical reactivity. On a more fundamental basis, the process could be termed an electrocatalytic process because it is free electrons within the corona that initiate the $NO_x$ decomposition reactions much the same way as conventional catalysts. Randomly occurring free electrons within the coronal catalytic reactor are energized in an electric field until the electrons attain sufficient energy to cause ionization of some of the gas molecules. Thereafter, a steady state is reached whereby the formation of ions is equal to the rate of recombination. At that point, an equilibrium conducting state (i.e., a self-sustained discharge) is maintained within the reactor. 4 Presented below are a series of chemical reactions, all of which are likely to occur in a coronal-catalytic reactor of the instant invention. It should be recognized, however, that there is a large number of probable reactions that can and do occur in the reactor. The major reactions for the $NO_x$ reduction mechanism in a coronal catalytic reactor of the instant invention are as follows.

$$N_2 + e \rightarrow 2N + e \quad \quad 1$$

$$NO + e \rightarrow NO^* \quad \quad 2$$

$$NO^* + NO \rightarrow NO_2 + N + e \quad \quad 3$$

$$NO^* \rightarrow N + O + e \quad \quad 4$$

$$N + O \rightarrow NO \quad \quad 5$$

$$N + N \rightarrow N_2 \quad \quad 6$$

$$NO + O \rightarrow NO_2 \quad \quad 7$$

$$2NO_2 \rightarrow N_2 + 2O_2 \quad \quad 8$$

where, e is a free electron generated by the corona.

If oxygen is added to the feed gas for a coronal catalytic reactor, several additional reactions are possible. These are:

$$2NO + O_2 \rightarrow 2NO_2 \quad \quad 9$$

$$O_2 + e \rightarrow 2O + e \quad \quad 10$$

The greater concentration of oxygen increases the reaction rate of reactions 9 and 10 and subsequently reactions 5 and 7. The net effect is an apparent decrease in the rate of reaction 8.

In order to design, to a given scale, a coronal catalytic reactor of the present invention, it is useful to understand the reaction kinetics and the model rate of conversion. From collision theory, the reactor rate is expressed as:

$$R = QZ_{AB}$$

where, q is the fraction of effective collisions and $Z_{AB}$ is the collision number, the number of collisions per unit time. In the present case, the collision number is the number of collisions of NO with electrons. The value is determined from the cross-section for collision, the relative speed of the two species and the concentration of the each species. This is expressed as:

$$Z_{AB} = SVN_A N_B$$

where, S is the reactor cross section, V is the relative speed, $N_A$ is the concentration of the species A and $N_B$ is the concentration of the species B. Assuming that the NO molecule is relatively stationary in the oscillating electric field, then V is simply the electron speed, c.

The reaction cross section is a function of velocity, and is expressed as:

$$S = S(c) = \beta c^n$$

Taking species A to be NO and species B to be the electrons, $Z_{AB}$ is expressed as:

$$Z_{AB} = ZN_B$$

where Z is the collision frequency, that is expressed as:

$$Z = S(c)cN_A$$

The speed of the electron is expressed as:

$$c = \left( \frac{4\lambda^2 a^2}{h} \right)^{0.25}$$

where, $\lambda$ is the mean free path, a is the electron acceleration and h is the mass ratio of the electron to the NO molecule.

The acceleration of the electron is expressed as:

$$a = \frac{q_e E_0}{m}$$

where, $q_e$ is the electron charge, $E_o$ is the field strength and m is the electron mass. The field strength is a function of the applied voltage, the reactor geometry and the dielectric constant of the materials within the applied voltage field.

The concentration of electrons is found from the current, geometry and electron speed. For a tubular coronal catalytic reactor, the electron concentration is expressed as:

$$i = \frac{I \ln(r_a/r_b)}{2\pi(r_a - r_b) L Q_e c A_0}$$

where, l is the current, $r_{a,b,c}$ are system radii, L is the reactor length, and A is Avogadro's number. Substituting and simplifying, the rate is expressed as:

$$R \frac{d(NO)}{dt} = q' c^n [NO] i$$

where, q' is a composite constant. The conversion is then given by:

$$X = 1 - e^{-q' c^n i t}$$

The only unknowns being q' and n, where n is the functionality of reactor cross section.

FIG. 1 presents a plot of the percentage reduction in $NO_x$ emissions as a function of the percentage of the range explored for a given variable. The figure provides curves reflecting the relationship between the percent reduction in $NO_x$ as the function of the variation in applied voltage, curve 300; as a function of the variation in the oxygen content in the effluent stream, curve 302; as a function of the variation in the frequency of the applied voltage, curve 304; and as function of the variation in residence time of the gas in the corona (i.e., exposure time to corona), curve 306. The range tested for each of the variables of FIG. 1 is tabulated below.

| VARIABLE | RANGE |
| --- | --- |
| $O_2$ | 1–15% |
| Voltage | 0–35 kV |
| Frequency | 60–400 Hz |
| Residence Time | 0.2–5 sec. |

Figure 2:
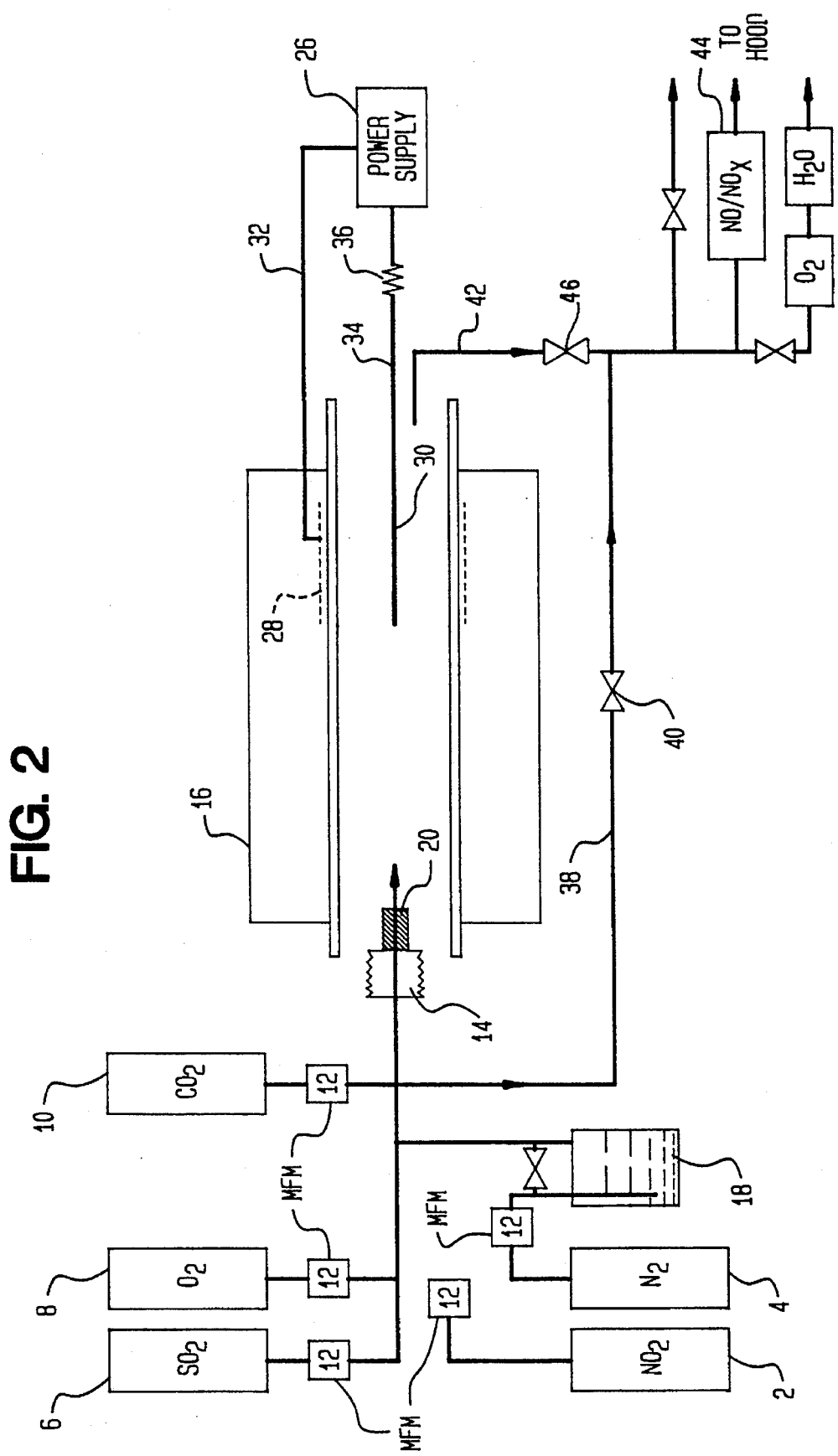
FIG. 2 is a schematic diagram of an experimental apparatus.

A test apparatus for determining $NO_x$ removal is schematically represented in FIG. 2. Gas cylinders 2–10 supply metered amounts of gas to a test column, the gas and amount supplied depending on the experimental protocol. One gas cylinder 2 supplies nitric oxide, a second gas cylinder 4 supplies nitrogen, a third gas cylinder 6 supplies sulfur dioxide, a fourth gas cylinder 8 supplies oxygen, and the fifth gas cylinder 10 supplies carbon dioxide. Each gas cylinder is metered by a calibrated mass flow meter 12.

The gaseous mixture from the cylinders is passed through a preheat section 14 prior to entering the furnace 16. Provision is also made to humidify the nitrogen gas prior to furnace entry by passing it through a humidifying means 18, here a bubbling device. The gaseous mixture is introduced into the furnace through a 1 inch diameter tube 20, in this apparatus the tube is fashioned from a glass, high silicone glass or ceramic insulator (e.g. Vycor™, Corning Glass Works Troy N.Y.).

The furnace 16 is 3 feet in length in the test apparatus but in practice a furnace may be omitted or it may be up to 10 ft or longer. The coronal discharge area within the furnace is packing free. This packing free area is energized by a power supply 26 connected to the outer electrode 28 through line 32 and connected to the inner electrode 30 through line 34 that is equipped with a resistor 36. The apparatus also includes a bypass line 38 having a valve 40 joining the outlet sampling line 42, thereby providing for inlet and outlet NO and $NO_x$ determinations at the same conditions, i.e. with the valve taking the place of the reactor.

FIG. 3(a) graphically presents the electrical field distribution of a tubular coronal catalytic reactor as a function of radius for three different reactor geometries when the voltage being applied has a frequency of 200 Hz. FIG. 3(a) also includes a pictorial representation of the tubular reactor having a center electrode, a glass barrier dielectric disposed about the center electrode, an outer electrode and a gas space between the glass barrier and the outer electrode. Each of these geometries, cases 1–3, is represented by a unique electrical field distribution, curves 100, 102, 104. The following are the applicable parameters for each of these cases [refer to tubular reactor pictorial of FIG. 3(a) for description of a,b,c].

| Parameter | Case 1 | Case 2 | Case 3 |
| --- | --- | --- | --- |
| a (cm) | 0.2 | 0.3 | 0.5 |
| b (cm) | 0.3 | 0.4 | 0.6 |
| c (cm) | 1.43 | 1.43 | 2.54 |
| $V_{max}$ (kV) | 25 | 24 | 38 |
| $T_{op}$ (°F.) | 220 | 220 | 220 |

Also included on FIG. 3(a) is a curve representative of the glass barrier dielectric strength—curve 108, a curve representative of the critical field strength needed to initiate a corona discharge in a gas—curve 110, a curve representative of the reactor's, as a system, breakdown threshold—curve 112, and a curve representative of the gas arcing threshold—curve 114. The arcing threshold curve 114 is representative of the voltage that results in point to point arcing in dry air, whereas, the system threshold breakdown curve 112 reflects reactor geometry. As indicated above, to produce the coronal catalyst of the present invention, the voltage being applied to a given reactor during normal operating conditions is such that the strength of the electric field being developed falls below the critical field strength value, the system breakdown threshold—curve 112, within the gas space (i.e., before reaching the outer electrode or before reaching the "c" dimension for a tubular reactor).

As also indicated above, before a corona is established in a gas, the electric field being developed in the gas must exceed the critical field strength for that gas. As such, for FIG. 3(a) a corona discharge in the gas occurs for those electrical field distributions that lie in a region 116 above the curve representative of the critical field strength—curve 110. Each of the curves 100, 102, 104, for the different reactor geometries has a region 118a–c that lies above the critical field strength value, curve 110. Such a region 118a–c is considered to be a "supra-arc voltage arc-free zone" if the curve of the electrical distribution for a given geometry falls below the system breakdown threshold, curve 112, in the gas space. If the electrical distribution curve does not fall below the system breakdown threshold curve 112 in the gas space, then an arcing condition is established in the gas space.

The electric field distributions for the first and third case, curves 100, 104, based on the foregoing, indicate that the associated reactors are acceptable design configurations because the electric field distribution curve for both cases falls below the system breakdown threshold curve 112 in the gas space (i.e., before reaching the outer electrode). As such the regions 118a,c of the electrical distribution curves 100, 104 for the first and third case that lie above the critical field strength curve 112 are considered to be supra-arc voltage arc-free zones.

In contrast, the electric field distribution curve 102 for the second case does not fall below the system breakdown threshold curve 112 in the gas space (i.e., not before reaching the outer electrode). As such, the reactor associated with the second case field distribution curve 102 is not considered an acceptable design configuration. Further the region 118b for this electrical distribution curve 102 that lie above the critical field strength curve 112 is not considered to be a supra arc voltage arc-free zone. As provided above, when the electrical distribution exceeds the system breakdown threshold curve 112 in the entire gas space arcing will occur during normal operating conditions.

FIG. 3(b) graphically presents the electrical field distribution of a tubular coronal catalytic reactor as a function of radius for three different reactor geometries when the voltage being applied has a frequency of 1000 Hz. FIG. 3(b), like FIG. 3(a), also includes a pictorial representation of the tubular reactor. Each of these geometries, cases 4–6, is represented by a unique electrical field distribution, curves 120, 122, 124. The following are the applicable parameters for each of these cases [refer to tubular reactor pictorial of FIG. 3(b) for description of a,b,c].

| Parameter | Case 1 | Case 2 | Case 3 |
| --- | --- | --- | --- |
| a (cm) | 0.2 | 0.3 | 0.5 |
| b (cm) | 0.3 | 0.4 | 0.6 |
| c (cm) | 1.43 | 1.43 | 2.54 |
| $V_{max}$ (kV) | 18 | 18 | 31 RMS? |
| $T_{op}$ (°F.) | 220 | 220 | 220 |

As with FIG. 3(a), FIG. 3(b) includes a curve representative of the glass barrier dielectric strength—curve 108, a curve representative of the critical field strength needed to initiate a corona discharge in a gas—curve 110, a curve representative of the reactor's, as a system, breakdown threshold—curve 112, and a curve representative of the gas arcing threshold—curve 114. It should be noted that physically the three reactor geometries of FIG. 3(a) are the same as those for FIG. 3(b). FIGS. 3(a),(b) differ in that the voltage being applied for each geometry and the frequency for the applied voltages are different.

The electric field distributions for all three cases, curves 120, 122, 124, based on the foregoing, indicate that the associated reactors are acceptable design configurations because the electric field distribution curve for all three cases falls below the system breakdown threshold curve 112 in the gas space (i.e., before reaching the outer electrode). As such the regions 128a–c of the three electrical distribution curves 120, 122, 124 that lie above the critical field strength curve 112 are considered to be supra-arc voltage arc-free zones.

The major difference between the five acceptable reactor design configurations, cases 1, 3–6 of FIGS. 3(a),(b), are the regions 118a,c; 128a–c of the associated electrical distribution curve 100, 102, 120, 122, 124, in which the corona discharge resides (i.e., the chemically active portion of a coronal catalyst reactor). For a given reactor, the volume or cross sectional area of the corona must be at its maximum without producing arcing to make most efficient use of power. Also the power distribution in the corona should be as even as possible to prevent unwanted side reactions.

FIG. 3(c) is a three dimensional (3-D) plot of the electrical field distribution in part of the gas space for a tubular coronal catalytic reactor as a function of both reactor radius and frequency of the applied voltage. The field distribution plotted is for a tubular reactor having the geometry of the case 3 reactor of FIG. 3(a). The plot generally covers that part of the gas space in which a corona would be established by a reactor of the present invention. For this reactor, the maximum voltage being applied across the electrodes ($V_{max}$) was adjusted to maintain a constant power input to the reactor. From this plot one can also readily see how the extent of coverage and the power input to a supra-arc voltage arc-free zone increases as the frequency for the applied voltage increases.

The corona established in the arc-free corona area 150 for this reactor geometry is supra-arc voltage arc-free because the electrical field distribution for all the identified frequencies of the applied voltage exceeds the critical field strength value in the arc-free corona area 150 but the distribution falls below the system breakdown threshold well before the edge of the gas space (not shown) is reached. It should be recognized that a slice 158 through the arc-free corona area 150 at a fixed frequency would yield a field distribution curve like that shown in FIGS. 3(a),(b) for the region 116 of corona discharge. For example, a slice through the arc-free corona area 150 at 1000 Hz would correspond to the supra-arc voltage arc-free zone 128c of FIG. 3(b). The projection 152 of the variation in the electrical field distribution as a function of frequency also illustrates pictorially how much the electric field distribution at the wall of the dielectric, curve 154 exceeds the critical field strength value, curve 156.

The ratio of corona volume to total power is the parameter used to determine the effectiveness of various reactor geometries. FIG. 3(d) is a plot of the ratio of corona volume to power versus voltage for reactors having the physical geometry of the first and third cases of FIG. 3(a) operating at a temperature of 220° F. for different applied voltages having a frequency of 60, 200, 400 and 1000 Hz respectively. From FIG. 3(d) it is seen that a case three reactor design with an applied voltage of 31 KV at 1000 Hz [i.e., case 6 of FIG. 3(b)] shows a fivefold increase in the ratio of volume to power over that for a case one reactor design with an applied voltage of 25 kV at 200 Hz [i.e., case 1 of FIG. 3(a)]. A plot of reactor power versus applied peak voltage at frequencies of 60, 200, 400, 600 and 1000 Hz for the case three reactor design with a reactor length of 122 cm is shown in FIG. 3(e). Also shown in FIG. 3(e) are the voltage gradients as a function gases. The plots for FIG. 3(e) and FIG. 7 are for reactors having different geometries.

The above discussions regarding the electrical modeling of different tubular reactor design configurations indicates that increasing the frequency of the applied voltage reduces power consumption, a concern of large scale systems. However, in small scale systems, such as a residential burner or furnace, it is advantageous to reduce the applied voltage frequency to 60 Hz so a frequency converter is not required thereby simplifying the design while still optimizing $NO_x$ removal. In such case higher power input to the reactor is achieved without causing arcing in the gas space by using high dielectric materials, such as glass.

Figure 3F:
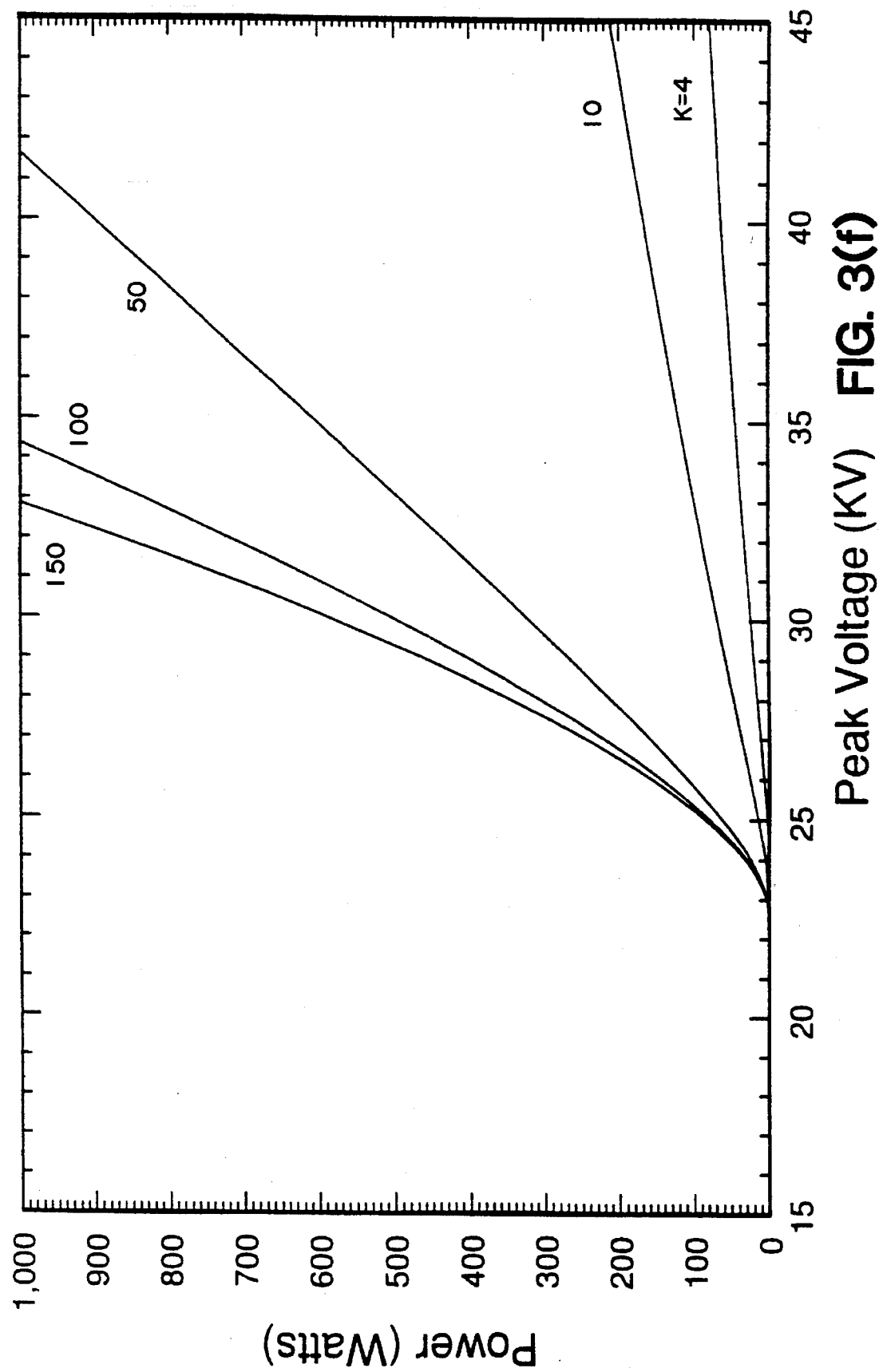
FIG. 3(f) is a plot of power input to a reactor as a function of peak applied voltage for one coronal catalytic reactor geometry.
Figure 3G:
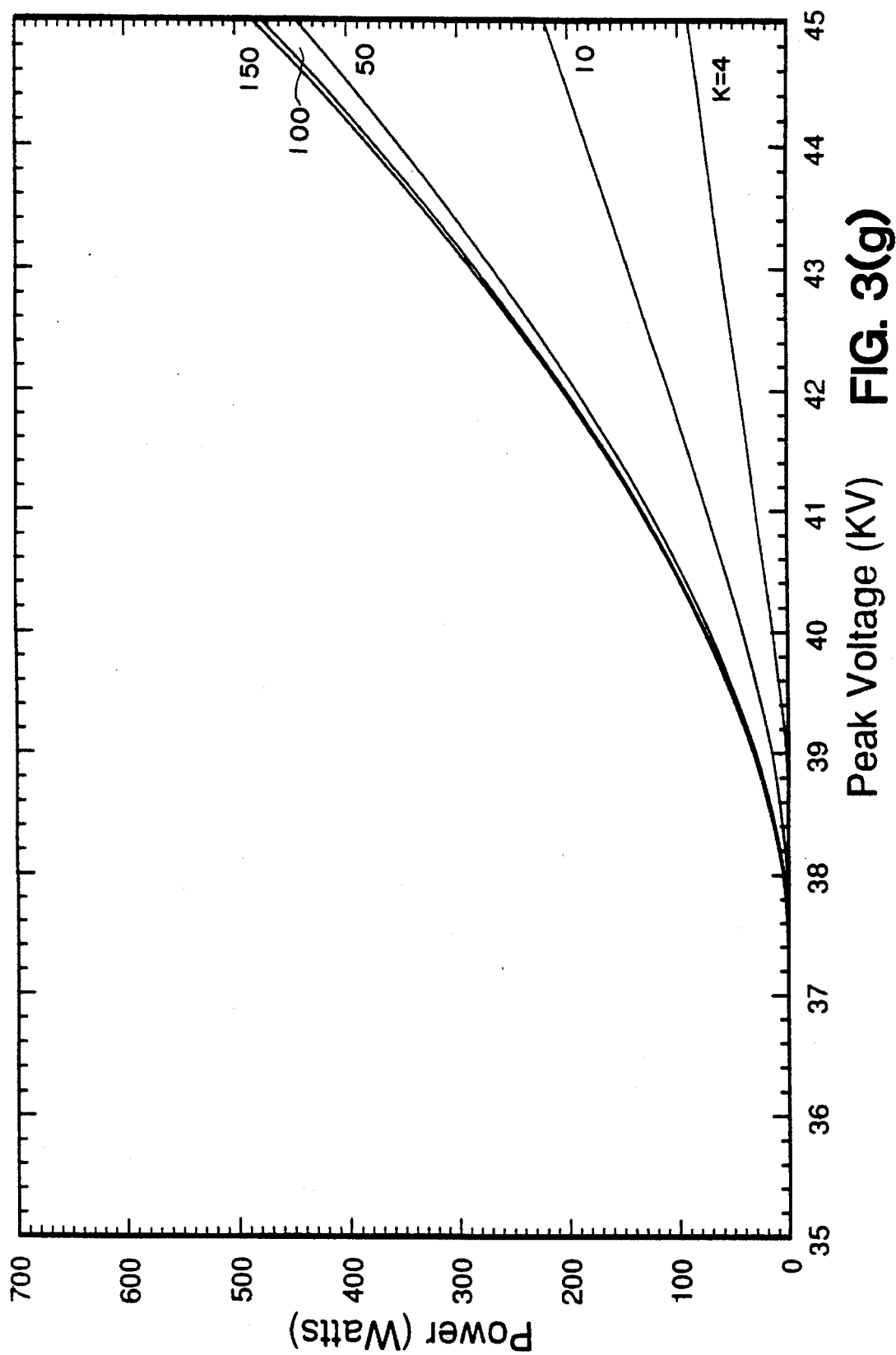
FIG. 3(g) is a plot of power input to a reactor as a function of peak applied voltage for a second coronal catalytic reactor geometry.

A plot of power input as a function of peak voltage for the case one reactor design of FIG. 3(a) for a dielectric barrier having a dielectric constant of 4, 10, 50, 100, and 150 respectively, is shown in FIG. 3(f). A similar plot for the case three reactor design of FIG. 3(a) is shown in FIG. 3(g). As seen in these figures, the power input to the rector can be increased for a given voltage by using a dielectric material with a larger dielectric constant. For example, for a case one reactor design operating at 25 kV and 60 HZ, raising the dielectric constant of the barrier material from 4 to 50 increases the power input from 5 to 60 watts for a reactor 4 feet or 122 cm in length. This is comparable to the increase in power input if the frequency was increased from 60 to 200 Hz at the same voltage. The same effect is in FIG. 3(g), however, the effect is not as significant as seen in FIG. 3(f).

In an alternate embodiment, the dielectric material is eliminated and the reactor is powered by a pulsed DC power source. By keeping the DC power pulse durations very short, there is insufficient time for sustained arcs to form and span the gas space between the two electrodes. Such a design requires a rectifier-pulse circuit to convert the 50–60 Hz AC line power to the high voltage, pulsed DC power required for operation.

Figure 4A:
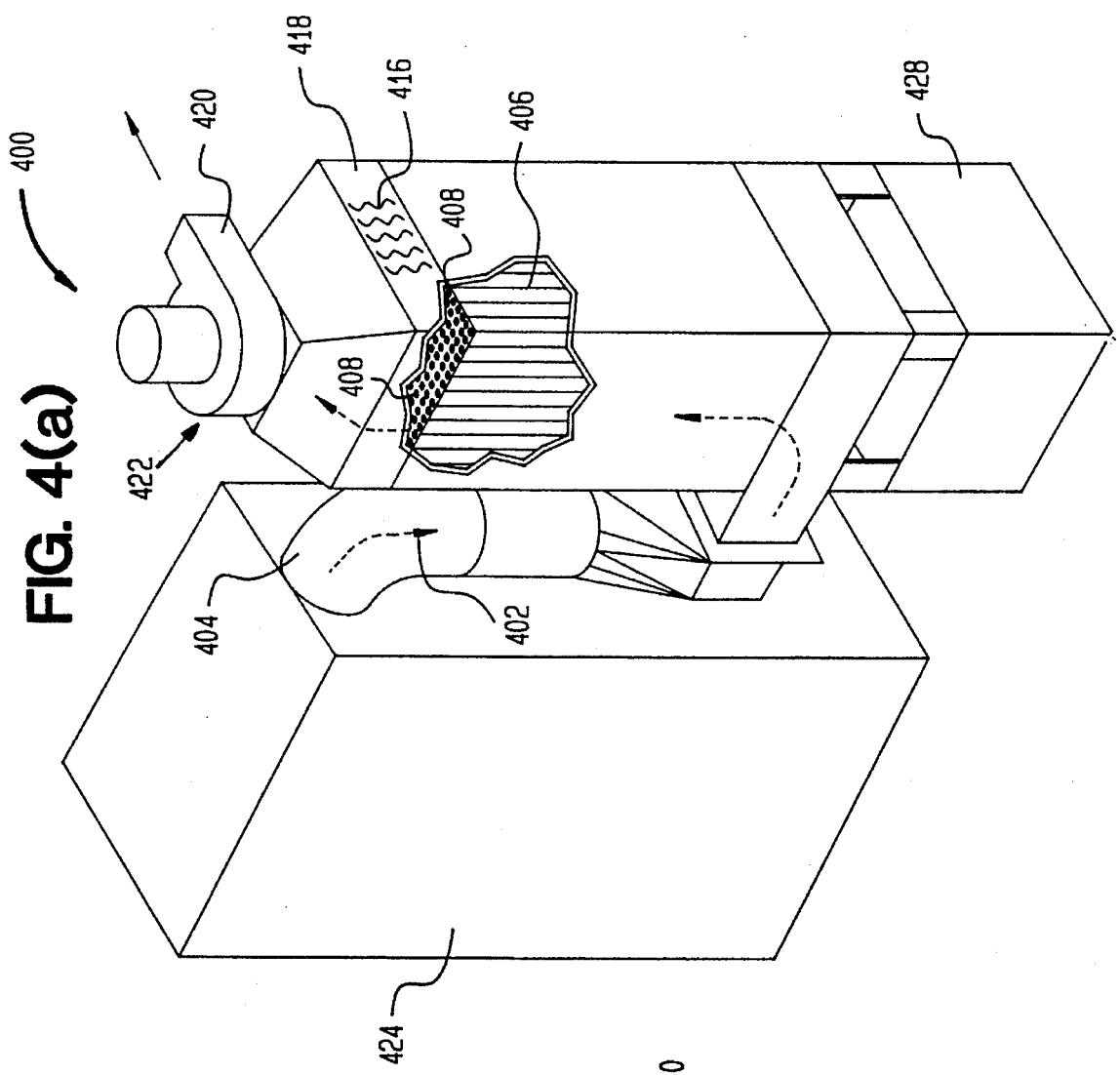
FIG. 4(a) is a schematic diagram of a coronal-catalytic scrubber of the instant invention for a residential use.
Figure 4B:
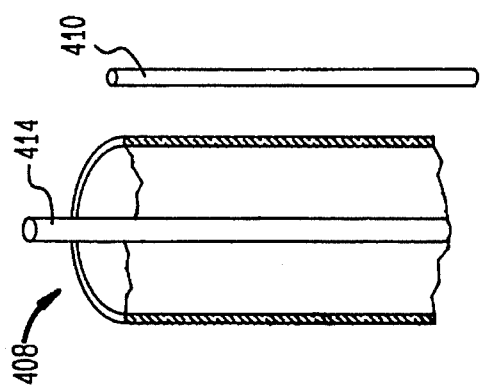
FIG. 4(b) is a cross-sectional detail of a coronal catalytic reactor tube of the scrubber of FIG. 4(a).

FIG. 4(a) shows a diagram of a commercial application in a residential setting for the invention. NOx reducing apparatus (400) has flue gas (402) entering the reactor (406) through plenum (404). The reactor 406 as depicted includes 230 tubes 24 inches long in a 60° pitch. In the plenum 404 the flue gas flow is directed to the reactor tubes (408) being high dielectrics which, in this embodiment, are disposed in parallel. Each tube (shown in detail in FIG. 4(b) comprises an inner electrode (414) and an outer electrode (410) [adapt to packing free].

The flue gas 402 traversing the interior of each reactor tube (408) recombines as a single exit stream (416) in an outlet plenum (418) and exits through the outlet (420). The voltage across the electrodes 410, 414 is supplied at frequencies from about 60 Hz to about 30,000 Hz and in various wave forms.

The complete NOx reduction apparatus 400 of FIG. 4(a) further includes an I.D. exhaust fan (422) and a power supply (428) that powers the exhaust fan 422, the electric potential of the coronal-catalyst, and a tuning circuit that is connected to the outlet power supply and capable of minimizing the power requirement of the power supply. The source of NOx emissions, as depicted, is a home heating system (424), a typical residential application for the $NO_x$ reduction apparatus of the present invention. In such an application the overall system is about 5 to 6 feet in height and about one foot long on each side and the power consumption is about 150–300 watts. Large capacity is easily accommodated by design modifications such as including additional coronal-catalyst sections (406).

Figure 4C:
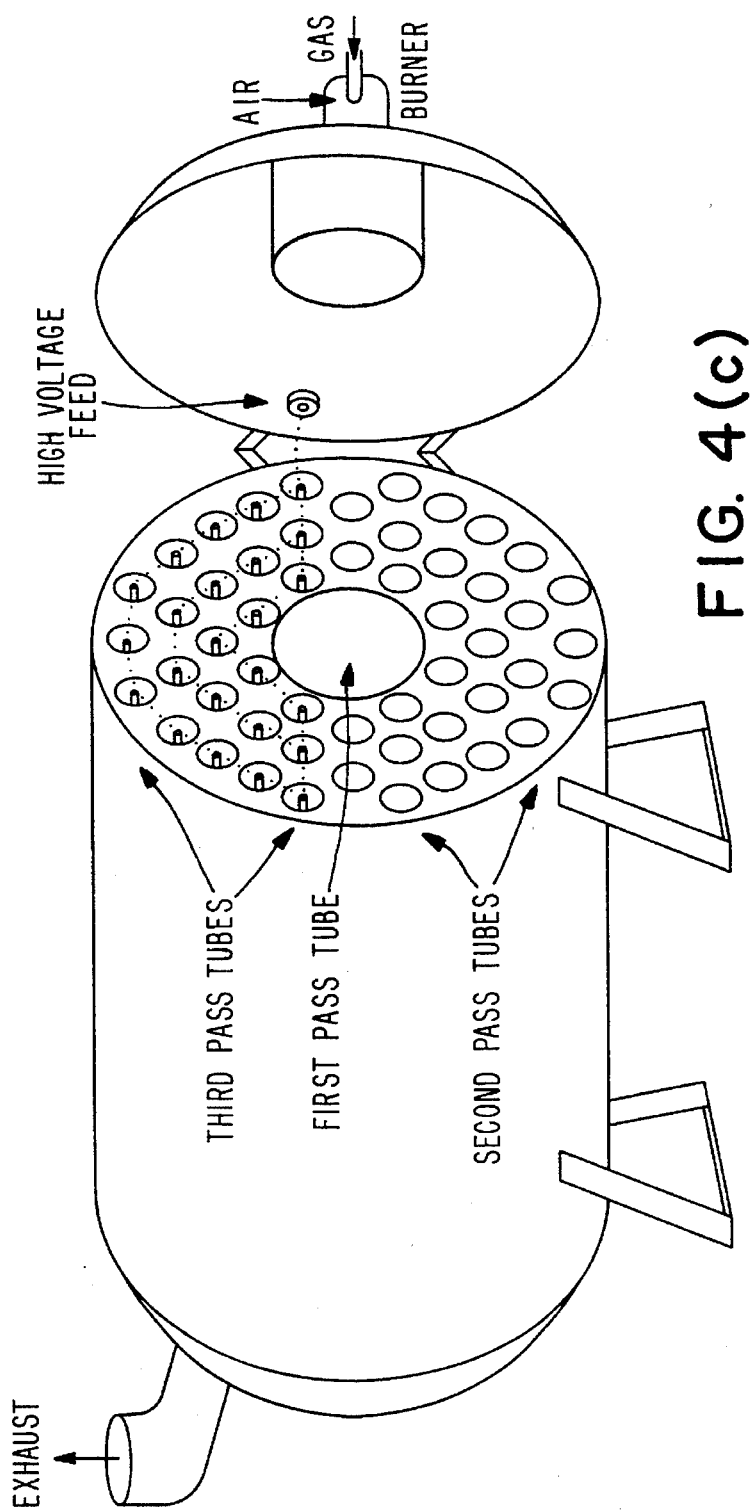
FIG. 4(c) is a perspective view of a $NO_x$ reduction apparatus for a multi-pass fire tube boiler application.
Figure 4D:
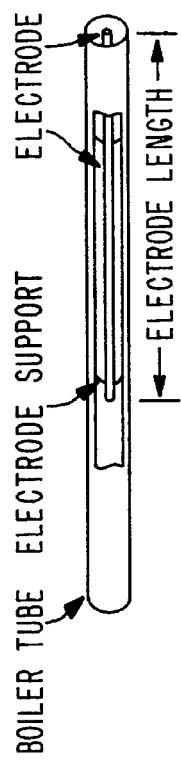
FIG. 4(d) is a broken cross sectional view of a boiler tube and its associated electrode arrangement for the boiler of FIG. 4(c)
Figure 4E:
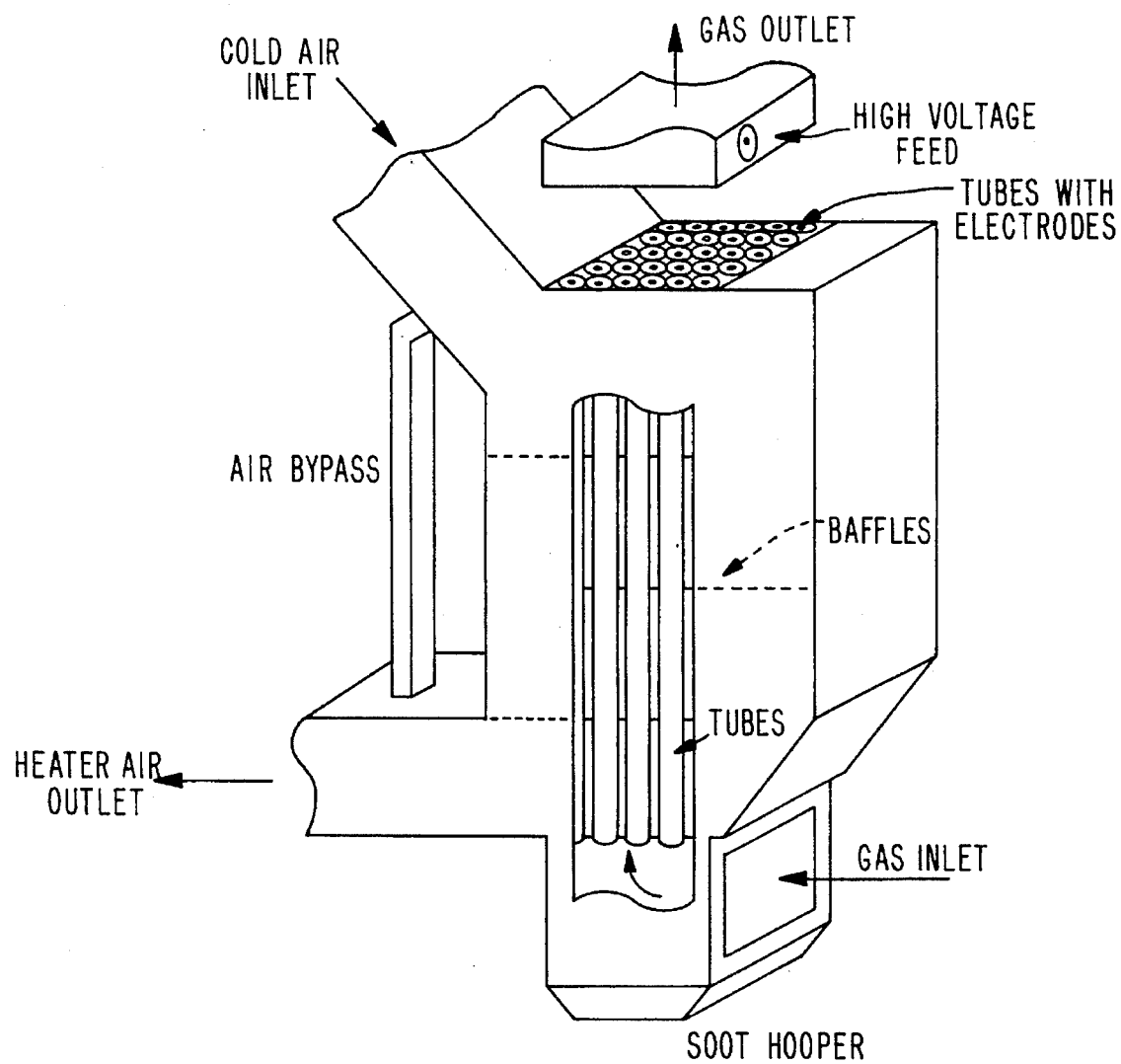
FIG. 4(e) is a perspective view of a $NO_x$ reduction apparatus for an air preheater application.

Other applications for the present invention are shown in FIGS. 4(c)–(e). FIG. 4(c) is a perspective view of a multi-pass fire tube boiler having electrodes disposed in each of the boiler tubes as shown in more detail in FIG. 4(d). FIG. 4(e) is a perspective view of a $NO_x$ reduction apparatus for an air preheater.

Figure 6A:
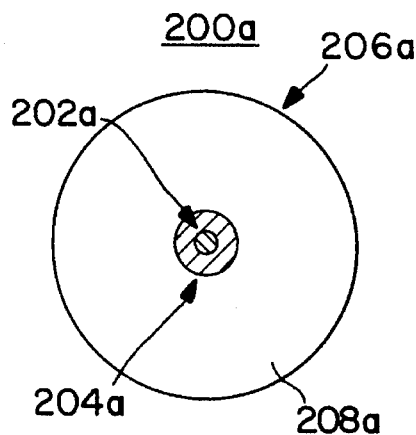
FIGS. 6(a)–6(g) are schematic diagrams of certain embodiments of electrode configurations for a coronal-catalytic reactor of the instant invention.

FIGS. 6(a)–(g) are schematics of some electrode configurations for a coronal-catalytic reactor of the instant invention. FIG. 6(a) is a schematic overhead view of a tubular coronal catalytic reactor 200a, having an inner electrode 202a, a dielectric material 204a disposed about and along the length of the inner electrode 202a, and an outer electrode 206a.

An electrical potential is applied across the inner and outer electrodes 202a, 206a, to establish an electric field distribution therebetween. The voltage being applied is also sufficient in magnitude so a corona is established about the inner electrode 202a in the area 208a between the dielectric material 204a and the outer electrode 206a. As indicated above in the discussion regarding FIG. 3(a), the volume or cross sectional area about the inner electrode 202a, where the corona is established, is a supra-arc voltage arc-free zone. Also, the $NO_x$ bearing gas passes through the area 208a wherein the supra-arc voltage arc-free zone is established.

Figure 6B:
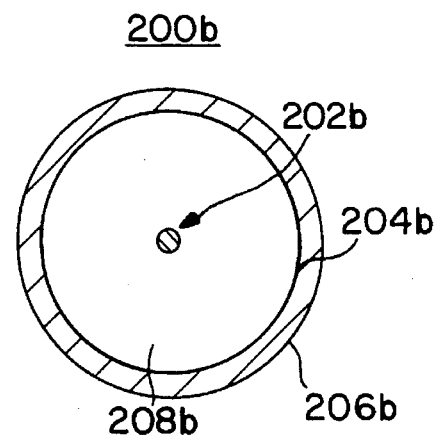

FIG. 6(b) is a schematic overhead view of another tubular coronal catalytic reactor 200b, having an inner electrode 202b, a dielectric material 204b and an outer electrode 206b. FIG. 6(b) differs from FIG. 6(a) in that the dielectric material is disposed along the inside surface of the outer electrode 206b and along the length of the outer electrode. FIGS. 6(a),(b) also differ in that a supra arc voltage arc-free zone, when established, is disposed in the area 208b between the inner electrode 202b and the dielectric material 204b.

Figure 6C:
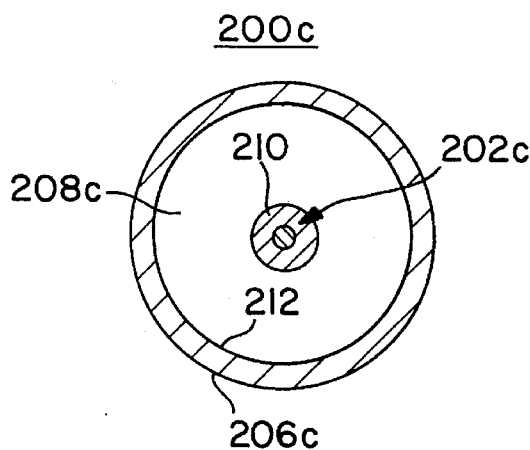

FIG. 6(c) is a schematic overhead view of yet another embodiment of a tubular coronal catalytic reactor 200c, having an inner electrode 202c, inner and outer dielectric material 210, 212 and an outer electrode 206c. FIG. 6(c) differs from FIGS. 6(a),(b) in that a dielectric material, is disposed both about and along the length of the inner electrode 202c, i.e., the inner dielectric 210, and disposed along the inside surface of the outer electrode 206c and along its length, i.e., the outer dielectric 212. As such, a supra-arc voltage arc-free zone when established is disposed in the area 208c between the surfaces of the inner and outer dielectrics 210, 212.

For FIGS. 6(a)–(c), the inner electrode 202a–c is preferably a cylindrical rod or wire of electrical conductive material. The dielectric material 204a–b, 210, 212 is quartz, pyrex glass, alumina, mullite or other dielectric materials known in the art that have a shape adapted to complement that of the inner electrode 202a–c. The outer electrode 206a–c is a solid electrical conductive metal cylindrical tube. However, the outer electrode 206a–c may be a electrical conductive wire mesh in the shape of a cylinder. Alternatively, the outer electrode 206a–c may consist of a plurality of electrical conductive wires that are disposed about the inner electrode 202a–c at the same radial distance.

A wire mesh or a plurality of conductive wires may be used for the outer electrode when a coronal catalytic apparatus of the present invention uses a plurality of adjacent coronal catalytic reactors. The porosity of the wire mesh and spaced wires permits the gaseous mixture to be treated to flow between adjacent reactors. In this way, if a reactor undergoes a mechanical or electrical failure, the gas flowing through the failed reactor can travel to other reactors and be treated therein. Thus, a gas will not flow through the apparatus untreated.

Figure 6D:
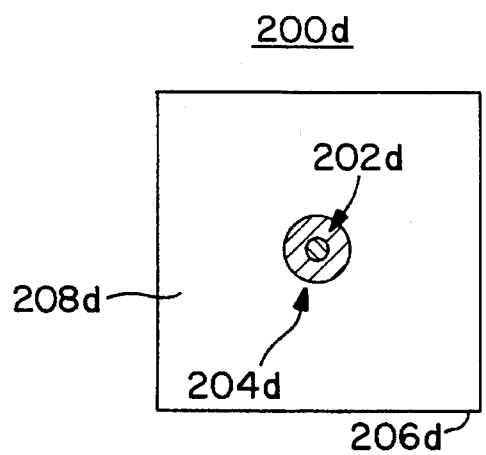

As shown in FIG. 6(d) the outer electrode 206d of a coronal catalytic reactor 200d can have a rectilinear shape. Alternatively, the outer electrode 206d can have a square, rectangular, hexagonal or a polygonal shape. The reactor 200d also includes an inner electrode 202d and a dielectric material 204d disposed about and along the length of the inner electrode 202d. Alternatively the dielectric material 204d, as shown in FIGS. 6(b),(c), is disposed at the outer electrode 206d or at both the inner and outer electrodes 202d, 206d. Similar to FIGS. 6(a)–(c), the outer electrode 206d is a solid conductive material, a wire mesh housing or a plurality of electrically conductive wires disposed along the perimeter for the geometric shape desired for the outer electrode.

Figure 6E:
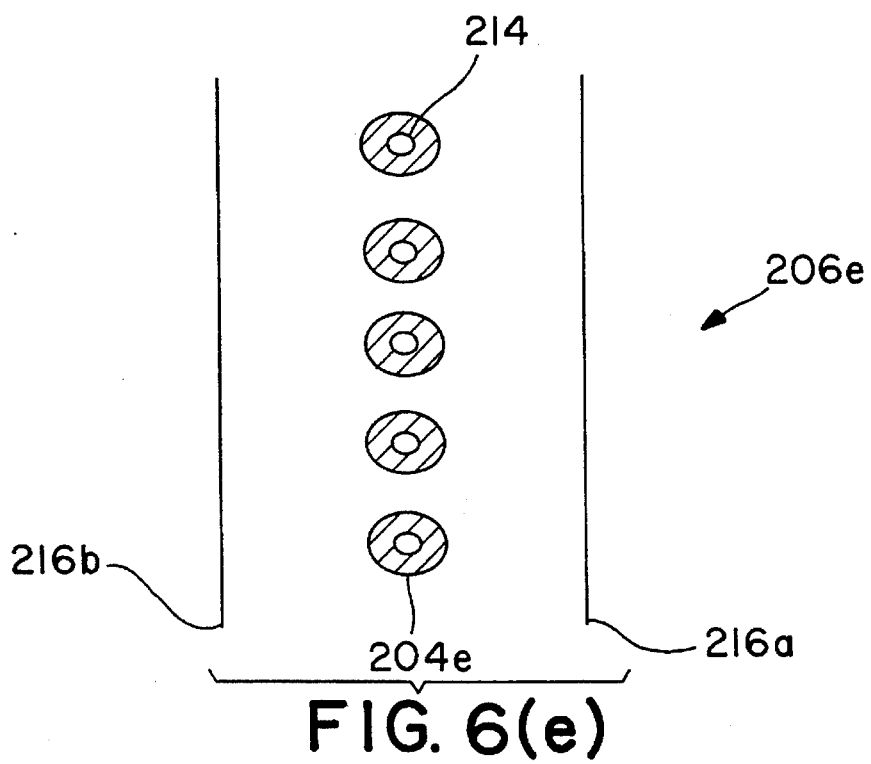

As shown in FIG. 6(e), a coronal catalytic reactor 200e may consist of a plurality of inner electrodes 214 each covered by a dielectric material 204e. The inner electrodes 214 are disposed between two opposing electrical conductive sheets 216a, b of the outer electrode 206e. As discussed above in connection with FIGS. 6(a)–(d), these electrically conductive sheets 216a, b are a solid conductive material, a conductive wire mesh or consist of a plurality of spaced conductive wires, or in other form.

Figure 6F:
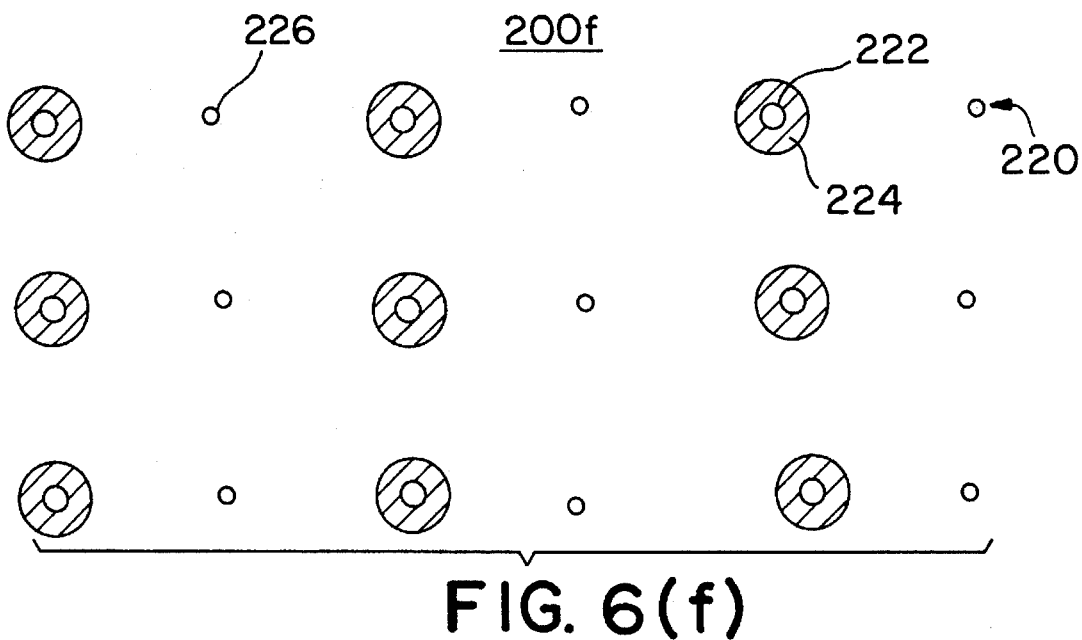
Figure 6G:
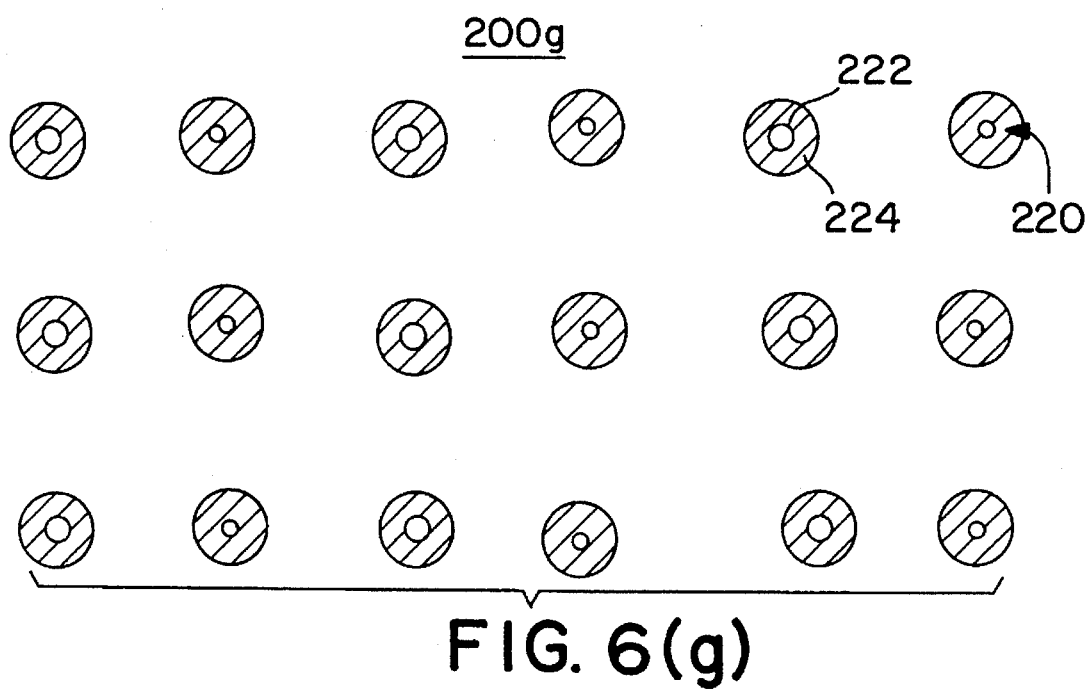

As shown in FIG. 6(f), a coronal catalytic reactor 200f is configured to produce a sheet corona effect. This reactor 200f uses a plurality of rows 220 of electrodes 222, where the rows 220 are spaced from each other and the electrodes 222 in each row are also spaced from each other. A dielectric material 224 is disposed about and along the length of each of these electrodes 222. Disposed between each of pair of electrodes 222 in a row 220, is an another electrode, an uncoated electrode 226. To establish a corona, a potential is established across the dielectric coated electrode 222 and the uncoated electrode 226 disposed between the coated electrodes 222. Alternatively, each row of electrodes can end with an uncoated electrode 226 and a corona established between the outer uncoated electrode 226 and the adjacent coated electrode 222 by applying a potential across these two electrodes. Another coronal catalytic reactor 200g configured to produce a sheet corona effect is shown in FIG. 6(g). For this reactor configuration each electrode 22 in a row 220 is coated with a dielectric material 214.

In particular embodiments it is indicated that specific electrodes are coated with a dielectric material or are uncoated. It is to be understood that for the present invention, both electrodes may be coated with a dielectric material, the coating of the electrodes may be reversed from that described above, or both electrodes may be uncoated.

As indicated above in the discussion regarding FIG. 4(a), it is within the ambit of the present invention for the $NO_x$ reduction apparatus to have multiple reactor sections or stages. In addition to generally providing higher overall system conversion, a multi-stage reduction apparatus with high conversion level stages reduces the power required to achieve a given $NO_x$ reduction compared to a single stage apparatus. For example, a four stage apparatus having stages with a 90% conversion level, requires ½ the power of that needed for a single stage apparatus to achieve the same overall level of $NO_x$ reduction.

Further improvements in $NO_x$ reduction for multi-stage apparatus are achievable by removing the gaseous nitric acid from the flue gas stream before the stream enters the next stage of the apparatus. Alternatively, the coronal catalytic reactors of the stages may be operated at elevated temperatures (500°–1000° F.) whereat gaseous nitric acid is known to quickly decompose to $NO_x$.

Bench Top Tests

A series of bench top tests were performed using differently configured coronal catalytic reactors to identify variables of interest and to explore these variables over an appropriate range. The main parameters investigated during the bench top testing and the range explored are provided in the following tabulation.

BENCH TOP TESTING VARIABLES

REACTOR CONFIGURATION

| | |
|---|---|
| Length | 1" to 2' |
| Outer Electrode | wire, tube |
| Outer Tube Diameter | ¾" to 2" |
| Inner Electrode | rod, gear stock, threaded rod, helical wire |
| Inner Electrode Diameter | 1/16" to ½" |
| Dielectric Barrier Material | none, quartz, pyrex glass, alumina, mullite |
| Dielectric Barrier Placement | surrounding inner electrode, inner lining for outer electrode |
| Reactor Packing | none, glass wool, quartz wool, ceramic wools (silica, alumina, zirconia), molecular sieves, teflon baffles |

REACTOR ELECTRICAL CONFIGURATION

| | |
|---|---|
| Waveform | DC, AC, rectified AC |
| Waveform Shape | sine, square, triangle, pulse |
| Frequency | DC to 1000 Hz |
| Voltage | 0 to 35,000 Volts (peak) |

GAS FLOW CONDITIONS

| | |
|---|---|
| Temperature | 70 to 500° F. |
| Velocity | .3 to 14.3 ft/sec. |
| Residence Time | 0.2 to 5 seconds |

GAS COMPOSITION

| | |
|---|---|
| $NO_x$ Content | 25 to 1000 ppm |
| $O_2$ Content | 0 to 15% |
| $SO_2$ Content | 0, 500 ppm |
| Reducing Gases | CO, $H_2$, methane |

Figure 9A:
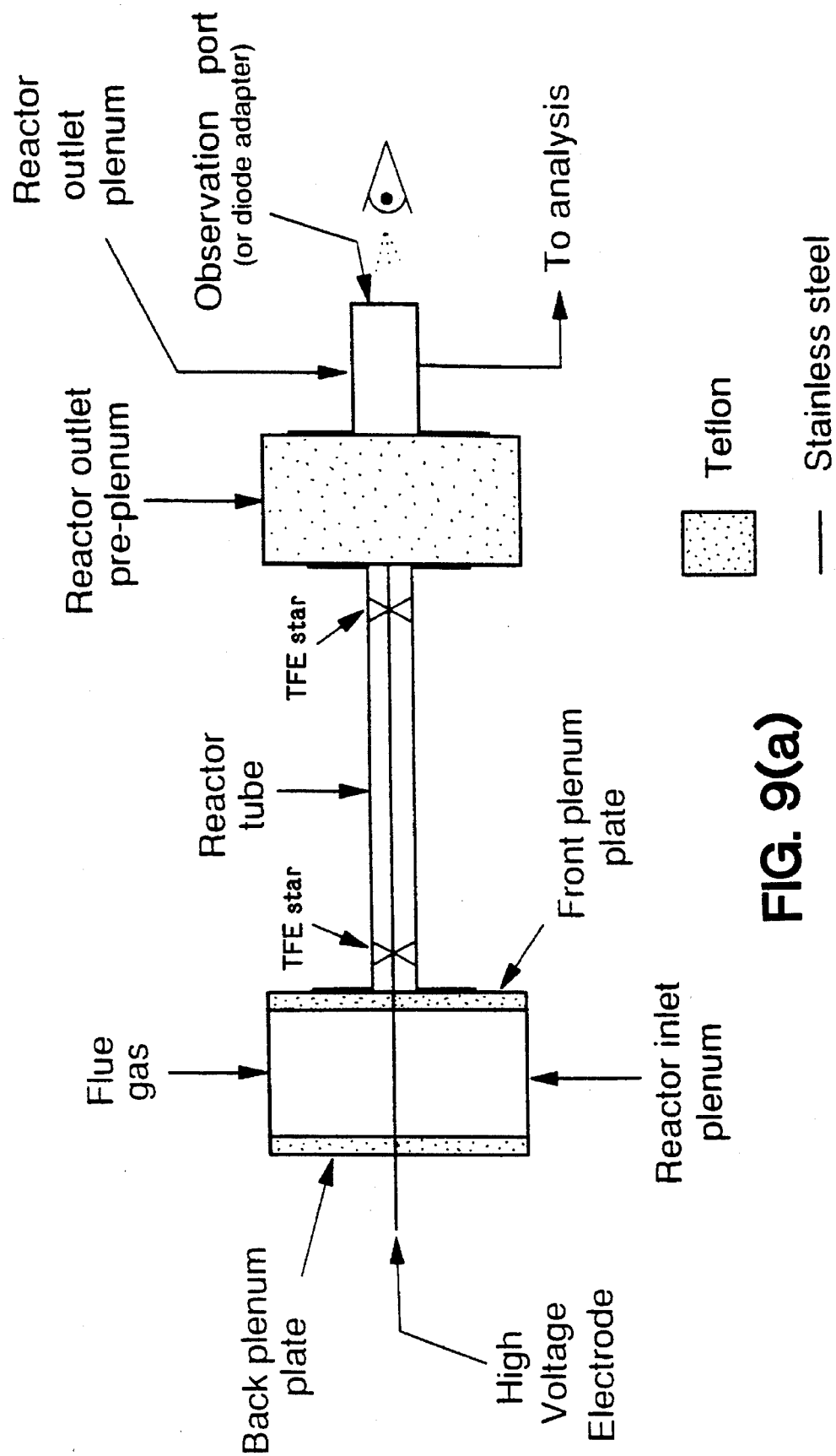
FIG. 9(a) is a schematic drawing of a coronal catalytic reactor used for bench top testing.
Figure 9B:
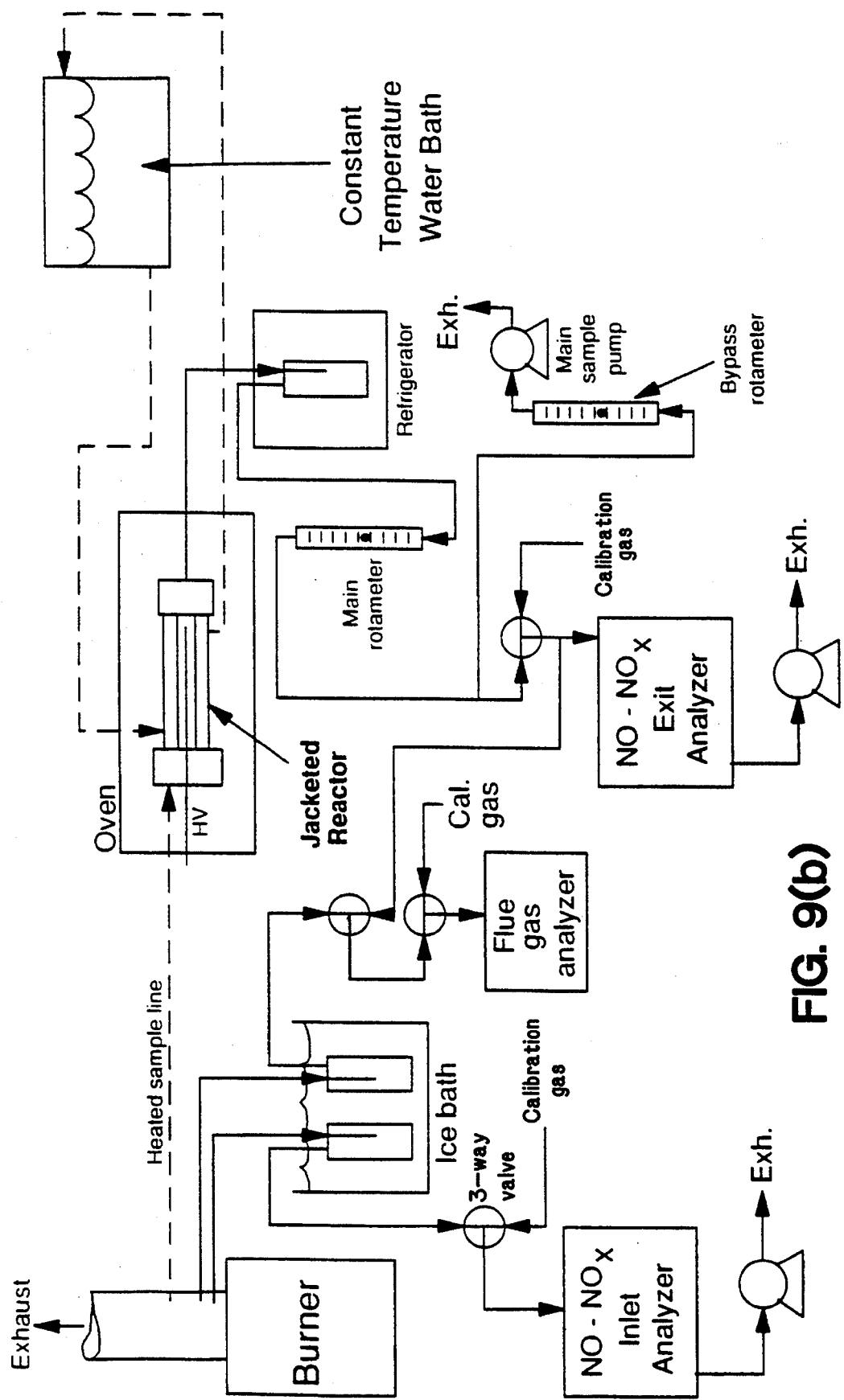
FIG. 9(b) is a schematic drawing of the test system used for bench top testing.
Figure 9C:
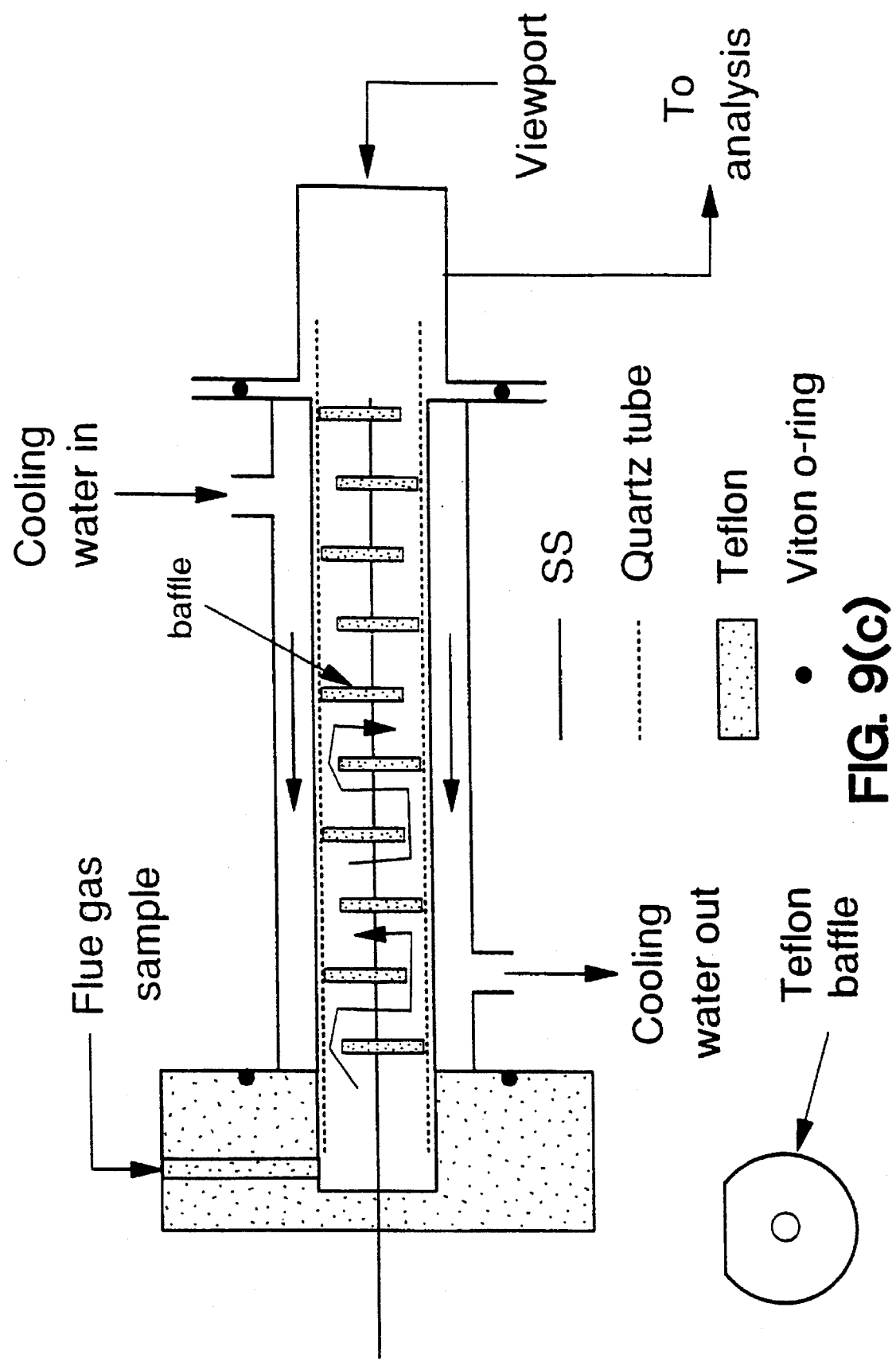
FIG. 9(c) is a schematic drawing of a coronal catalytic reactor used for bench top testing with teflon barriers.

The coronal catalytic reactor geometry and materials of construction are important with respect to the generation and effective use of corona discharges for the removal of $NO_x$ from gas streams. A schematic of a bench top coronal catalytic reactor and a process flow diagram involving the bench top tests are shown in FIGS. 9(a),(b) respectively. As indicated therein, the bench top reactors are provided with observation ports to enable visual observation of the coronal discharge during operation. In one reactor configuration, teflon baffles were added to the reactor to promote flow of gas across the active corona zone (i.e., the "supra-arc voltage arc-free zone") as shown in FIG. 9(c).

Figure 10A:
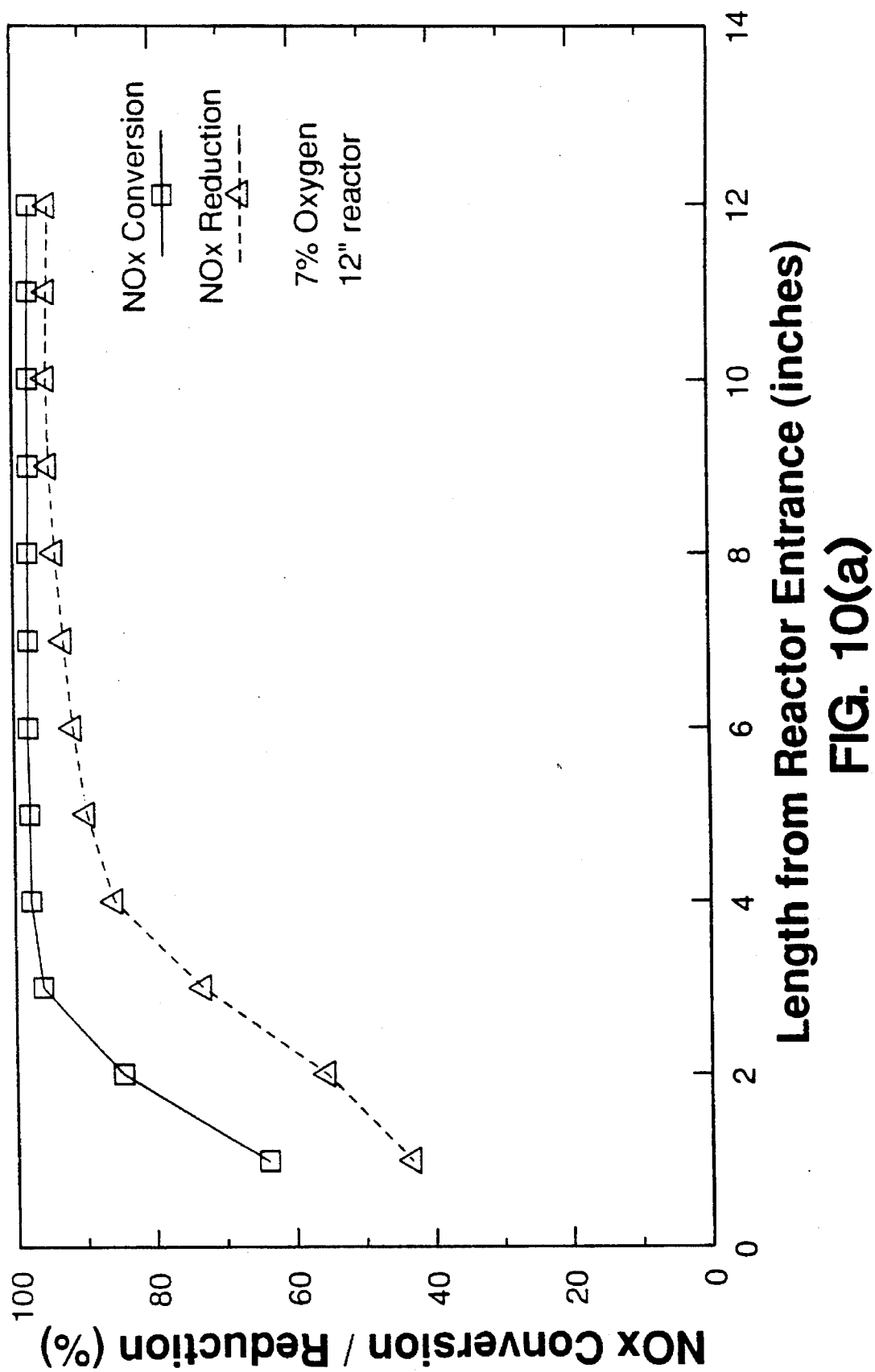
FIG. 10(a) is a graph of the variation of $NO_x$ conversion as a function of the length of the bench top test coronal catalytic reactor.

Results from selected tests performed with various reactor configurations are provided in FIGS. 10(a)–(e). FIG. 10(a) is a graph of the variation of $NO_x$ reduction or conversion as a function of the length of the reactor. As shown, a $NO_x$ conversion of 98% is attained within the first 5 inches of the reactor but there is no appreciable increase in conversion occurring in the last 7 inches of the reactor.

Figure 10B:
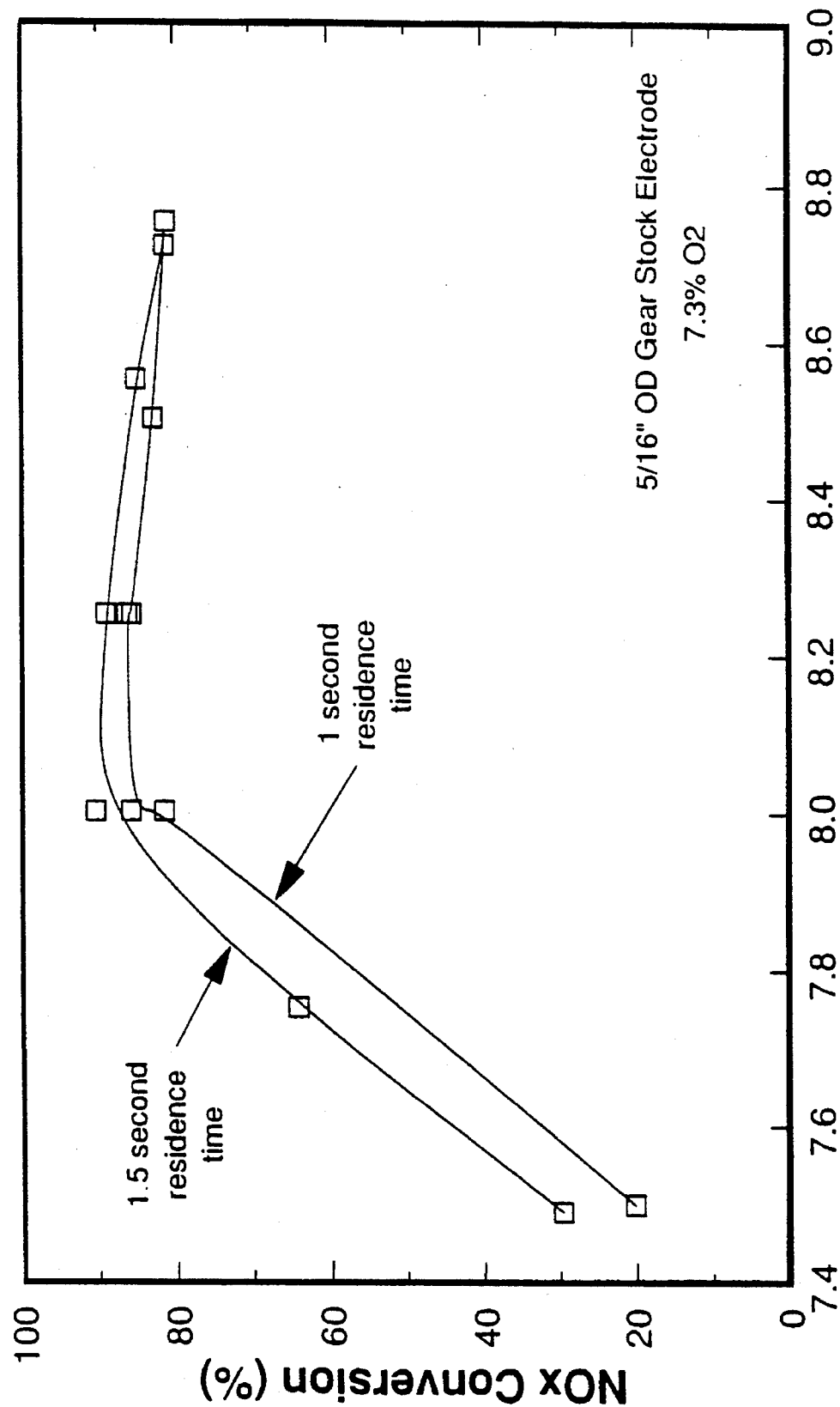
FIGS. 10(b)–(d) are graphs of the variation of $NO_x$ conversion for different electrode configurations.
Figure 10C:
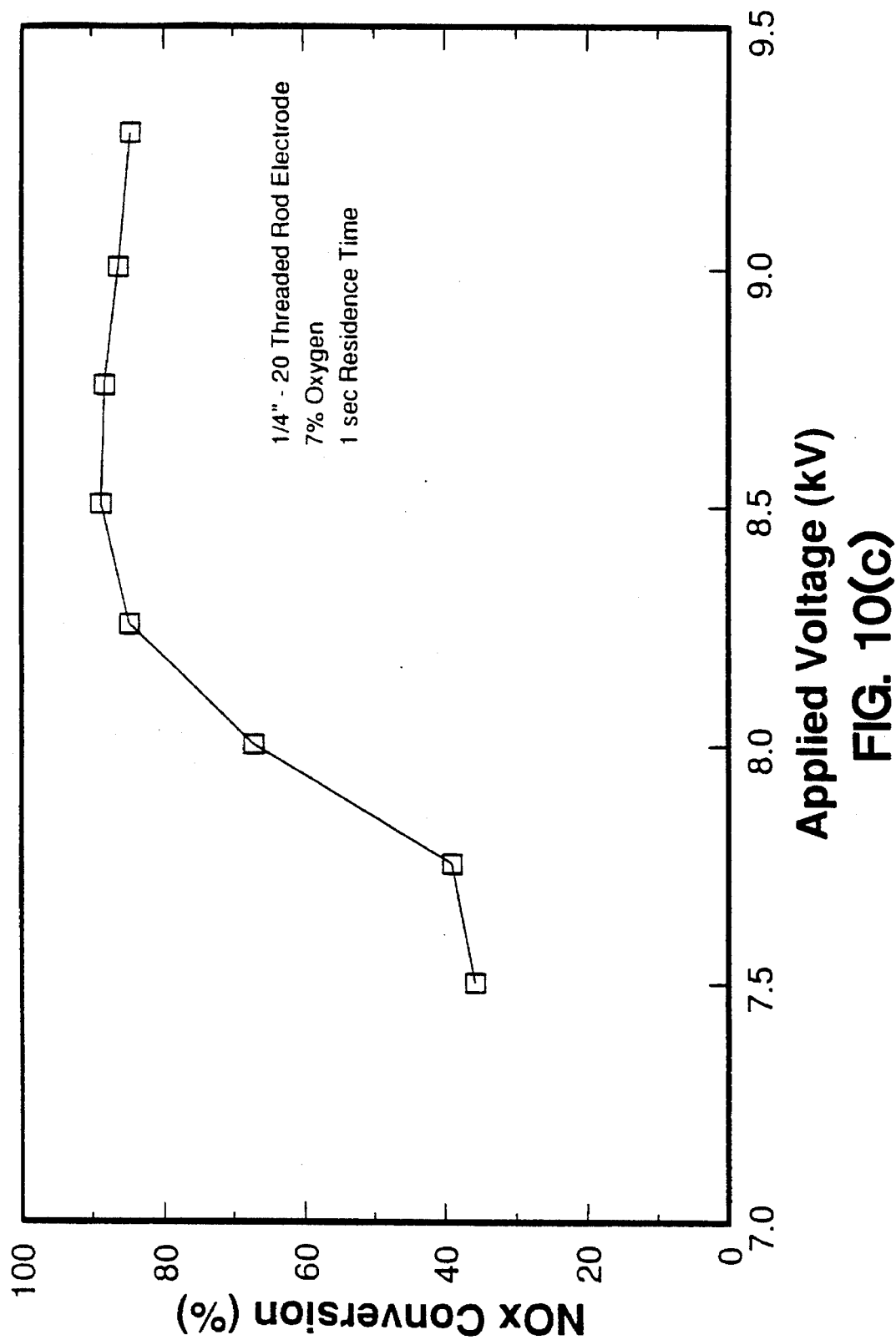
Figure 10D:
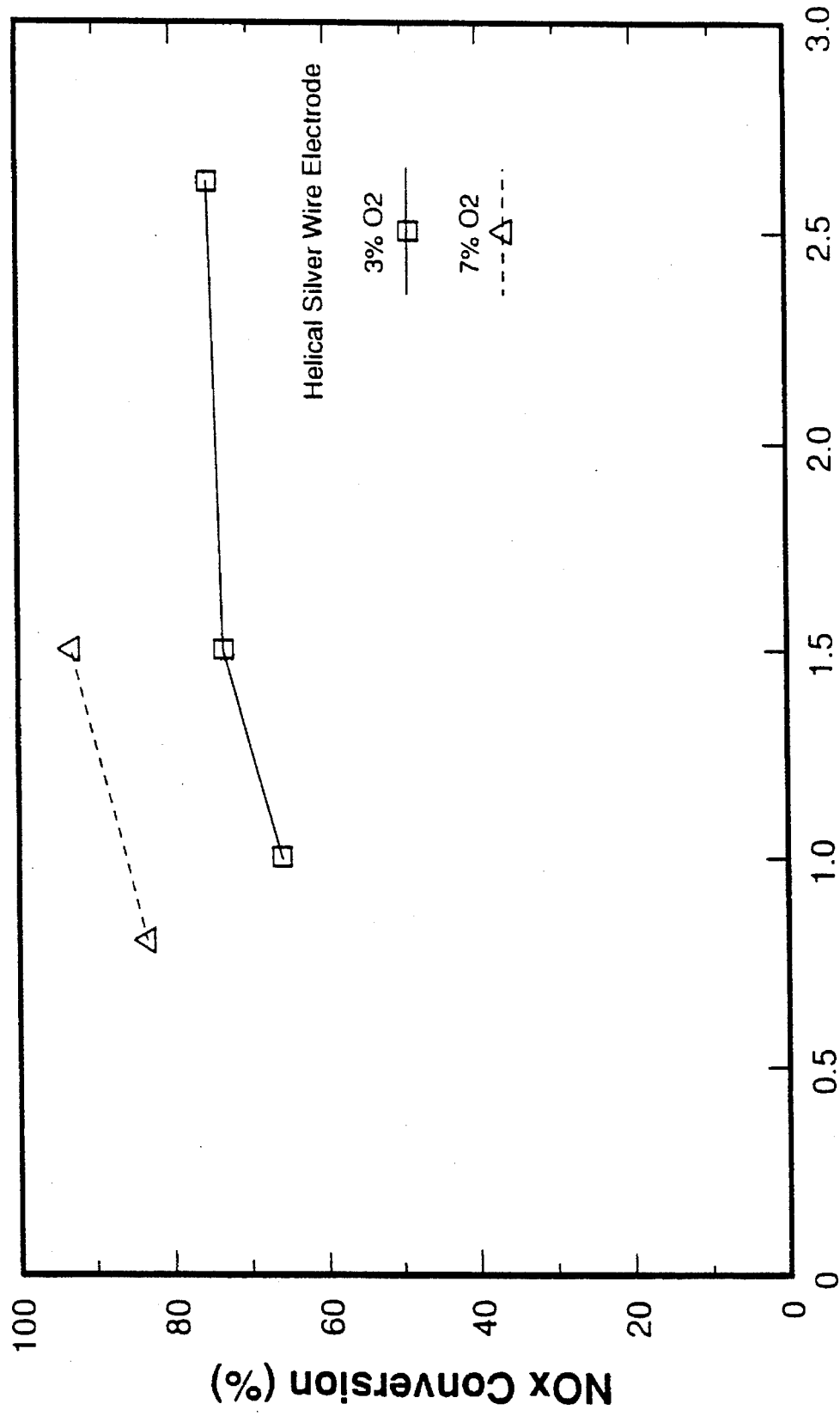
Figure 10E:
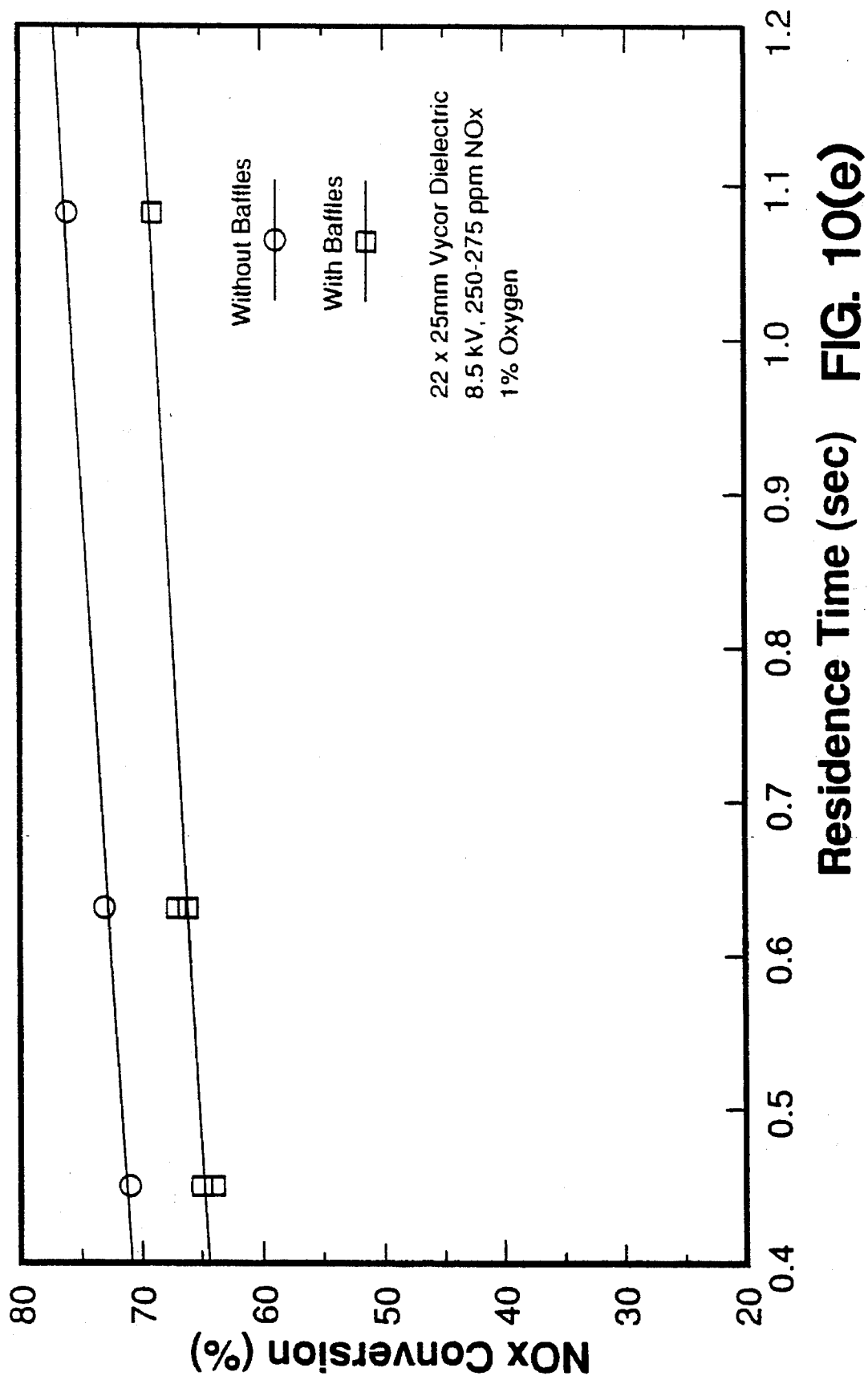
FIG. 10(e) is a graph of the variation of $NO_x$ conversion as a function of residence time for a bench top test reactor having teflon baffles.

FIGS. 10(b)–(d) are graphs of the variation in $NO_x$ reduction or conversion for different electrode configurations. The results provided in FIGS. 10(b)–(d) are for a tubular coronal catalytic reactor having the electrode geometry of FIG. 6(b). The graph of the variation in $NO_x$ reduction or conversion as a function of residence time without and with the teflon baffles of FIG. 9(c) is shown in FIG. 10(e).

High voltages of various waveforms, voltages and frequencies were used to create a corona discharge in the bench top reactors. DC, AC, and rectified AC (both positive and negative) voltages up to 35 kV (peak) were tested. Sine, square, triangle and pulse AC waveforms of various frequencies were also tested. Results from selected test in which electrical parameters were varied are shown in FIGS. 11 (a)–(c).

Figure 11A:
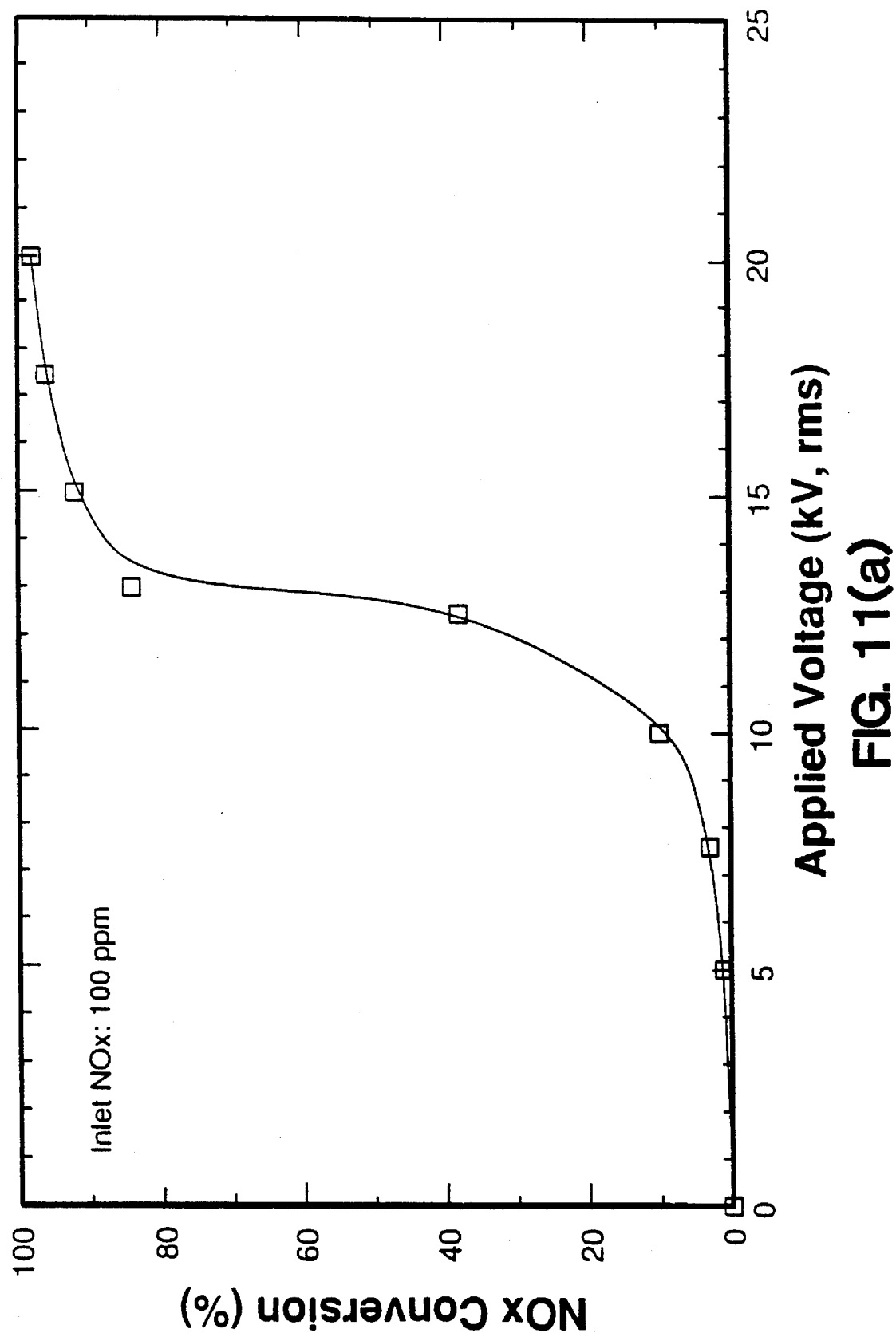
FIGS. 11(a),(b) are graphs of the variation of $NO_x$ conversion as a function of applied voltage.
Figure 11B:
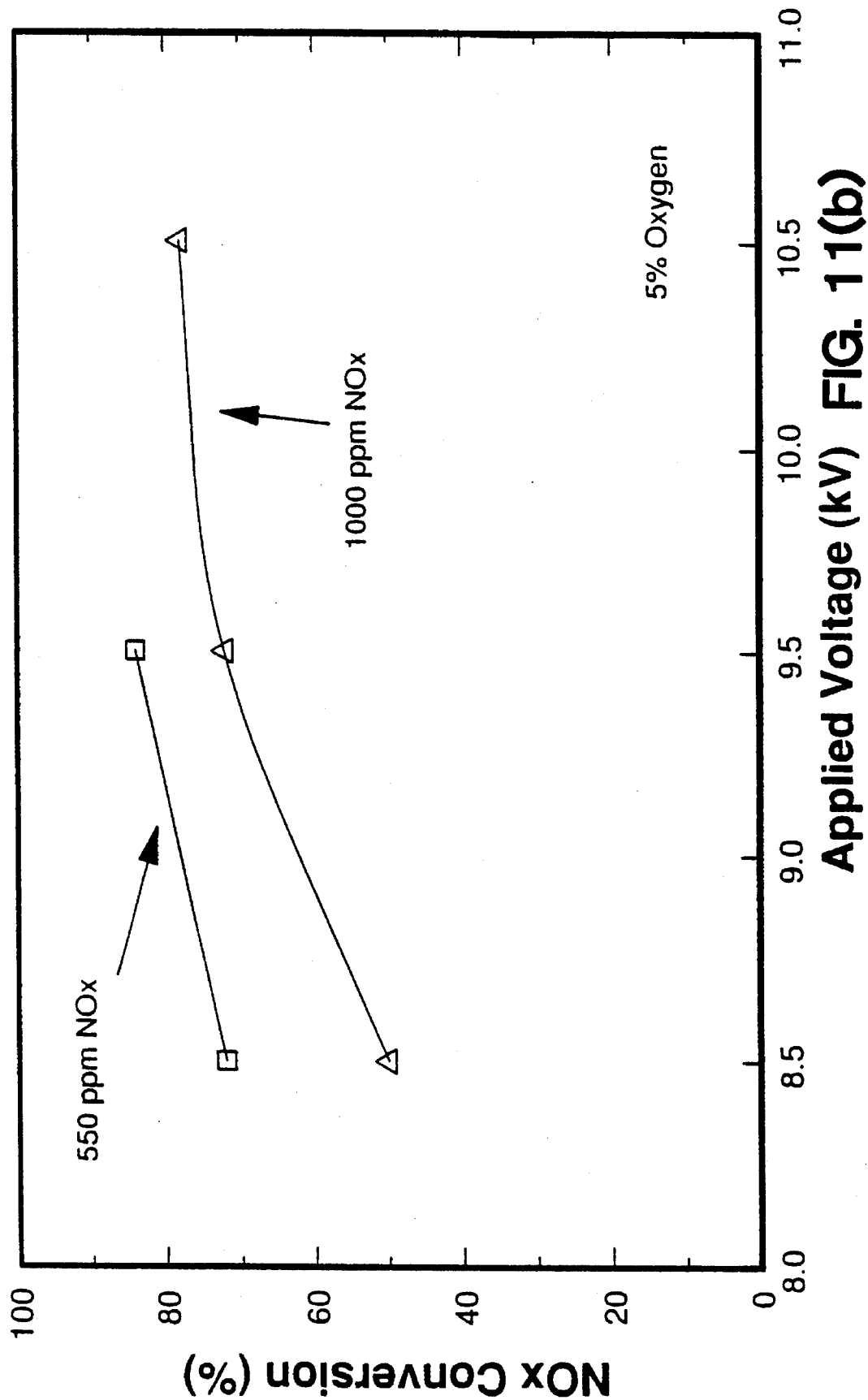
FIG. 11(c) is a graph of the variation of $NO_x$ conversion as a function of the frequency for the applied voltage.
Figure 11C:
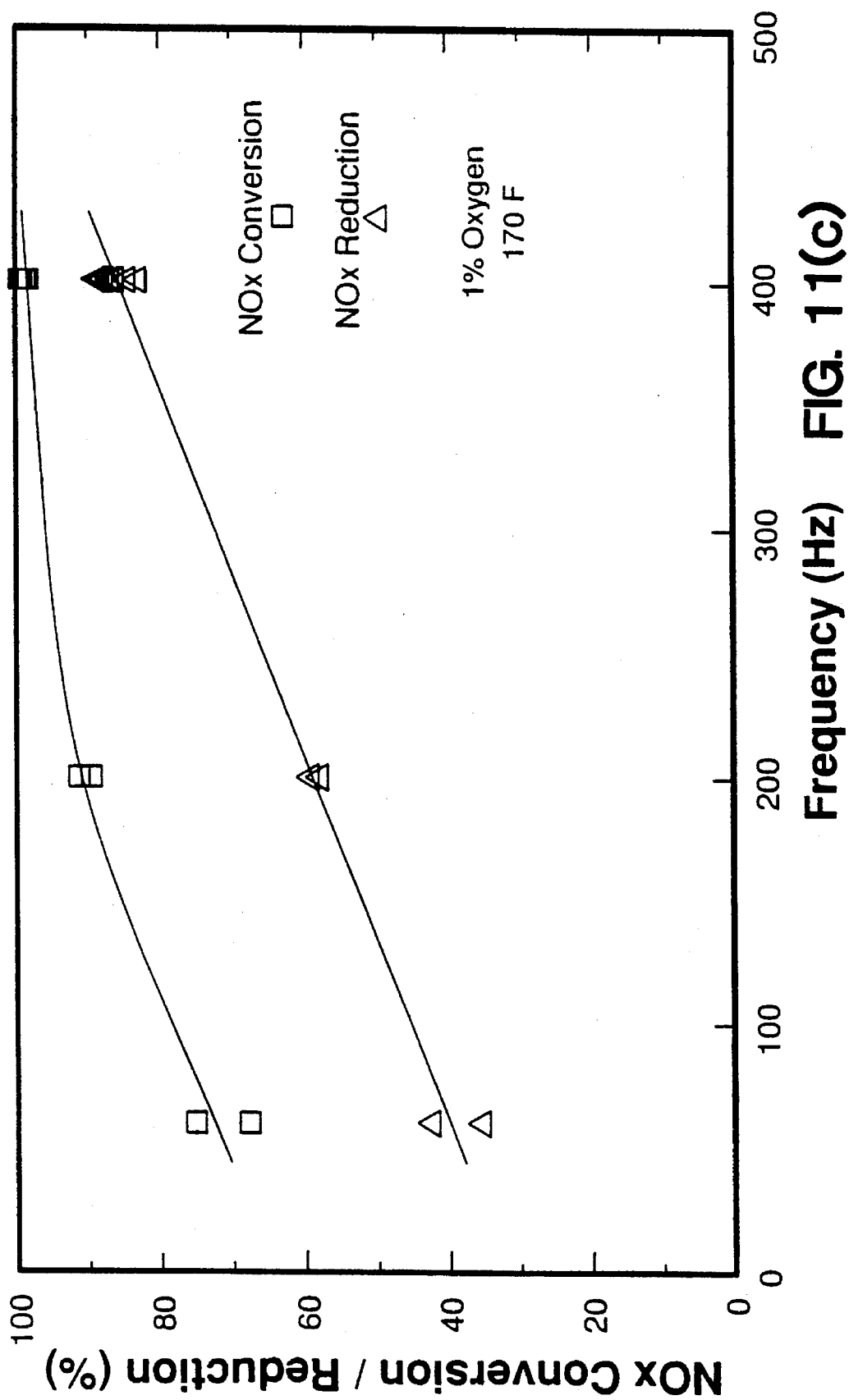

The effect of applied voltage on $NO_x$ reduction or conversion is shown in FIGS. 11(a),(b). As shown in FIG. 11 (a), at low voltages (i.e, before the onset of the corona) essentially no conversion occurs. At higher levels [e.g., 12.5 kV for FIG. 11 (a)], the conversion process is initiated since a soft corona discharge is present. The conversion process levels off at high voltages [e.g., about 15 kV for FIG. 11 (a)] due to the generation of non-uniformities (i.e., sparks) in the discharge. FIG. 11 (c) illustrates, as discussed above in connection with FIGS. 3(a)–(c), the variation of $NO_x$ reduction or conversion as a function of the frequency of the applied voltage. The figure confirms that increasing the frequency of the applied voltage results in increased $NO_x$ reduction.

Figure 12A:
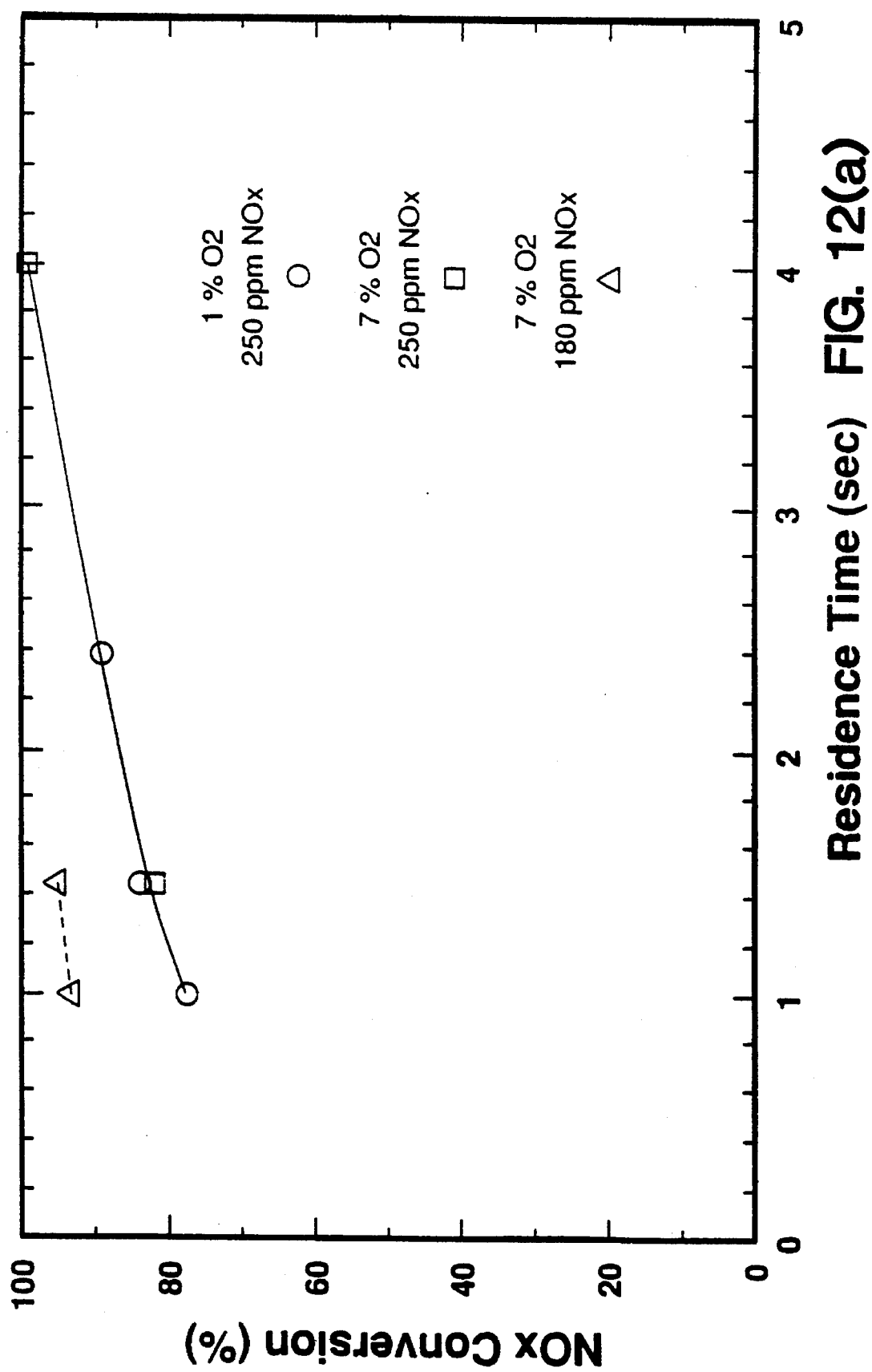
FIGS. 12(a)–(d) are graphs of the variation of $NO_x$ conversion for variation in flow conditions.
Figure 12B:
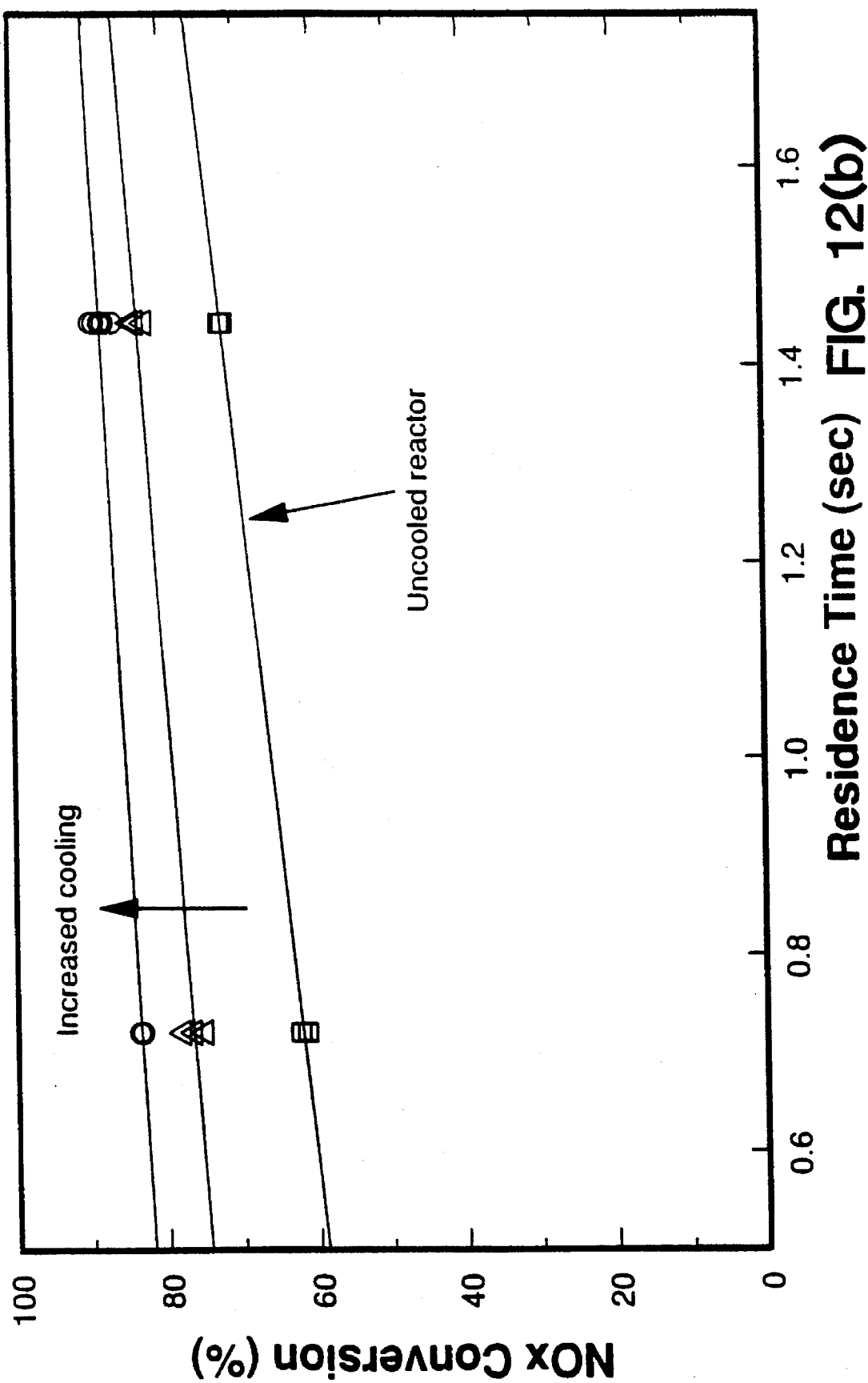
Figure 12C:
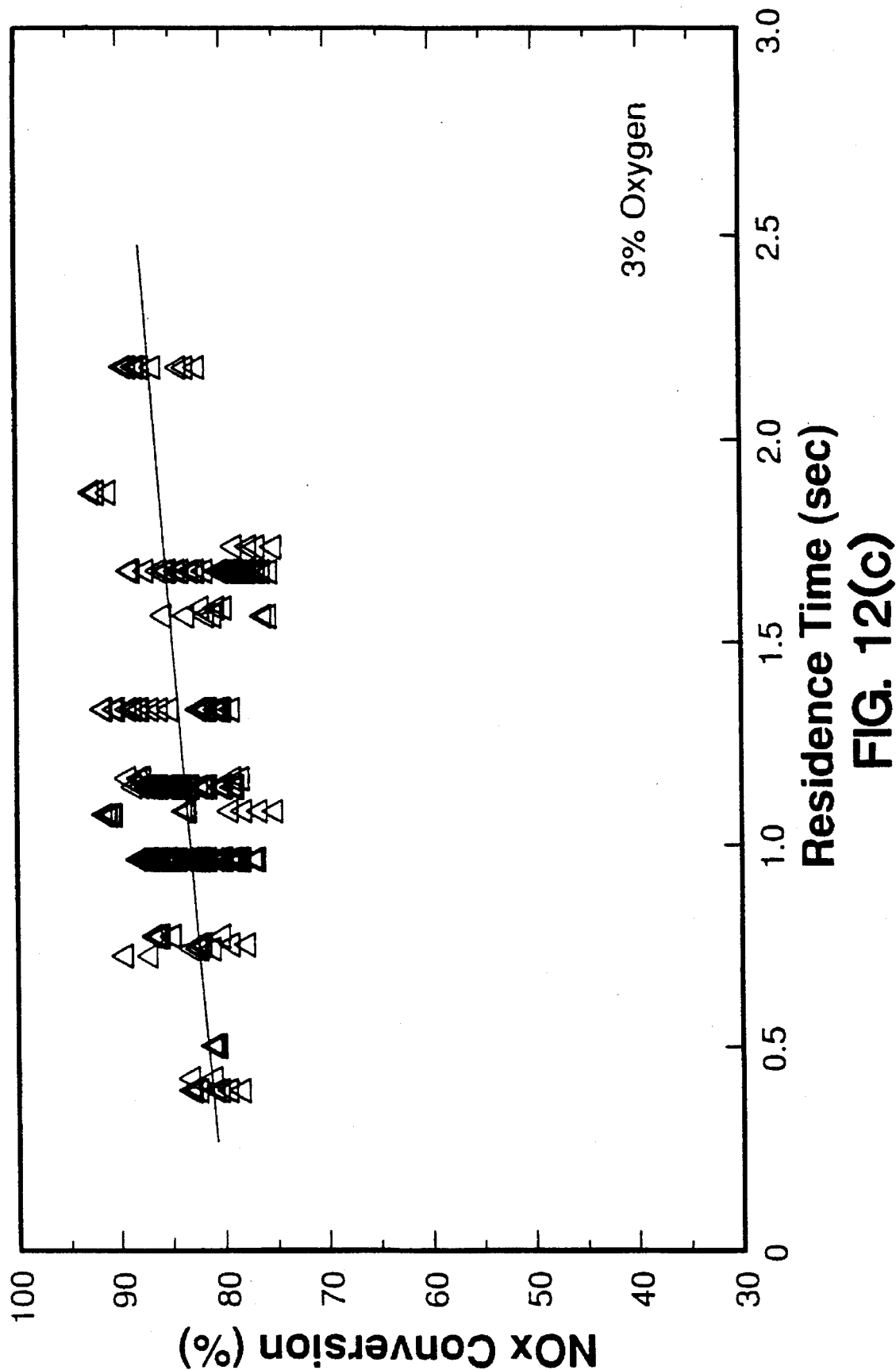
Figure 12D:
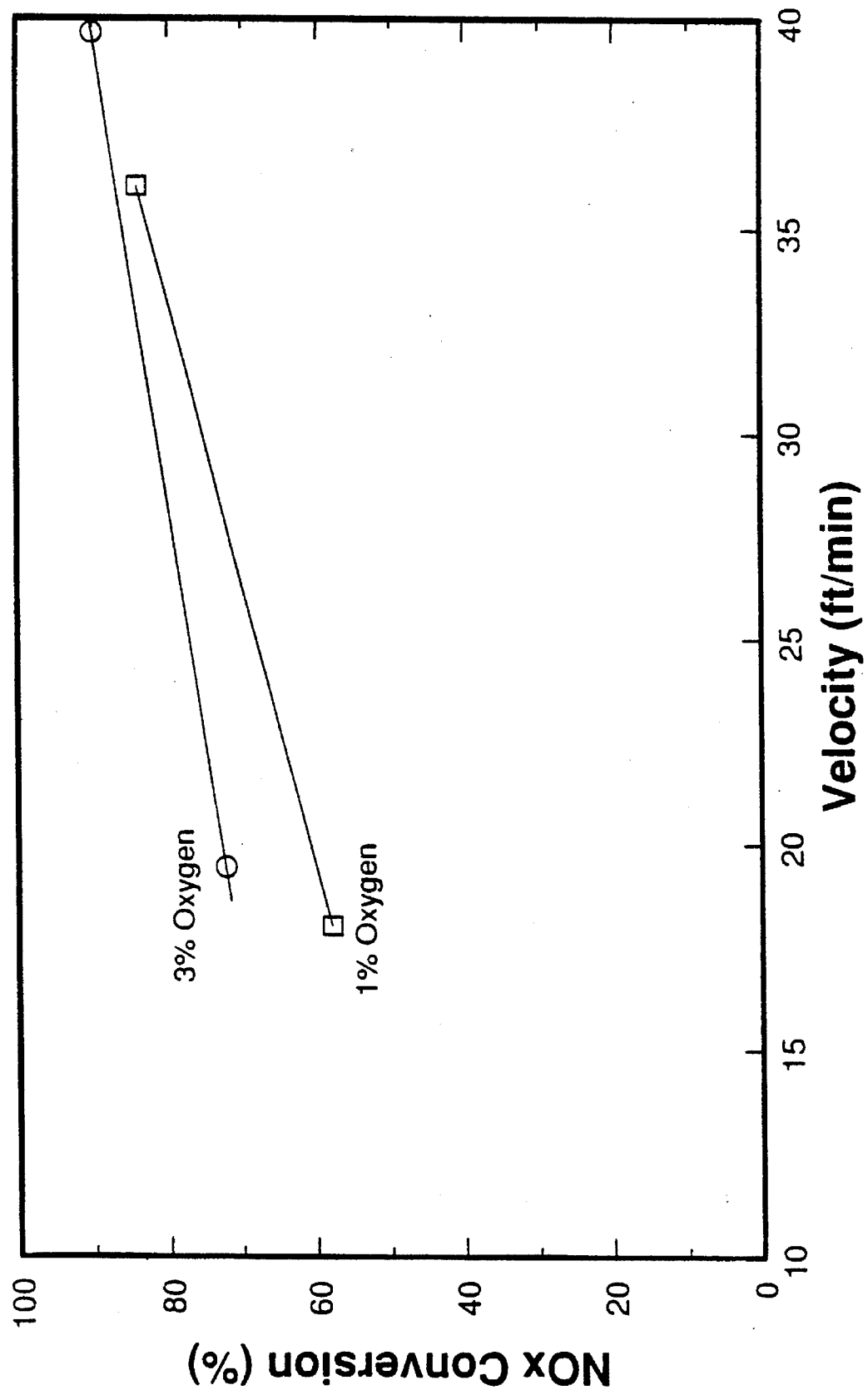

The bench top testing included tests of the reactor under various gas flow conditions where parameters including gas residence time, gas velocity, gas temperature and reactor temperature were varied. The results of selected tests in which gas flow conditions were varied are provided in FIGS. 12(a)–(d). The variation in $NO_x$ conversion as a function of residence time is shown in FIGS. 12(a),(b). From these figures it can be seen that as the resident time increases for constant gas velocities, the $NO_x$ reduction increases. The variation of $NO_x$ reduction or conversion as a function of the gas velocity is shown in FIG. 12(d), which shows that increasing flow velocity results in an increase in $NO_x$ reduction.

Figure 13A:
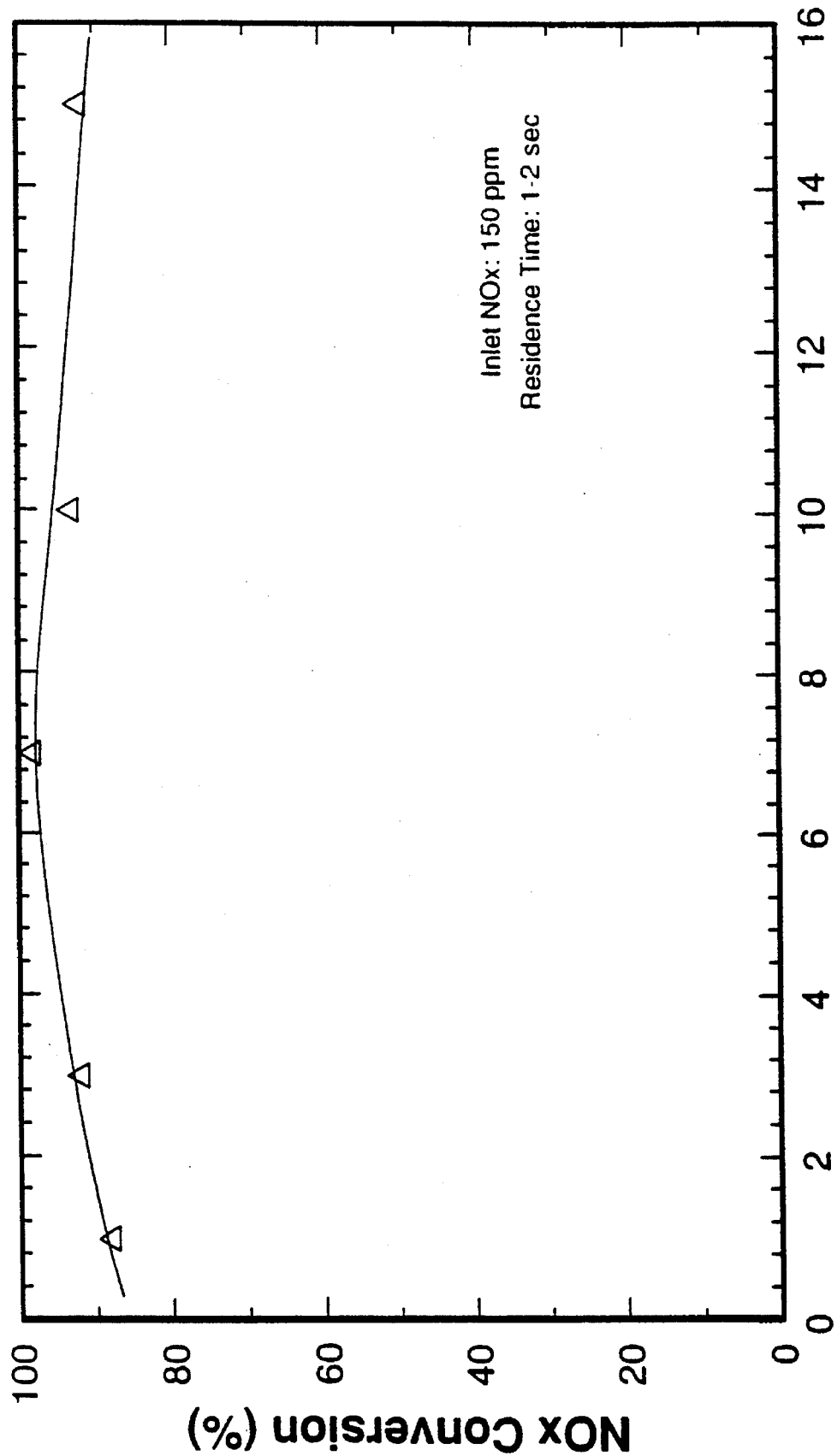
FIGS. 13(a),(b) are graphs of the variation in $NO_x$ conversion for variations of the oxygen content in the inlet flue gas stream.
Figure 13B:
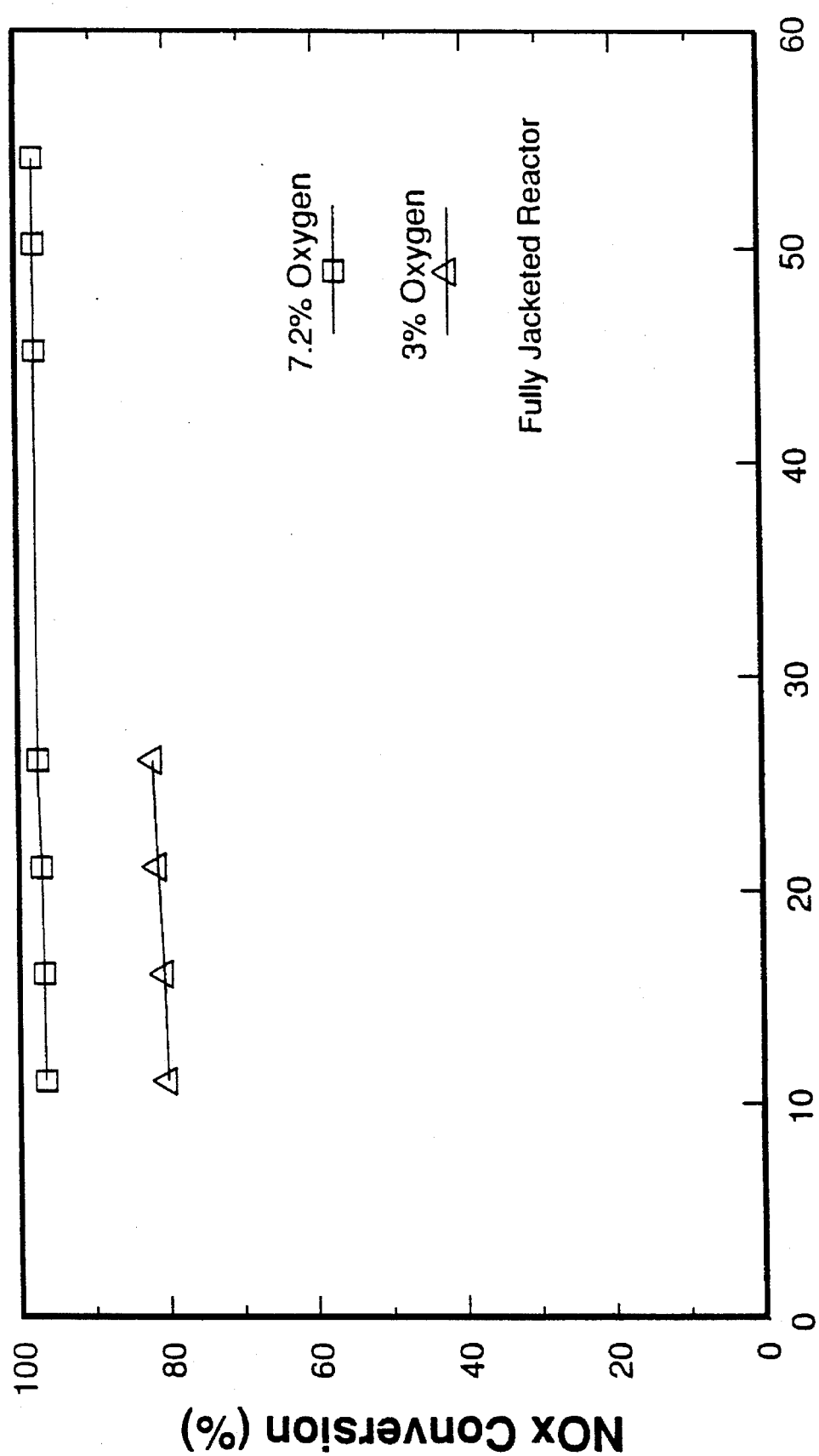
FIG. 13(c) is a graph of the variation of $NO_x$ conversion as a function of the $NO_x$ concentration in the inlet flue gas stream.
Figure 13C:
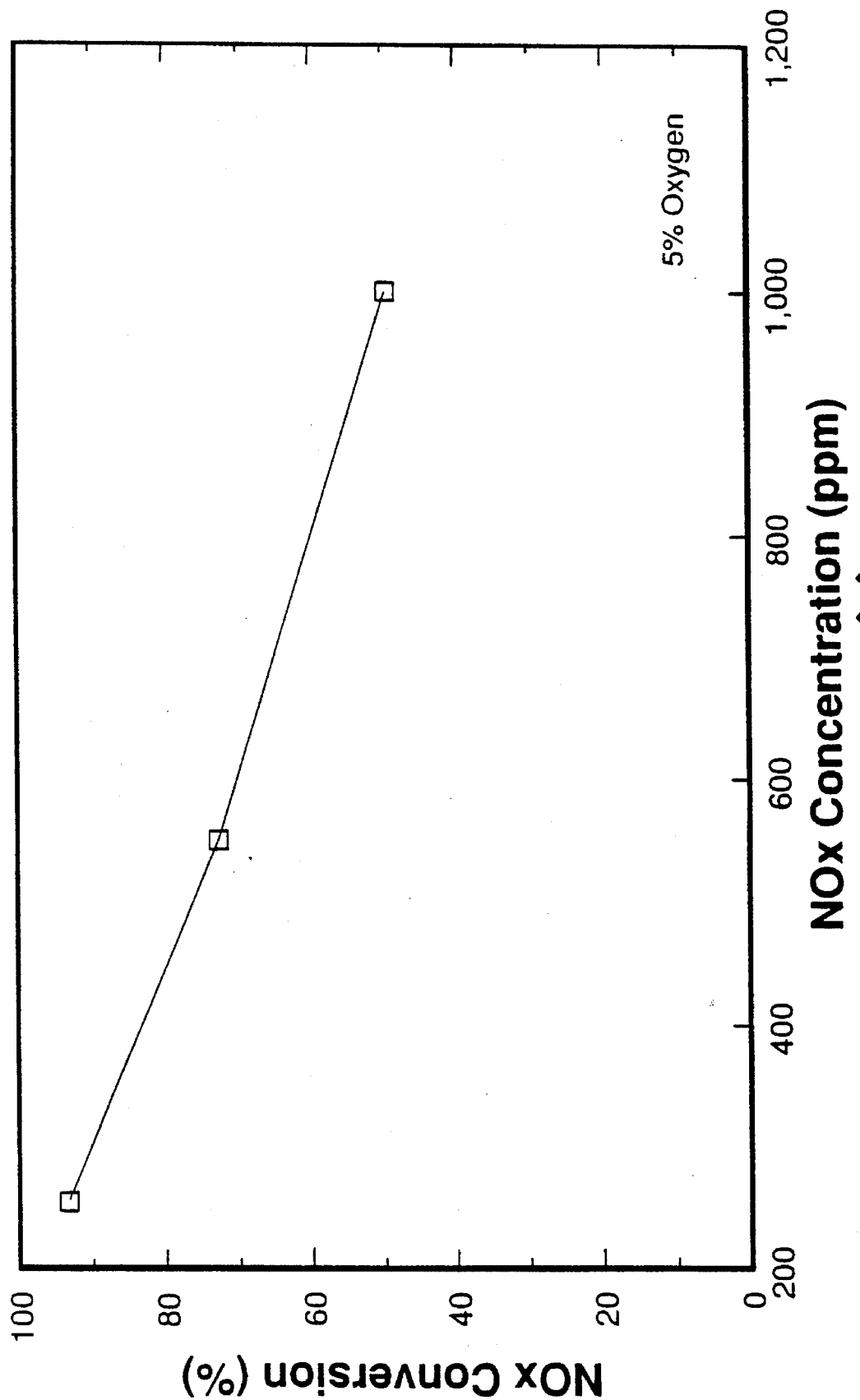

The effect of the reactor inlet gas composition on $NO_x$ conversion was also evaluated during bench top testing. In particular, bench top tests were done varying the concentration of $NO_x$, oxygen, and reducing gases such as hydrogen, carbon monoxide and methane in the inlet gas stream. There is shown in FIGS. (13a)–(c) the effect varying the inlet concentration of $O_2$ and the inlet concentration of $NO_x$ has on $NO_x$ reduction. The test involving varying oxygen concentrations in the inlet gas stream were run with inlet $NO_x$ concentrations of approximately 150 ppm and reactor residence times of 1 to 2 seconds. As shown in these figures, the $NO_x$ conversion is generally greater than 90% and approximately 95% for flue gas streams with an inlet oxygen concentration greater than 3%. Increasing inlet $NO_x$ concentration as shown in FIG. 13(c) tends to reduce the conversion achieved in a reactor at a given oxygen level. It was found, however, that addition of reducing gases to the inlet gas stream does not significantly effect $NO_x$ conversion.

The principal findings of the bench top testing are as follows.

Power input to the reactor is primarily a function of the reactor length, applied voltage and frequency.

Effect of increasing frequency is to allow greater power input to the reactor for a given applied voltage and geometry.

Decreasing spacing between the inner and outer electrodes reduces the voltage at which corona initiation takes place.

Increasing $O_2$ content increase $NO_x$ conversion.

Presence of $SO_2$ at 500 ppm does not significantly effect $NO_x$ conversion.

Addition of reducing gases to inlet stream does not significantly effect $NO_x$ conversion.

Increasing residence time increases $NO_x$ conversion.

Increasing velocity for a given residence time increases reactor performance (i.e. $NO_x$ conversion).

Additional Tests

Figure 14:
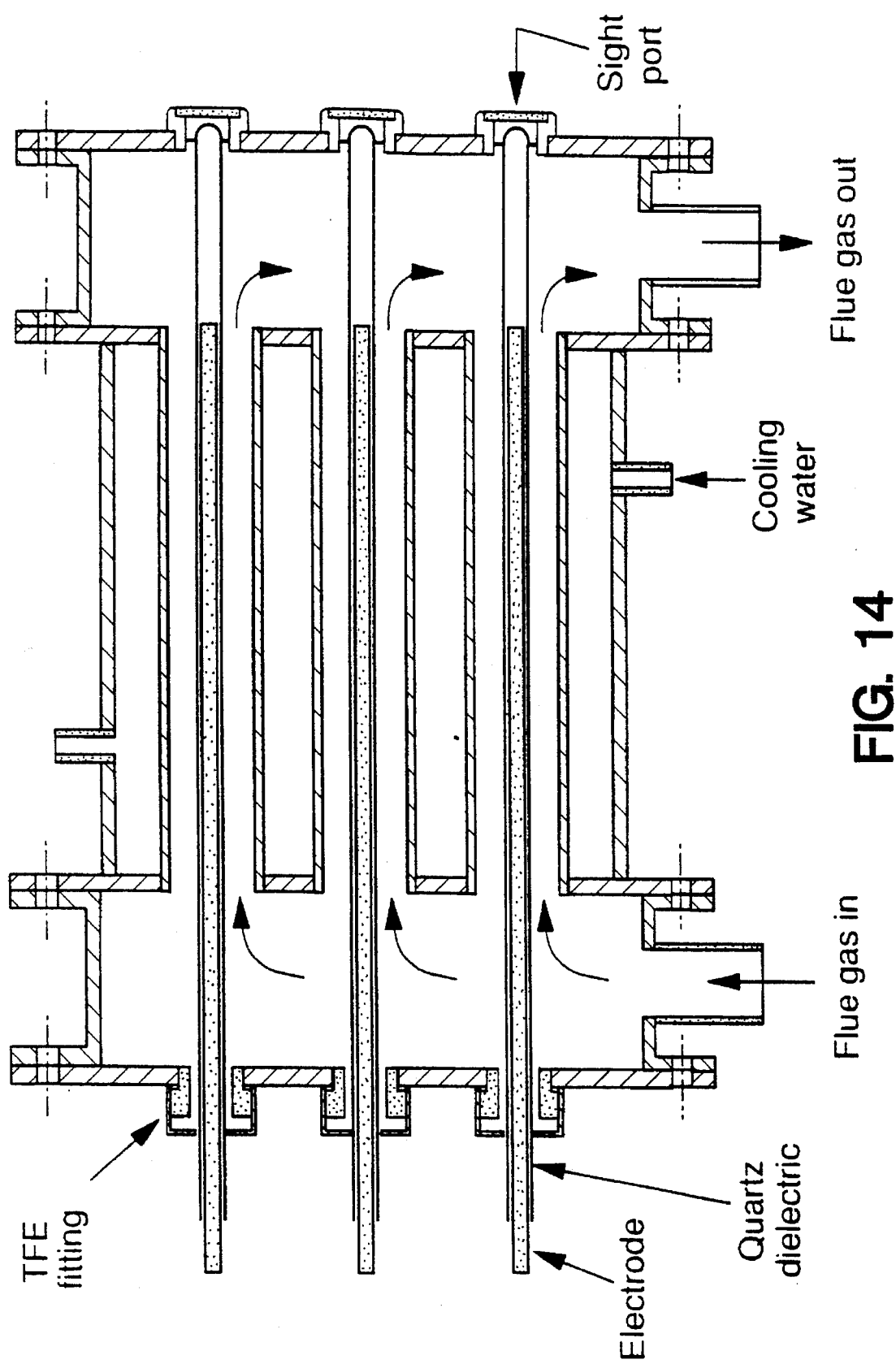
FIG. 14 is a schematic diagram of a multi-electrode coronal catalytic reactor according to the present invention permitting cross flow of gas as to several electrodes.
Figure 15:
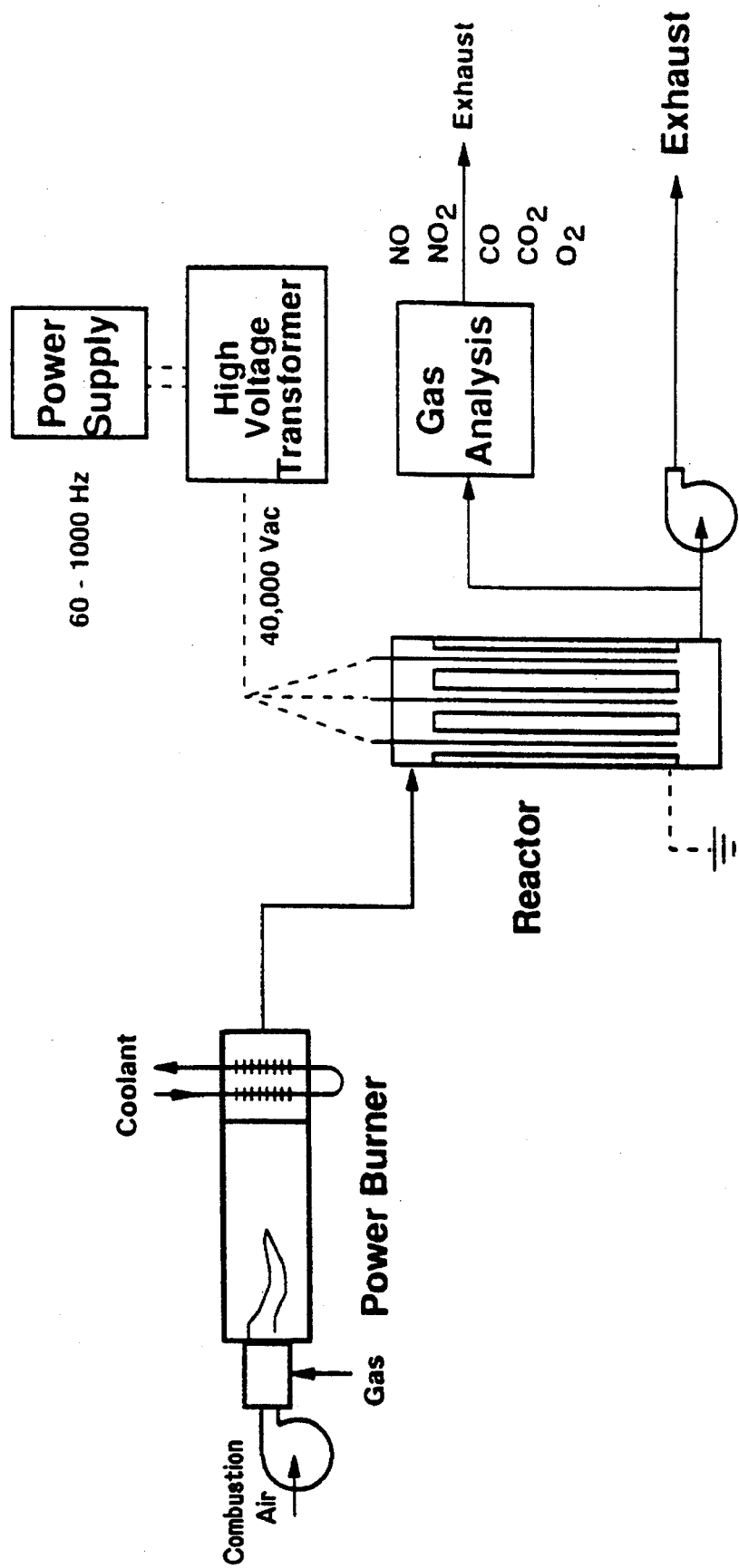
FIG. 15 is the test system using the coronal catalytic reactor of FIG. 14 for additional testing.

Additional tests were performed using the coronal catalytic reactor and test system shown in FIGS. 14, 15 respectively. This reactor embodiment consists of seven (7) tubes partitioned to form three sets of two tubes in series or configured for parallel operation. In the test system all or part of the flow from a 100,000-Btu/hr, natural gas fired burner is passed through the reactor. The inlet gas characteristics (e.g. temperature, flowrate, $O_2$ content and $NO_x$ concentration) are controlled to provide a wide range of test conditions.

Figure 16A:
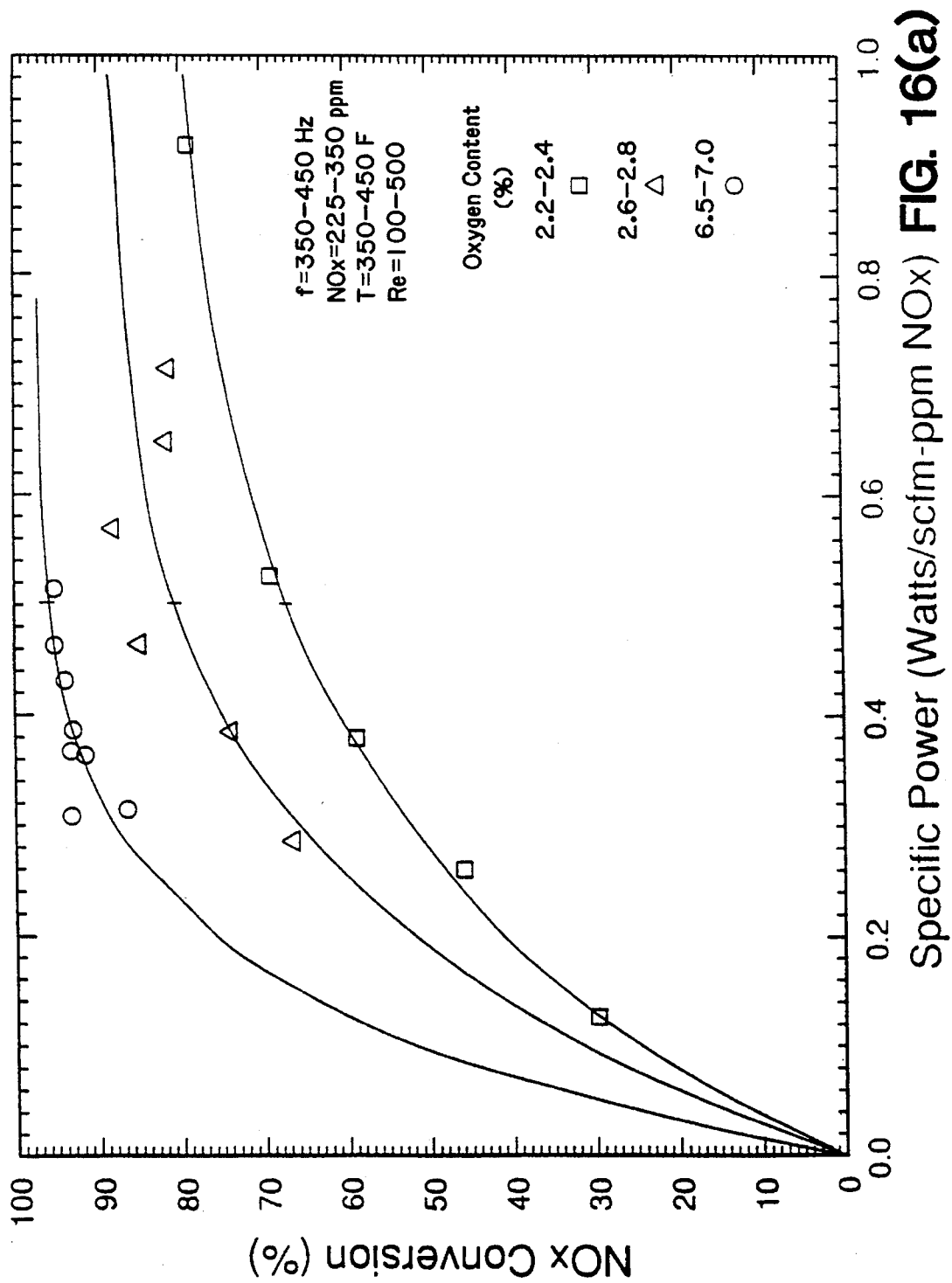
FIG. 16(a) illustrates the effect of oxygen content on the variation of $NO_x$ conversion as a function of the specific power at low Reynolds numbers.
Figure 16B:
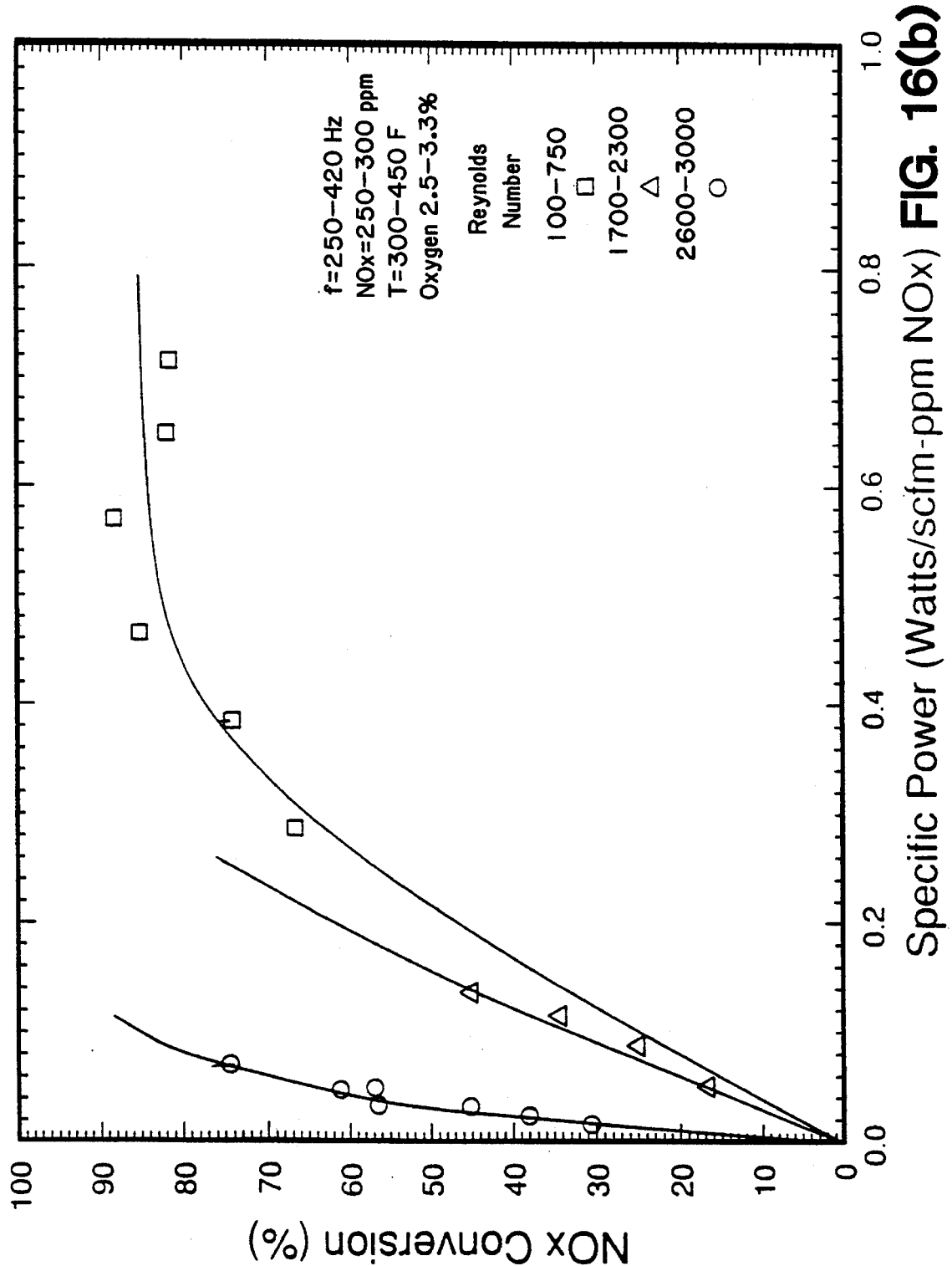
FIG. 16(b) illustrates the effect of Reynolds number on the variation of $NO_x$ conversion as a function of the specific power and FIG. 16(c) illustrates the effect of oxygen content on the variation of $NO_x$ conversion as a function of the specific power under turbulent flow conditions.
Figure 16C:
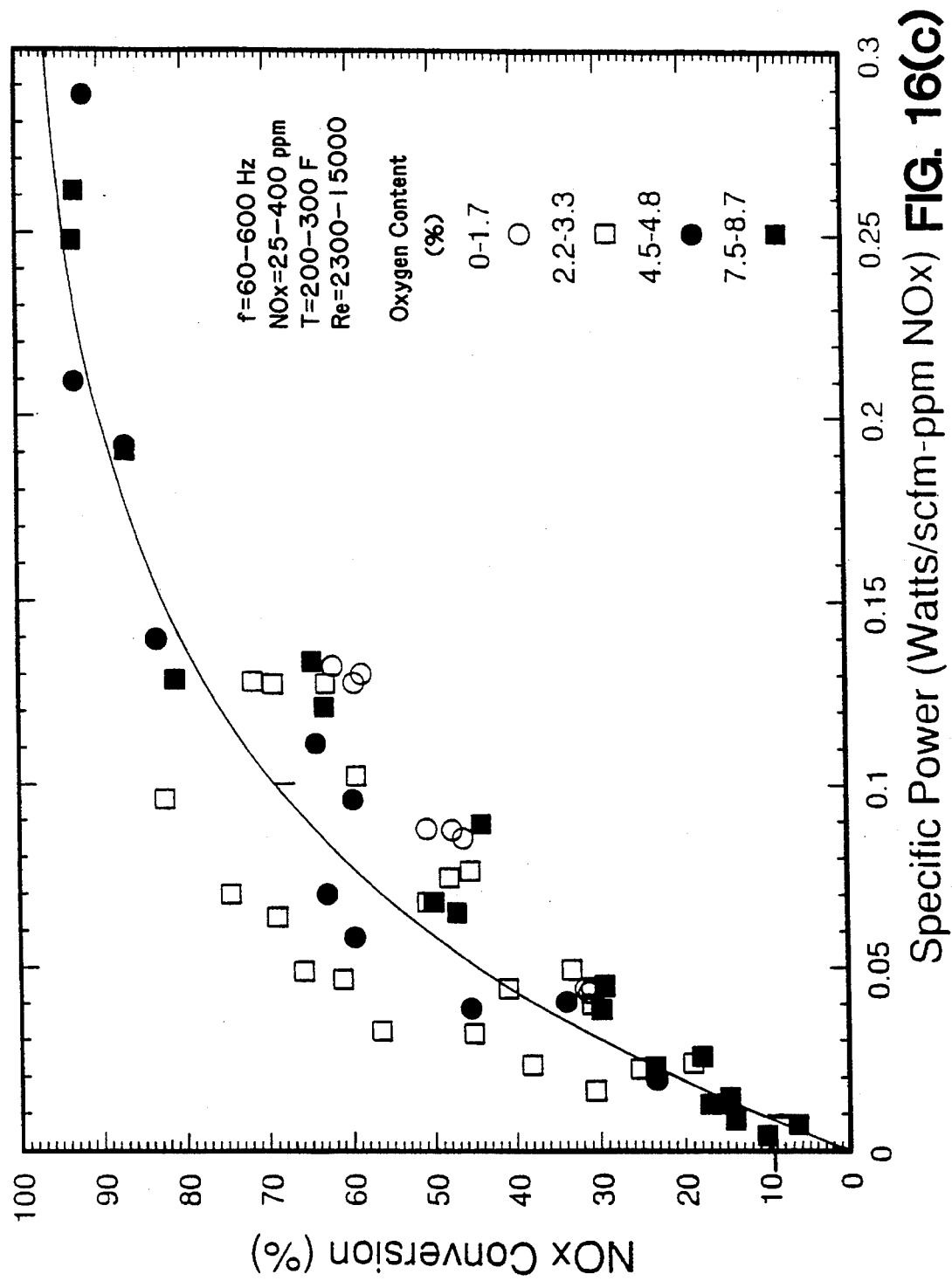

Graphs of the variation of $NO_x$ conversion as a function of specific power are provided in FIGS. 16(a)-(c). Specific power is defined as the power input to the reactor, in watts, divided by the flue gas flow rate, in standard cubic feet per minute (SCFM), and the inlet $NO_x$ concentration in ppm. Inherent in this definition of specific power is the effect of $NO_x$ concentration on conversion. Namely, the power required to achieve a fixed level of $NO_x$ conversion is directly proportional to the inlet $NO_x$ concentration.

The effect of oxygen content on the variation in $NO_x$ conversion as a function of specific power at low Reynolds Numbers is shown in FIG. 16(a). Under the conditions of low flow, as oxygen content in the flue gas increases, less power is required for a given conversion. For example, $NO_x$ conversion at 0.5 watts/scfm-ppm increase from 68% to 94% by increasing the oxygen level from 2.3 to 6.7%. This effect, however, is not observed at flowrates with higher Reynolds numbers (i.e., turbulent flow).

The effect of Reynolds number on the variation in $NO_x$ conversion as a function of specific power is shown in FIG. 16(b). At low Reynolds numbers of 100 to 750, flow in the reactor is laminar with little mixing taking place. At Reynolds numbers from 2600 to 3000, transition from laminar to turbulent flow occurs and the performance of the reactor is markedly improved. For example, the specific power for 75% $NO_x$ conversion is reduced from 0.38 to 0.07 watts/scfm-ppm when the Reynolds number is increased from 400 to 2800. This represents over a fivefold reduction in parasitic power consumption. This also includes a reduction in reactor size needed to achieve the required conversion.

Under turbulent flow conditions (i.e., Reynolds numbers >2300) the effect of oxygen on $NO_x$ conversion is significantly diminished over that seen for laminar flow. This is shown in FIG. 16(c) where inlet oxygen content was varied from 0 to 8.7%. The decreased sensitivity to oxygen content at higher exhaust flow rates makes an apparatus according to the present invention more easily applicable to a wide variety of natural gas fired applications.

While preferred embodiments of the invention have been described using specific terms, such description is for illustrative purposes only, and it is to be understood that changes and variations may be made without departing from the spirit or scope of the following claims.

What is claimed is:

1. A method of environment effective reducing of $NO_x$ emissions comprising the step of exposing a $NO_x$ bearing gas to a sulfur tolerant coronal-catalyst wherein the coronal-catalyst is adapted and configured for hypercritical presentation of an electrical field to an $NO_x$ bearing gas stream where the electrical field has a minimum field power density of at least about 75 watts/meter$^3$.

2. The method of claim 1 further comprising;
 disposing the coronal-catalyst in from one to a plurality of tubular members configured and adapted to receive a flow of the $NO_x$ bearing gas;
 maintaining the coronal-catalyst at a field power density of at least about 75 watts/meter$^3$;
 energizing the coronal catalyst with a voltage from about 4000 to about 30,000 volts, the voltage having a frequency of from 60 Hz to about 30,000 Hz; and
 maintaining residency of the flow of $NO_x$ bearing gas in the tubular members of from about 0.2 to about 5 seconds or more.

3. The method of claim 1 wherein said exposing the $NO_x$ bearing gas to the sulfur tolerant coronal-catalyst reduces $NO_x$ concentration of the $NO_x$ bearing gas by at least 40%.

4. The method of claim 3 further comprising the step of N/S scrubbing of the $NO_x$ bearing gas stream that has been exposed to the sulfur tolerant coronal catalyst.

5. The method of claim 4 wherein said N/S scrubbing further includes the steps of treating the exposed $NO_x$ bearing gas stream to obtain $H_2SO_4$ and nitrogenous reduction products; and collecting the $H_2SO_4$ and nitrogenous reduction products.

6. The method of claim 1 wherein said exposing the $NO_x$ bearing gas to the sulfur tolerant coronal-catalyst reduces $NO_x$ concentration of the $NO_x$ bearing gas by at least 90%.

7. The method of claim 1 wherein said exposing the $NO_x$ bearing gas to the sulfur tolerant coronal-catalyst reduces $NO_x$ concentration of the $NO_x$ bearing gas by at least 98%.

8. A method of environment effective reducing of $NO_x$ emissions comprising the steps of:
 disposing at least one row of a plurality of electrodes in a stream of $NO_x$ bearing gas, each electrode in said row being spaced from each other;
 energizing the electrodes in each said row to establish a supra-arc voltage arc-free zone for each said row; and
 exposing the $NO_x$ bearing gas to each row's supra-arc voltage arc-free zone.

9. The method of claim 8 wherein said energizing includes applying a voltage to the electrodes in each said row so each said supra-arc voltage arc-free zone has a minimum electrical field power density of from at least about 75 watts/meter$^3$.

10. The method of claim 9 wherein the voltage being applied is in the range of from about 4,000 to about 30,000 volts.

11. The method of claim 10 wherein the voltage being applied is a cyclical voltage having a frequency in the range of from about 60 Hz to about 30,000 Hz.

12. The method of claim 8 further comprising the step of controlling flow of the $NO_x$ bearing gas stream so the gas stream flows through each said supra-arc voltage arc-free zone.

13. The method of claim 12 wherein said controlling also controls the gas flow so the $NO_x$ bearing gas stream requires from about 0.2 to about 5 seconds or more to pass through all the supra-arc voltage arc-free zones.

14. The method of claim 8 further comprising the step of applying a dielectric material to at least every other electrode in each said row.

15. The method of claim 14 wherein said applying includes applying the dielectric material to each electrode in each said row.

16. The method of claim 8 further comprising the step of adding a gas to the $NO_x$ bearing gas stream to increase $NO_x$ reduction.

17. The method of claim 8 further comprising the step of N/S scrubbing of the $NO_x$ bearing gas stream being exposed to the supra-arc voltage arc-free zones.

18. The method of claim 17 wherein said N/S scrubbing further includes treating the exposed $NO_x$ bearing gas stream to obtain $H_2SO_4$ and nitrogenous reduction products and collecting the $H_2SO_4$ and nitrogenous reduction products.

19. A method of environment effective reducing of $NO_x$ emissions comprising the steps of:
 disposing a plurality of rows of electrodes in a stream of $NO_x$ bearing gas, each said row being spaced from each other, and each said row having a plurality of spaced electrodes;

energizing the electrodes in each said row to establish a supra-arc voltage arc-free zone for each said row; and exposing the $NO_x$ bearing gas to each said supra-arc voltage arc-free zone.

20. The method of claim 19 wherein said energizing includes applying a voltage to the electrodes in each said row so each said supra-arc voltage arc-free zone has a minimum electrical field power density of from at least about 75 watts/meter$^3$.

21. The method of claim 19 wherein the voltage being applied is in the range of from about 4,000 to about 30,000 volts and having a frequency in the range of from about 60 Hz to about 30,000 Hz.

22. The method of claim 19 further comprising the step of controlling flow of the $NO_x$ bearing gas stream so the gas stream flows through each said supra-arc voltage arc-free zone.

23. The method of claim 22 wherein said controlling also controls the gas flow so the $NO_x$ bearing gas stream requires from about 0.2 to about 5 seconds or more to pass through all the supra-arc voltage arc-free zones.

24. The method of claim 19 further comprising the step of applying a dielectric material to at least every other electrode in each said row.

25. The method of claim 24 wherein said applying includes applying the dielectric material to each electrode in each said row.

26. The method of claim 19 further comprising the step of adding a gas to the $NO_x$ bearing gas stream to increase $NO_x$ reduction.

27. The method of claim 19 further comprising the step of N/S scrubbing of the $NO_x$ bearing gas stream being exposed to the supra-arc voltage arc-free zones and wherein said N/S scrubbing further includes treating the exposed $NO_x$ bearing gas stream to obtain $H_2SO_4$ and nitrogenous reduction products and collecting the $H_2SO_4$ and nitrogenous reduction products.

28. The method of claim 8 wherein said exposing the $NO_x$ bearing gas to reduces $NO_x$ concentration of the $NO_x$ bearing gas by at least 40%.

29. The method of claim 15 wherein said energizing includes applying a cyclical voltage in the range of from about 4,000 to about 30,000 volts and having a frequency in the range of from about 60 Hz to about 30,000 Hz, wherein the voltage and frequency of the cyclical voltage being applied is such that said exposing reduces $NO_x$ concentration of the $NO_x$ bearing gas by at least 40%.

30. The method of claim 19 wherein said exposing the $NO_x$ bearing gas reduces $NO_x$ concentration of the $NO_x$ bearing gas by at least 40%.

31. The method of claim 25 wherein said energizing includes applying a cyclical voltage in the range of from about 4,000 to about 30,000 volts and having a frequency in the range of from about 60 Hz to about 30,000 Hz, wherein the voltage and frequency of the cyclical voltage being applied is such that said exposing reduces $NO_x$ concentration of the $NO_x$ bearing gas by at least 40%.

* * * * *

UNITED STATES PATENT AND TRADEMARK OFFICE
CERTIFICATE OF CORRECTION

PATENT NO. : 5,458,748
DATED : October 17, 1995
INVENTOR(S) : Breault et al.

It is certified that error appears in the above-indentified patent and that said Letters Patent is hereby corrected as shown below:

Column 4, Line 26: Delete "meter3" and insert -- $meter^3$ -- therefor;

Column 8, Line 25: Delete "-" (the negative sign) from the right hand side of the equation;

Column 9, Line 1: Delete "$V_2-v_2$" from the bottom right side of the equation and insert -- $V_2-V_2$ -- therefor;

Column 10, Line 34: Delete "FIG. 4" and insert -- FIG. 14 -- therefor;

Column 11, Line 20: Insert -- -- -- after "glass";

Column 13, Line 31: Delete "$2NO+O_2 2NO_2$" and insert -- $2NO+O_2 \rightarrow 2NO_2$ -- therefor;

UNITED STATES PATENT AND TRADEMARK OFFICE
CERTIFICATE OF CORRECTION

PATENT NO. : 5,458,748
DATED : October 17, 1995
INVENTOR(S) : Breault et al.

It is certified that error appears in the above-indentified patent and that said Letters Patent is hereby corrected as shown below:

Column 13, Line 6: Delete "4";

Column 13, Line 7: Indent the paragraph beginning "Presented";

Column 14, Line 27: Delete "1 is the current" and insert -- I is the current -- therefor;

Column 15, Line 9: Insert a comma after "Works";

Column 20, Line 32: Delete "22" and insert -- 222 -- therefor

Signed and Sealed this

First Day of July, 1997

Attest:

Attesting Officer

BRUCE LEHMAN

Commissioner of Patents and Trademarks